(12) United States Patent
Kato et al.

(10) Patent No.: US 8,478,497 B2
(45) Date of Patent: Jul. 2, 2013

(54) HYDRAULIC CONTROL DEVICE AND HYDRAULIC CONTROL METHOD FOR VEHICLE AUTOMATIC TRANSMISSION

(75) Inventors: Shinji Kato, Toyota (JP); Hitoshi Matsunaga, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 469 days.

(21) Appl. No.: 12/814,770

(22) Filed: Jun. 14, 2010

(65) Prior Publication Data
US 2010/0332091 A1  Dec. 30, 2010

(30) Foreign Application Priority Data

Jun. 26, 2009  (JP) ................................ 2009-153002
Jun. 26, 2009  (JP) ................................ 2009-153003

(51) Int. Cl.
G06F 19/00 (2011.01)
F16H 61/30 (2006.01)

(52) U.S. Cl.
USPC ............. 701/58; 701/22; 701/68; 477/159; 477/169; 477/109; 477/132; 477/119

(58) Field of Classification Search
USPC ............. 701/22, 51, 58, 68; 477/109, 110, 477/123, 125, 128, 130, 159
See application file for complete search history.

(56) References Cited

U.S. PATENT DOCUMENTS

| | | | | |
|---|---|---|---|---|
| 4,519,273 A | * | 5/1985 | Shimizu et al. | 180/273 |
| 4,729,266 A | * | 3/1988 | Mishima et al. | 477/128 |
| 6,266,580 B1 | * | 7/2001 | Asahara et al. | 700/282 |
| 6,346,063 B1 | * | 2/2002 | Kondo et al. | 477/143 |
| 6,702,714 B2 | * | 3/2004 | Sato et al. | 477/146 |

(Continued)

FOREIGN PATENT DOCUMENTS

| | | |
|---|---|---|
| CN | 1693740 A | 11/2005 |
| JP | 5-296329 A | 11/1993 |

(Continued)

OTHER PUBLICATIONS

Japanese Office Action issued on May 10, 2011 in corresponding Japanese Application No. 2009-153002 (with a Partial English Translation).

(Continued)

*Primary Examiner* — Thomas Black
*Assistant Examiner* — Wae Louie
(74) *Attorney, Agent, or Firm* — Oblon, Spivak, McClelland, Maier & Neustadt, L.L.P.

(57) ABSTRACT

During a non-shift operation when a predetermined gear of an automatic transmission is kept, a hydraulic control unit increases an engagement hydraulic pressure to a friction engagement device associated with the gear formation by a predetermined hydraulic pressure with respect to a line hydraulic pressure. Therefore, in comparison with a case where a hydraulic pressure equivalent to the line hydraulic pressure is set as an engagement hydraulic pressure to the friction engagement device for obtaining a hydraulic pressure equivalent to the line hydraulic pressure, shift response (hydraulic pressure response) variations when shifting from a non-shift state (steady state) into a shift state are suppressed by the margin of the predetermined hydraulic pressure. In addition, in comparison with a case where the engagement hydraulic pressure to the friction engagement device is set to a maximum hydraulic pressure to reduce the response variations, power consumption of each linear solenoid valve is suppressed.

22 Claims, 19 Drawing Sheets

U.S. PATENT DOCUMENTS

| | | | |
|---|---|---|---|
| 6,740,005 B2 * | 5/2004 | Watanabe et al. | 477/110 |
| 6,761,664 B2 * | 7/2004 | Ayabe et al. | 477/144 |
| 6,902,642 B2 * | 6/2005 | Kawaharada et al. | 156/239 |
| 7,074,158 B2 * | 7/2006 | Watanabe et al. | 477/159 |
| 7,220,216 B2 * | 5/2007 | Ohta | 477/169 |
| 7,282,011 B2 * | 10/2007 | Tabata et al. | 477/109 |
| 7,970,505 B2 * | 6/2011 | Suzuki | 701/22 |
| 2003/0100403 A1 * | 5/2003 | Kato et al. | 477/123 |
| 2005/0247153 A1 * | 11/2005 | Nozaki et al. | 74/473.11 |
| 2005/0266959 A1 * | 12/2005 | Nozaki et al. | 477/130 |
| 2006/0025281 A1 * | 2/2006 | Nozaki et al. | 477/125 |
| 2008/0071449 A1 * | 3/2008 | Kondo et al. | 701/51 |
| 2008/0234885 A1 * | 9/2008 | Suzuki | 701/22 |
| 2010/0332091 A1 * | 12/2010 | Kato et al. | 701/58 |
| 2011/0196590 A1 * | 8/2011 | Ayabe et al. | 701/68 |

FOREIGN PATENT DOCUMENTS

| | | | |
|---|---|---|---|
| JP | 6-174073 A | 6/1994 | |
| JP | 6-346960 A | 12/1994 | |
| JP | 9-42434 A | 2/1997 | |
| JP | 9-152023 A | 6/1997 | |
| JP | 9-152026 A | 6/1997 | |
| JP | 9-273626 A | 10/1997 | |
| JP | 10-9377 | 1/1998 | |
| JP | 10-110796 A | 4/1998 | |
| JP | 2000-65198 A | 3/2000 | |
| JP | 2000-205389 A | 7/2000 | |
| JP | 2001-116126 A | 4/2001 | |
| JP | 2001-519011 A | 10/2001 | |
| JP | 2001-342862 A | 12/2001 | |
| JP | 2002-89672 A | 3/2002 | |
| JP | 2007-303552 A | 11/2007 | |

OTHER PUBLICATIONS

Japanese Office Action issued on May 10, 2011 in corresponding Japanese Application No. 2009-153003 (with a Partial English Translation).

* cited by examiner

| | C1 | C2 | B1 | B2 | B3 | F1 |
|---|---|---|---|---|---|---|
| 1ST | ○ | | | ◎ | | △ |
| 2ND | ○ | | ○ | | | |
| 3RD | ○ | | | | ○ | |
| 4TH | ○ | ○ | | | | |
| 5TH | | ○ | | | ○ | |
| 6TH | | ○ | ○ | | | |
| R | | | | ○ | ○ | |
| N | | | | | | |

◎ OPERATED DURING ENGINE BRAKING
△ OPERATED ONLY WHEN BEING DRIVEN

HYDRAULIC CONTROL DEVICE AND HYDRAULIC CONTROL METHOD FOR VEHICLE AUTOMATIC TRANSMISSION

INCORPORATION BY REFERENCE

The disclosures of Japanese Patent Applications Nos. 2009-153002 filed on Jun. 26, 2009 and 2009-153003 filed on Jun. 26, 2009, each including the specification, drawings and abstract, are incorporated herein by reference in their entireties.

BACKGROUND OF THE INVENTION

1. Field of the Invention

The invention relates to a hydraulic control device and hydraulic control method for a vehicle automatic transmission that engages or releases a hydraulic friction engagement device through a hydraulic pressure applied from an electromagnetic valve device and, more particularly, to a technique for appropriately setting an engagement hydraulic pressure applied to a hydraulic friction engagement device.

2. Description of the Related Art

There is widely known a vehicle automatic transmission in which a plurality of hydraulic friction engagement devices are selectively engaged to establish a plurality of speeds having different speed ratios. For example, Japanese Patent Application Publication No. 10-9377 (JP-A-10-9377) describes such an automatic transmission. JP-A-10-9377 describes that an estimated torque input to the automatic transmission (hereinafter, referred to as transmission input torque) is calculated on the basis of an estimated engine torque calculated and then required engagement hydraulic pressures that are required to keep respective hydraulic friction engagement devices engaged are calculated on the basis of the transmission input torque. In addition, the required engagement hydraulic pressures are, for example, supplied from corresponding linear solenoid valves using a line hydraulic pressure as a source pressure. The linear solenoid valves are provided in correspondence with the hydraulic friction engagement devices. Therefore, the line hydraulic pressure is set to a hydraulic pressure value by which the required engagement hydraulic pressures can be obtained.

FIG. 27 is a view that shows an example of a case where an engagement hydraulic pressure is directly supplied to a hydraulic friction engagement device 2 from a linear solenoid valve 1 without passing through, for example, a shift control valve, or the like. During a non-shift operation in which a predetermined speed of the automatic transmission is kept, the linear solenoid valve 1 is, for example, placed in a regulated state as shown in FIG. 27 in which hydraulic pressure is balanced to thereby supply the required engagement hydraulic pressure to the corresponding hydraulic friction engagement device 2. The regulated state of the linear solenoid valve 1 is, for example, balanced when $P_C \times A + F_{SP} = F$ is satisfied and is expressed by $P_C = (F - F_{SP})/A$ where the engagement hydraulic pressure, that is, the output hydraulic pressure of the linear solenoid valve 1, is $P_C$, the driving force of an electromagnetic valve is F, the reaction force (urging force) of a spring 3 is $F_{SP}$, and the area of a spool valve element 5, receiving the output hydraulic pressure $P_C$ introduced into a feedback oil chamber 4, is A. In consideration of the fact that the output hydraulic pressure $P_C$ that exceeds the line hydraulic pressure PL, which is the source pressure, cannot be obtained in terms of the driving characteristic of the linear solenoid valve 1 shown in FIG. 27, when the required engagement hydraulic pressure is set as the line hydraulic pressure PL in a steady state during a non-shift operation, it is only necessary that a hydraulic pressure command value, that is, a driving current, for the linear solenoid valve 1 is set so that the set output hydraulic pressure $P_C$ is equal to the line hydraulic pressure PL in order to minimize the power consumption of each linear solenoid valve 1.

Incidentally, in the above steady state in which the line hydraulic pressure PL is set as the output hydraulic pressure $P_C$, for example, when the estimated engine torque varies in accordance with an operating state of the vehicle, the set line hydraulic pressure PL is varied accordingly; however, there is a possibility that the operating state of each linear solenoid valve 1 varies from the above regulated state because of a delay in response of an actual engine torque with respect to the estimated engine torque, variations (individual difference) of the linear solenoid valve 1, or the like. For example, although the hydraulic pressure command value of each linear solenoid valve 1 is supposed to correspond to the line hydraulic pressure PL to form the regulated state shown in FIG. 27, the spool valve element 5 is actually displaced toward the spring 3 with respect to a position in the regulated state to thereby place the linear solenoid valve 1 in a non-regulated state where an input port 6 that introduces the line hydraulic pressure PL is open. Then, during a shift operation of the automatic transmission thereafter, there is a possibility that, when a drain port 7 of the linear solenoid valve 1 is opened to vary the output hydraulic pressure (engagement hydraulic pressure) $P_C$ output from the linear solenoid valve 1 toward zero in order to release the hydraulic friction engagement device 2, the response of hydraulic pressure is fast when starting from the regulated state and is slow when starting from the non-regulated state where the input port 6 is open. FIG. 28 is a graph that shows an example of variations in response time (•-• in the graph) and median values of the variations (alternate long and short dashed line in the graph) when the hydraulic friction engagement device 2 is released in a state where the line hydraulic pressure PL is set as the output hydraulic pressure $P_C$ in the steady state. In the variations of FIG. 28, the regulated state corresponds to an end of each bar, of which a response time is short, and the non-regulated state where the input port 6 is open corresponds to the other end of each bar, of which a response time is long. In addition, as the source pressure (that is, line hydraulic pressure PL) before the automatic transmission starts shifting decreases, an amplitude from the median value toward the end of each bar, corresponding to the non-regulated state where the input port 6 is open, increases, so variations in response time also increase. In this way, there is a possibility that the operating state of the linear solenoid valve 1 varies to thereby cause a difference in response of the output hydraulic pressure of each linear solenoid valve 1. Therefore, there is a possibility that the response of each engagement hydraulic pressure $P_C$ becomes a variable factor to thereby, for example, influence the releasing performance of a release-side hydraulic friction engagement device during a shift operation. In addition, there is a possibility that each linear solenoid valve 1 causes a difference in step response in an initial current at the time of start of shift operation due to an individual difference, or the like, of the linear solenoid valve 1. Thus, robustness of shift operation is lost because of such variations in response. As a result, this may cause an increase in shift shock. Note that it is conceivable that the hydraulic pressure command value of the linear solenoid valve 1 is set so that the set output hydraulic pressure $P_C$ becomes the maximum hydraulic pressure of the linear solenoid valve 1 in consideration of variations in terms of design although the output hydraulic pressure $P_C$ becomes the line hydraulic pressure PL similarly to thereby reduce the above described variations in response. However, the linear solenoid valve 1 is driven at the maximum power and, therefore, the power consumption of each linear solenoid valve 1 is maximal, so there is a possibility that fuel economy deteriorates. As described above, there has not been suggested that the response of the output hydraulic pressure (engagement hydraulic pressure) is stabilized while saving the power consumption of each linear solenoid valve.

SUMMARY OF THE INVENTION

The invention provides a hydraulic control device and hydraulic control method for a vehicle automatic transmission, which is able to stabilize the response of an engagement hydraulic pressure applied to a hydraulic friction engagement device while suppressing the power consumption of an electromagnetic valve device.

A first aspect of the invention relates to a hydraulic control device for a vehicle automatic transmission in which a plurality of hydraulic friction engagement devices are selectively engaged to establish a plurality of speeds having different speed ratios. The hydraulic control device includes: a hydraulic control unit that uses an electromagnetic valve device to control engagement hydraulic pressures supplied to the respective hydraulic friction engagement devices; an estimated torque calculation unit that calculates an input torque related value of the vehicle automatic transmission; and a line hydraulic pressure setting unit that sets a line hydraulic pressure on the basis of the input torque related value, the line hydraulic pressure being a source pressure for controlling the engagement hydraulic pressures applied to the respective hydraulic friction engagement devices. During a non-actual shift operation time when a predetermined speed of the vehicle automatic transmission is kept, the hydraulic control unit increases the engagement hydraulic pressure applied to the hydraulic friction engagement device associated with formation of the predetermined speed by a predetermined hydraulic pressure with respect to the line hydraulic pressure.

By so doing, during a non-actual shift operation time when a predetermined speed of the vehicle automatic transmission is kept, the hydraulic control unit increases the engagement hydraulic pressure applied to the hydraulic friction engagement device associated with formation of the predetermined speed by a predetermined hydraulic pressure with respect to the line hydraulic pressure. Thus, in comparison with the case where a pressure equivalent to the line hydraulic pressure is set as the engagement hydraulic pressure applied to the hydraulic friction engagement device in order to obtain a hydraulic pressure equivalent to the line hydraulic pressure as the engagement hydraulic pressure applied to the hydraulic friction engagement device, a hydraulic pressure that exceeds the line hydraulic pressure is not actually supplied to the hydraulic friction engagement device similarly; however, the margin of the predetermined hydraulic pressure prevents a situation that the operating state of the electromagnetic valve device deviates from a desired state because of a delay in response of an actual input torque related value against a variation in an estimated input torque related value based on which the line hydraulic pressure is set, variations of the electromagnetic valve device, or the like. Thus, variations of shift response (hydraulic pressure response) when shifting from a non-shift state (steady state) into a shift state are suppressed. Moreover, in comparison with the case where the engagement hydraulic pressure applied to the hydraulic friction engagement device is set to the maximum hydraulic pressure, that is, the driving force of the electromagnetic valve device is maximized, in order to reduce variations of the response, the power consumption of the electromagnetic valve device is suppressed. Thus, the hydraulic control device for a vehicle automatic transmission, which is able to stabilize the response of the engagement hydraulic pressure applied to the hydraulic friction engagement device while suppressing the power consumption of the electromagnetic valve device, is provided. By so doing, it is possible to, for example, stabilize the response of an engagement hydraulic pressure applied to a release-side hydraulic friction engagement device, that is, releasing performance (shift characteristic) of the release-side hydraulic friction engagement device, at the time of a shift operation.

Here, the electromagnetic valve device may have an input port for introducing the line hydraulic pressure and a supply port for supplying the engagement hydraulic pressure to the hydraulic friction engagement device, and the predetermined hydraulic pressure may be predetermined so as to be added to the line hydraulic pressure in order to open both the input port and the supply port while providing fluid communication between the input port and the supply port and in order to place the electromagnetic valve device in a non-regulated state. By so doing, the response of an output hydraulic pressure from the electromagnetic valve device (regulating response, shift hydraulic pressure response) when shifting from a non-shift state (steady state) into a shift state is always started from the non-regulated state where the input port is open, so variations of the response are reliably suppressed. In addition, a minimum hydraulic pressure is set to place the electromagnetic valve device in the non-regulated state where the input port is open, so the power consumption of the electromagnetic valve device is reliably suppressed.

In addition, the predetermined hydraulic pressure may be predetermined so as to place the electromagnetic valve device in the non-regulated state, where the input port is open, on the basis of a variable factor associated with control of the engagement hydraulic pressure applied to the hydraulic friction engagement device using the electromagnetic valve device. By so doing, by setting the engagement hydraulic pressure applied to the hydraulic friction engagement device, that is, the output hydraulic pressure of the electromagnetic valve device, which is obtained by adding the predetermined hydraulic pressure to the line hydraulic pressure, the electromagnetic valve device is appropriately placed in the non-regulated state where the input port is open.

In addition, the hydraulic control device may further include an oil pump that generates a hydraulic fluid pressure as the oil pump is driven for rotation by a driving force source, the hydraulic fluid pressure being a source pressure of the line hydraulic pressure, wherein the hydraulic control unit may change the predetermined hydraulic pressure on the basis of a predetermined amount of increase from a set value of the line hydraulic pressure with an increase in discharge flow rate of the oil pump. By so doing, an actual line hydraulic pressure is increased with respect to the set value of the line hydraulic pressure with an increase in discharge flow rate of the oil pump, so this can avoid a possible situation that addition of a constant margin of the predetermined hydraulic pressure does not suffice the set engagement hydraulic pressure applied to a corresponding one of the hydraulic friction engagement devices.

In addition, by referring to a predetermined relationship in which an actual line hydraulic pressure is increased with respect to the set line hydraulic pressure as an oil pump rotational speed related value related to a rotational speed of the oil pump increases, on the basis of an actual oil pump rotational speed related value, the hydraulic control unit may decrease the predetermined hydraulic pressure as the actual oil pump rotational speed related value decreases, and may increase the predetermined hydraulic pressure as the actual oil pump rotational speed related value increases. This appropriately avoids a situation that the set engagement hydraulic pressure applied to the hydraulic friction engagement device is insufficient.

A second aspect of the invention relates to a hydraulic control device for a vehicle automatic transmission in which a plurality of hydraulic friction engagement devices are selectively engaged to establish a plurality of speeds having different speed ratios. The hydraulic control device includes: a hydraulic control unit that uses an electromagnetic valve device to control engagement hydraulic pressures supplied to the respective hydraulic friction engagement devices; and an estimated torque calculation unit that calculates an input torque related value of the vehicle automatic transmission. During a non-shift operation in which a predetermined speed of the vehicle automatic transmission is kept, the hydraulic control unit may set the engagement hydraulic pressure applied to the hydraulic friction engagement device associated with formation of the predetermined speed to a hydraulic pressure based on the input torque related value to thereby place the electromagnetic valve device in a regulated state, while, during a shift operation of the vehicle automatic transmission, prior to a start of releasing control of a release-side hydraulic friction engagement device of the hydraulic friction engagement devices, the hydraulic control unit may temporarily increase the engagement hydraulic pressure applied to the release-side hydraulic friction engagement device by a predetermined hydraulic pressure with respect to the engagement hydraulic pressure during the non-shift operation for a predetermined period of time.

By so doing, during a shift operation of the vehicle automatic transmission, the hydraulic control unit temporarily increases the engagement hydraulic pressure applied to the release-side hydraulic friction engagement device by the predetermined hydraulic pressure with respect to the engagement hydraulic pressure during the non-shift operation prior to a start of releasing control of the release-side hydraulic friction engagement device. Thus, in comparison with the case where the hydraulic pressure during the non-shift operation is directly set as the engagement hydraulic pressure applied to the release-side hydraulic friction engagement device, the margin of the predetermined hydraulic pressure that is set prior to a start of releasing control of the release-side hydraulic friction engagement device prevents, for example, a situation that the operating state of the electromagnetic valve device deviates from a desired state because of a delay in response of an actual input torque related value against a variation in an estimated input torque related value based on which the line hydraulic pressure is set, variations of the electromagnetic valve device, or the like, prior to a start of releasing control. Thus, variations of shift response (hydraulic pressure response) when releasing control of the release-side hydraulic friction engagement device is started during a shift operation are suppressed. Moreover, in comparison with the case where the set engagement hydraulic pressure applied to the hydraulic friction engagement device associated with formation of the speed is increased by the predetermined hydraulic pressure even during a non-shift operation in order to reduce variations of the response, the power consumption of the electromagnetic valve device is suppressed. Thus, the hydraulic control device for a vehicle automatic transmission, which is able to stabilize the response of the engagement hydraulic pressure to the hydraulic friction engagement device while suppressing the power consumption of the electromagnetic valve device, is provided. By so doing, it is possible to, for example, stabilize the response of the engagement hydraulic pressure applied to the release-side hydraulic friction engagement device, that is, releasing performance (shift characteristic) of the release-side hydraulic friction engagement device, at the time of a shift operation.

Here, the hydraulic control device may further include a line hydraulic pressure setting unit that sets a line hydraulic pressure on the basis of the input torque related value, the line hydraulic pressure being a source pressure for controlling the engagement hydraulic pressures applied to the respective hydraulic friction engagement devices, wherein the hydraulic control unit may set the engagement hydraulic pressure during the non-shift operation to the line hydraulic pressure. By so doing, during a non-shift operation, the power consumption of the electromagnetic valve device may be suppressed as much as possible.

In addition, the engagement hydraulic pressure, which is applied to the release-side hydraulic friction engagement device and is increased by the predetermined hydraulic pressure with respect to the engagement hydraulic pressure during the non-shift operation, may be a predetermined maximum hydraulic pressure that can be output from the electromagnetic valve device. By so doing, when releasing control of the release-side hydraulic friction engagement device is started, the response of the engagement hydraulic pressure applied to the release-side hydraulic friction engagement device begins from a constant non-regulated state where the output hydraulic pressure of the electromagnetic valve device is set to the maximum hydraulic pressure, so variations of the shift response are reliably suppressed. In addition, the maximum hydraulic pressure for placing the electromagnetic valve device in the non-regulated state is temporarily set immediately before releasing control, so the power consumption of the electromagnetic valve device is reliably suppressed.

In addition, the electromagnetic valve device may have an input port for introducing a source pressure used for controlling the engagement hydraulic pressure and a supply port for supplying the engagement hydraulic pressure to the release-side hydraulic friction engagement device, and the predetermined hydraulic pressure may be predetermined so as to be added to the engagement hydraulic pressure during the non-shift operation in order to open both the input port and the supply port while providing fluid communication between the input port and the supply port and in order to place the electromagnetic valve device in a non-regulated state. By so doing, when releasing control of the release-side hydraulic friction engagement device is started, the response of the engagement hydraulic pressure applied to the release-side hydraulic friction engagement device, that is, the response of the output hydraulic pressure of the electromagnetic valve device, begins from the constant non-regulated state where the input port is open, so variations of the shift response are reliably suppressed. In addition, the hydraulic pressure for placing the electromagnetic valve device in the non-regulated state where the input port is open is temporarily set immediately before a start of the releasing control, so the power consumption of the electromagnetic valve device is reliably suppressed.

In addition, the hydraulic control unit may change the predetermined hydraulic pressure on the basis of a predetermined amount of increase in hydraulic fluid pressure, generated by an oil pump, with an increase in discharge flow rate of the oil pump, the hydraulic fluid pressure being a source pressure for controlling the engagement hydraulic pressure. By so doing, an actual source pressure is increased with respect to the set value of a source pressure for controlling the engagement hydraulic pressure with an increase in discharge flow rate of the oil pump, so this can avoid a possible situation that addition of a constant margin of the predetermined hydraulic pressure does not suffice the set engagement hydraulic pressure applied to a corresponding one of the hydraulic friction engagement devices.

In addition, by referring to a predetermined relationship in which an actual line hydraulic pressure is increased with respect to the set line hydraulic pressure as an oil pump rotational speed related value related to a rotational speed of the oil pump increases, on the basis of an actual oil pump rotational speed related value, the hydraulic control unit may decrease the predetermined hydraulic pressure as the actual oil pump rotational speed related value decreases, and may increase the predetermined hydraulic pressure as the actual oil pump rotational speed related value increases. This appropriately avoids a situation that the set engagement hydraulic pressure applied to the hydraulic friction engagement device is insufficient.

In addition, the predetermined period of time may be a predetermined constant standby time from the time point of shift determination based on a predetermined relationship for determining whether to shift the vehicle automatic transmission to the time point at which a predetermined shift command for changing an engagement state of at least any one of the hydraulic friction engagement devices is started to be output on the basis of the shift determination. By so doing, a constant period of time for temporarily increasing the set engagement hydraulic pressure applied to the release-side hydraulic friction engagement device by the predetermined hydraulic pressure with respect to the set engagement hydraulic pressure during the non-shift operation prior to a start of releasing control of the release-side hydraulic friction engagement device is appropriately set. In addition, by utilizing the constant standby time that is originally set for shift control, the engagement hydraulic pressure applied to the release-side hydraulic friction engagement device may be temporarily increased by the predetermined hydraulic pressure immediately before a start of the releasing control.

In addition, the hydraulic control unit may increase the engagement hydraulic pressure applied to the release-side hydraulic friction engagement device by the predetermined hydraulic pressure with respect to the engagement hydraulic pressure during the non-shift operation for the predetermined period of time from the time point of shift determination based on a predetermined relationship for determining whether to shift the vehicle automatic transmission, and then may start releasing control of the release-side hydraulic friction engagement device. By so doing, a constant period of time for temporarily increasing the set engagement hydraulic pressure applied to the release-side hydraulic friction engagement device by the predetermined hydraulic pressure with respect to the set engagement hydraulic pressure during the non-shift operation prior to a start of releasing control of the release-side hydraulic friction engagement device is appropriately set.

In addition, the hydraulic control unit may delay a start of engaging control of an engage-side hydraulic friction engagement device of the hydraulic friction engagement devices by at least the predetermined period of time. This appropriately advances a shift operation through releasing control of the release-side hydraulic friction engagement device and engaging control of the engage-side hydraulic friction engagement device.

In addition, during a shift operation of the vehicle automatic transmission, the hydraulic control unit may temporarily increase the engagement hydraulic pressure applied to an engaged hydraulic friction engagement device, which is not associated with the shift operation but associated with formation of the predetermined speed, by a second predetermined hydraulic pressure with respect to the engagement hydraulic pressure during the non-shift operation for a second predetermined period of time during the shift operation. That is, irrespective of whether the subsequent shift operation is started before completion of the current shift operation, during the current shift operation, the engagement hydraulic pressure applied to the engaged hydraulic friction engagement device that possibly becomes the release-side hydraulic friction engagement device during the subsequent shift operation is increased by the second predetermined hydraulic pressure with respect to the engagement hydraulic pressure during a non-shift operation. By so doing, the engagement hydraulic pressure of the release-side hydraulic friction engagement device has been already increased by the second predetermined hydraulic pressure during the current shift operation at the time when the subsequent shift operation is started during the current shift operation, so it is not necessary to provide the predetermined period of time for increasing the engagement hydraulic pressure applied to the release-side hydraulic friction engagement device by the predetermined hydraulic pressure prior to a start of releasing control of the release-side hydraulic friction engagement device at the time of the subsequent shift operation started during the current shift operation. Thus, of course, it is possible to stabilize the response of the engagement hydraulic pressure applied to the release-side hydraulic friction engagement device, that is, releasing performance (shift performance) of the release-side hydraulic friction engagement device at the time of the subsequent shift operation that is started during the current shift operation, and, in addition, the subsequent shift operation is promptly started in comparison with the case where the predetermined period of time is provided again at the time of the subsequent shift operation that is started during the current shift operation.

In addition, the engagement hydraulic pressure, which is applied to the engaged hydraulic friction engagement device and is increased by the second predetermined hydraulic pressure with respect to the engagement hydraulic pressure during the non-shift operation, may be a predetermined maximum hydraulic pressure that can be output from the electromagnetic valve device. By so doing, when releasing control of the release-side hydraulic friction engagement device is started at the time of the subsequent shift operation that is started during the current shift operation, the response of the engagement hydraulic pressure applied to the release-side hydraulic friction engagement device begins from the constant non-regulated state where the output hydraulic pressure of the electromagnetic valve device is set to the maximum hydraulic pressure, so variations of the shift response are reliably suppressed. In addition, the maximum hydraulic pressure for placing the electromagnetic valve device in the non-regulated state is temporarily set for the second predetermined period of time within the current shift operation, so the power consumption of the electromagnetic valve device is reliably suppressed.

In addition, the electromagnetic valve device that controls an engagement hydraulic pressure applied to the engaged hydraulic friction engagement device may have an input port for introducing a source pressure used for controlling the engagement hydraulic pressure and a supply port for supplying the engagement hydraulic pressure, and the second predetermined hydraulic pressure may be predetermined so as to be added to the engagement hydraulic pressure during the non-shift operation in order to open both the input port and the supply port while providing fluid communication between the input port and the supply port and in order to place the electromagnetic valve device in a non-regulated state. By so doing, when releasing control of the release-side hydraulic friction engagement device is started at the time of the subsequent shift operation that is started during the current shift operation, the response of the engagement hydraulic pressure applied to the release-side hydraulic friction engagement device, that is, the response of the output hydraulic pressure of the electromagnetic valve device, begins from the constant non-regulated state where the input port is open, so variations of the shift response are reliably suppressed. In addition, the hydraulic pressure for placing the electromagnetic valve device in the non-regulated state where the input port is open is temporarily set for the second predetermined period of time during the current shift operation, so the power consumption of the electromagnetic valve device is reliably suppressed.

In addition, the hydraulic control unit may change the second predetermined hydraulic pressure on the basis of a predetermined amount of increase in hydraulic fluid pressure, generated by an oil pump, with an increase in discharge flow rate of the oil pump, the hydraulic fluid pressure being a source pressure for controlling the engagement hydraulic pressure. By so doing, an actual source pressure is increased with respect to the set value of a source pressure for controlling the engagement hydraulic pressure with an increase in discharge flow rate of the oil pump, so this can avoid a possible situation that addition of a constant margin of the second predetermined hydraulic pressure does not suffice the set engagement hydraulic pressure applied to a corresponding one of the hydraulic friction engagement devices.

In addition, by referring to a predetermined relationship in which an actual line hydraulic pressure is increased with respect to the set line hydraulic pressure as an oil pump rotational speed related value related to a rotational speed of the oil pump increases, on the basis of an actual oil pump rotational speed related value, the hydraulic control unit may decrease the second predetermined hydraulic pressure as the actual oil pump rotational speed related value decreases, and may increase the second predetermined hydraulic pressure as the actual oil pump rotational speed related value increases. This appropriately avoids a situation that the set engagement hydraulic pressure applied to the hydraulic friction engagement device is insufficient.

In addition, when a second shift operation is started during a current shift operation of the vehicle automatic transmission, the second predetermined period of time may be a period of time until hydraulic pressure control for the second shift operation is started during the current shift operation. By so doing, a period of time for temporarily increasing the engagement hydraulic pressure applied to the engaged hydraulic friction engagement device by the second predetermined hydraulic pressure with respect to the engagement hydraulic pressure during the non-shift operation in preparation for the subsequent shift operation that can be possibly started during the current shift operation is appropriately set.

In addition, when a second shift operation is not started during a current shift operation of the vehicle automatic transmission, the second predetermined period of time may be a period of time until hydraulic pressure control for the current shift operation is completed. By so doing, a period of time for temporarily increasing the engagement hydraulic pressure applied to the engaged hydraulic friction engagement device by the second predetermined hydraulic pressure with respect to the engagement hydraulic pressure during the non-shift operation in preparation for the subsequent shift operation that can be possibly started during the current shift operation is appropriately set.

In addition, the second predetermined period of time may begin from the time point of an end of the predetermined period of time. By so doing, a period of time for temporarily increasing the engagement hydraulic pressure applied to the engaged hydraulic friction engagement device by the second predetermined hydraulic pressure with respect to the engagement hydraulic pressure during the non-shift operation in preparation for the subsequent shift operation that can be possibly started during the current shift operation is appropriately set.

In addition, the second predetermined period of time may begin from the time point of a start of the predetermined period of time. By so doing, a period of time for temporarily increasing the engagement hydraulic pressure applied to the engaged hydraulic friction engagement device by the second predetermined hydraulic pressure with respect to the engagement hydraulic pressure during the non-shift operation in preparation for the subsequent shift operation that can be possibly started during the current shift operation is appropriately set.

In addition, the vehicle automatic transmission may be formed of various planetary gear-type multistage transmission that have, for example, four forward gears, five forward gears, six forward gears or further more gears, in which rotating elements of a plurality of planetary gears sets are selectively coupled by the hydraulic friction engagement devices to establish one of a plurality of gears (speeds). A friction engagement device, such as a multiple or single disk clutch and a multiple or single disk brake, that is engaged by a hydraulic actuator is widely used as each of the hydraulic friction engagement devices in the planetary gear-type multistage transmission. The oil pump that supplies hydraulic fluid for engaging the hydraulic friction engagement device may discharge hydraulic fluid as it is driven by a driving force source for propelling the vehicle; instead, for example, the oil pump may be driven by an exclusive electric motor, or the like, provided separately from the driving force source.

In addition, it is desirable in terms of response that a hydraulic pressure control circuit that includes the hydraulic friction engagement devices directly supplies the output hydraulic pressures of, for example, linear solenoid valves serving as electromagnetic valve devices to respective hydraulic actuators (hydraulic cylinders) of the hydraulic friction engagement devices; however, it is also applicable that the output hydraulic pressures of the linear solenoid valves are used as pilot hydraulic pressures to control a shift control valve to thereby supply hydraulic fluid from the shift control valve to the hydraulic actuators.

In addition, the linear solenoid valves are, for example, provided in one-to-one correspondence with the plurality of hydraulic friction engagement devices; however, when there are a plurality of hydraulic friction engagement devices that are not engaged at the same time or subjected to engaging or releasing control, for example, a linear solenoid valve common to those friction engagement devices may be provided. In this way, various modes are possible. In addition, it is not always necessary to carry out hydraulic pressure control of all the hydraulic friction engagement devices using the linear solenoid valve; part of or all hydraulic pressure control may be carried out using a pressure regulating device other than the linear solenoid valve by means of duty control of an on-off solenoid valve, or the like.

In addition, an internal combustion engine, such as a gasoline engine and a diesel engine, is widely used as the driving force source. Furthermore, an electric motor, or the like, may be used as an auxiliary driving force source for propelling the vehicle in addition to the engine. Alternatively, only an electric motor may be used as a driving force source for propelling the vehicle.

A third aspect of the invention relates to a hydraulic control method for a vehicle automatic transmission in which a plurality of hydraulic friction engagement devices are selectively engaged to establish a plurality of speeds having different speed ratios. The hydraulic control method includes: determining whether to shift the automatic transmission; and increasing a hydraulic pressure applied to the hydraulic friction engagement device associated with formation of a post-shift speed by a predetermined hydraulic pressure with respect to a line hydraulic pressure for keeping a current speed for a period of time from when it is determined to shift the automatic transmission to the time point of at least a start of an actual shift operation.

Note that, when the phrase "supplying a hydraulic pressure" is used in this specification, it means that "applying a hydraulic pressure" or "supplying hydraulic fluid regulated to the hydraulic pressure".

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3 is a block diagram that illustrates a relevant portion of an electrical control system provided for a vehicle in order to control the vehicle automatic transmission shown in FIG. 1, or the like;

DETAILED DESCRIPTION OF EMBODIMENTS

First Embodiment

Figures 1, 2:
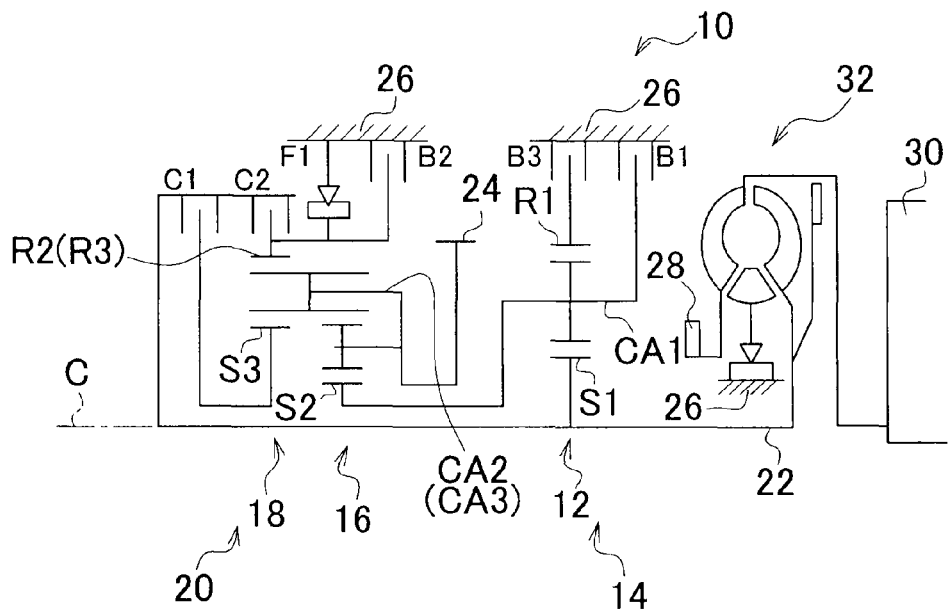
FIG. 1 is a skeleton diagram that illustrates the configuration of a vehicle automatic transmission according to an embodiment of the invention.
FIG. 2 is an operation table that illustrates combinations of operated friction engagement devices when a plurality of gears of the vehicle automatic transmission shown in FIG. 1 are established.

FIG. 1 is a skeleton diagram that illustrates the configuration of a vehicle automatic transmission 10 (hereinafter, referred to as automatic transmission 10). FIG. 2 is an operation table that illustrates operation states of friction engagement elements, that is, friction engagement devices, when a plurality of gears GS (speeds GS) of the automatic transmission 10 are established. The automatic transmission 10 is suitably used for an FF vehicle for which the automatic transmission 10 is mounted transversely of the vehicle. The automatic transmission 10 includes a first shift unit 14 and a second shift unit 20 that are arranged along a common axis C in a transmission case 26, which serves as a non-rotating member, secured to a vehicle body. The first shift unit 14 is mainly formed of a single pinion type first planetary gear set 12. The second shift unit 20 is mainly formed of a double pinion type second planetary gear set 16 and a single pinion type third planetary gear set 18 to constitute a Ravigneaux planetary gear train. The automatic transmission 10 shifts the rotation of an input shaft 22 in speed and then outputs the rotation from an output gear 24. The input shaft 22 corresponds to an input rotating member of the automatic transmission 10. In the present embodiment, the input shaft 22 is integrally formed with a turbine shaft of a torque converter 32 that is driven for rotation by an engine 30. The engine 30 serves as a driving force source for propelling the vehicle. The torque converter 32 serves as a fluid transmission device. In addition, the output gear 24 corresponds to an output rotating member of the automatic transmission 10. In the present embodiment, for example, in order to transmit power to a differential gear unit 34 shown in FIG. 3, the output gear 24 functions as a counter drive gear that is in mesh with a counter driven gear to constitute a counter gear pair. The counter driven gear is arranged coaxially with a differential drive pinion that is in mesh with a differential ring gear 36 to constitute a final gear pair. Then, in the thus configured automatic transmission 10, and the like, the output of the engine 30 is transmitted sequentially through the torque converter 32, the automatic transmission 10, the differential gear unit 34, a pair of axles 38, and the like, to right and left driving wheels 40 (see FIG. 3). Note that the automatic transmission 10 and the torque converter 32 each are formed substantially symmetrical with respect to a central axis (axis) C, and the lower half below the axis C is omitted in the skeleton diagram shown in FIG. 1.

The automatic transmission 10 establishes six forward gears (forward speeds) of first gear "1st" to sixth gear "6th" in accordance with a combination of coupled states of any rotating elements selected from rotating elements (sun gears S1 to S3, carriers CA1 to CA3 and ring gears R1 to R3) of the first shift unit 14 and second shift unit 20, and establishes a reverse gear (reverse speed) of reverse gear "R". As shown in FIG. 2, for example, in the forward gears, the clutch C1 and the brake B2 are engaged to establish the first gear, the clutch C1 and the brake B1 are engaged to establish the second gear, the clutch C1 and the brake B3 are engaged to establish the third gear, the clutch C1 and the clutch C2 are engaged to establish the fourth gear, the clutch C2 and the brake B3 are engaged to establish the fifth gear, and the clutch C2 and the brake B1 are engaged to establish the sixth gear. In addition, the brake B2 and the brake B3 are engaged to establish the reverse gear, and all of the clutches C1 and C2 and brakes B1 to B3 are released to enter a neutral state.

The operation table of FIG. 2 collectively shows the relationship between the gears GS and the operating states of the clutches C1 and C2 and brakes B1 to B3. The mark "circle" represents "engaged", and the mark "double circle" represents "engaged only during engine braking". Note that, because a one-way clutch F1 is provided in parallel with the brake B2 that establishes the first gear "1st", it is not always necessary to engage the brake B2 at the time of a start of running (accelerating) the vehicle. In addition, the speed ratio γGS (=the rotational speed $N_{IN}$ of the input shaft 22/the rotational speed $N_{OUT}$ of the output gear 24) of each gear GS is appropriately determined by the gear ratios (=the number of teeth of the sun gear/the number of teeth of the ring gear) p1, p2 and p3 of the first planetary gear set 12, second planetary gear set 16 and third planetary gear set 18.

The clutches C1 and C2 and the brakes B1 to B3 (hereinafter, simply referred to as clutches C and brakes B when it is not necessary to distinguish them from one another) are hydraulic friction engagement elements (hydraulic friction engagement devices) that are controlled by hydraulic actuators for engagement, such as multiple disk clutches or multiple disk brakes. Then, linear solenoid valves SL1 to SL5 (see FIG. 3) in a hydraulic pressure control circuit 50 are energized, de-energized or subjected to current control to thereby switch between engaged and released states of the clutches C and brakes B while transitional engagement hydraulic pressures, and the like, during engaging and releasing are controlled.

Figure 3:
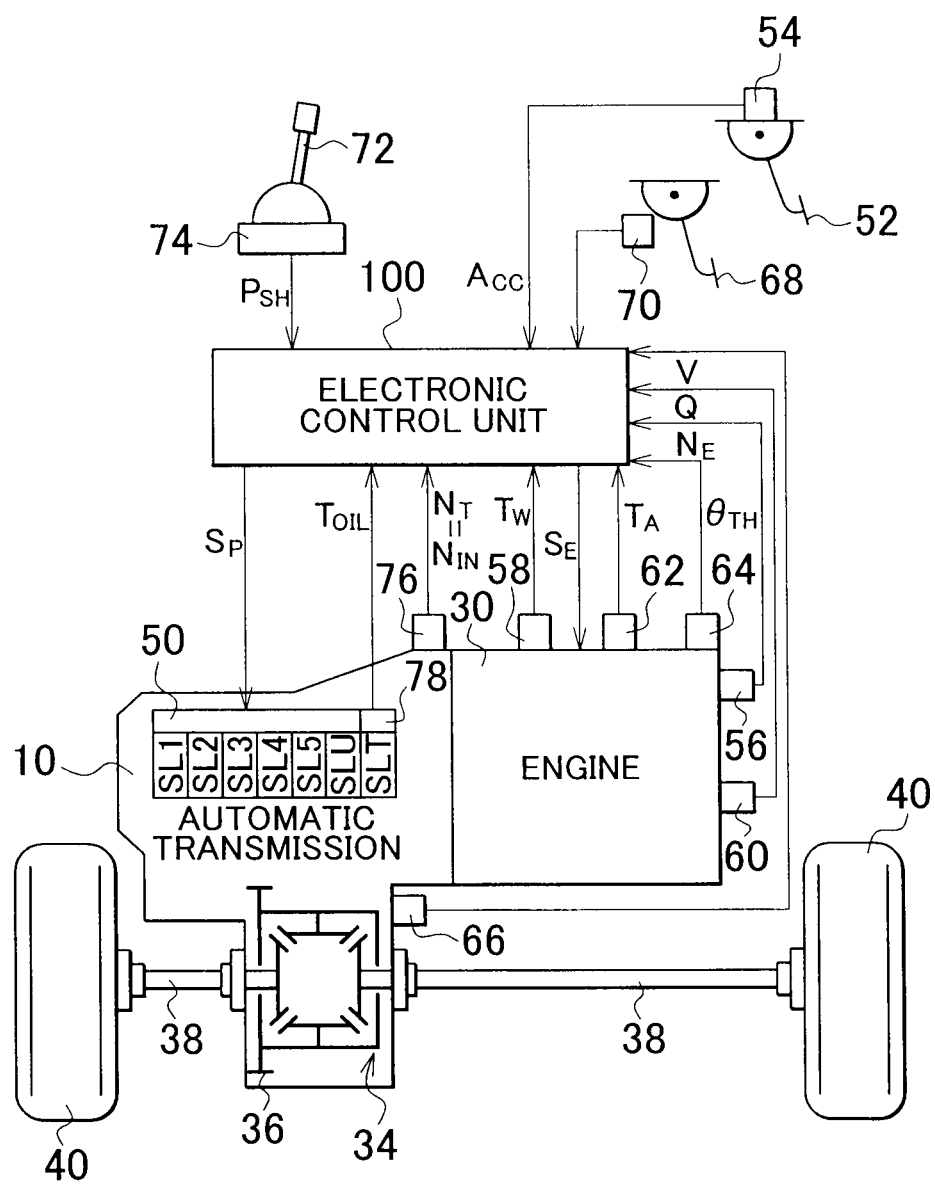

FIG. 3 is a block diagram that illustrates a relevant portion of an electrical control system provided for the vehicle in order to control the automatic transmission 10 shown in FIG. 1, or the like. An electronic control unit 100 is configured to include a so-called microcomputer that includes, for example, a CPU, a RAM, a ROM, an input/output interface, and the like. The CPU utilizes the temporary storage function of the RAM while handling signal processing in accordance with a program stored in the ROM beforehand to thereby execute output power control of the engine 30, shift control of the automatic transmission 10, and the like. The CPU is, where necessary, separately formed into an engine control unit for engine control, a hydraulic control unit for shift control to control the linear solenoid valves SL1 to SL5, and the like.

As shown in FIG. 3, an accelerator operation amount sensor 54, an engine rotational speed sensor 56, a coolant temperature sensor 58, an intake air flow rate sensor 60, an intake air temperature sensor 62, a throttle valve opening degree sensor 64, a vehicle speed sensor 66, a brake switch 70, a lever position sensor 74, a turbine rotational speed sensor 76, a hydraulic fluid temperature sensor 78, and the like, are provided. The accelerator operation amount sensor 54 is used to detect a so-called accelerator operation amount Acc, which is an amount by which an accelerator pedal 52 is operated as a driver's demand on the vehicle (driver's demand). The engine rotational speed sensor 56 is used to detect a rotational speed $N_E$ of the engine 30, which is a rotational speed of a driving force source. The coolant temperature sensor 58 is used to detect a coolant temperature $T_W$ of the engine 30. The intake air flow rate sensor 60 is used to detect an intake air flow rate Q of the engine 30. The intake air temperature sensor 62 is used to detect a temperature $T_A$ of intake air. The throttle valve opening degree sensor 64 is used to detect an opening degree $\theta_{TH}$ of an electronic throttle valve. The vehicle speed sensor 66 is used to detect a vehicle speed V (corresponding to the rotational speed $N_{OUT}$ of the output gear 24). The brake switch 70 is used to detect whether a foot brake pedal 68, which is a service brake, is operated. The lever position sensor 74 is used to detect a lever position (operating position) $P_{SH}$ of a shift lever 72. The turbine rotational speed sensor 76 is used to detect a turbine rotational speed $N_T$, that is, a rotational speed $N_{IN}$ of the input shaft 22. The hydraulic fluid temperature sensor 78 is used to detect a hydraulic fluid temperature $T_{OIL}$, which is a temperature of hydraulic fluid in the hydraulic pressure control circuit 50. From those sensors, switch, and the like, signals that indicate an accelerator operation amount Acc, an engine rotational speed $N_E$, an engine coolant temperature $T_W$, an intake air flow rate Q, an intake air temperature $T_A$, a throttle valve opening degree $\theta_{TH}$, a vehicle speed V, an output rotational speed $N_{OUT}$, presence or absence of braking operation, a lever position $P_{SH}$ of the shift lever 72, a turbine rotational speed $N_T$ (=input rotational speed $N_{IN}$), a hydraulic fluid temperature $T_{OIL}$, and the like, are supplied to the electronic control unit 100.

In addition, the electronic control unit 100 outputs an engine output control command signal $S_E$ for output control of the engine 30, such as a driving signal supplied to a throttle actuator for controlling opening and closing of the electronic throttle valve in accordance with an accelerator operation amount Acc, an injection signal for controlling a fuel injection flow rate injected from a fuel injector and an ignition timing signal for controlling a timing at which the engine 30 is ignited by an ignitor. In addition, the electronic control unit 100 outputs a hydraulic pressure control command signal $S_P$ for shift control of the automatic transmission 10, such as a valve command signal (hydraulic pressure command value, driving signal) for controlling excitation, de-excitation, and the like, of each of the linear solenoid valves SL1 to SL5 in the hydraulic pressure control circuit 50 in order to shift the gear GS of the automatic transmission 10 and a driving signal supplied to a linear solenoid valve SLT for regulating a line hydraulic pressure PL.

Figure 4:
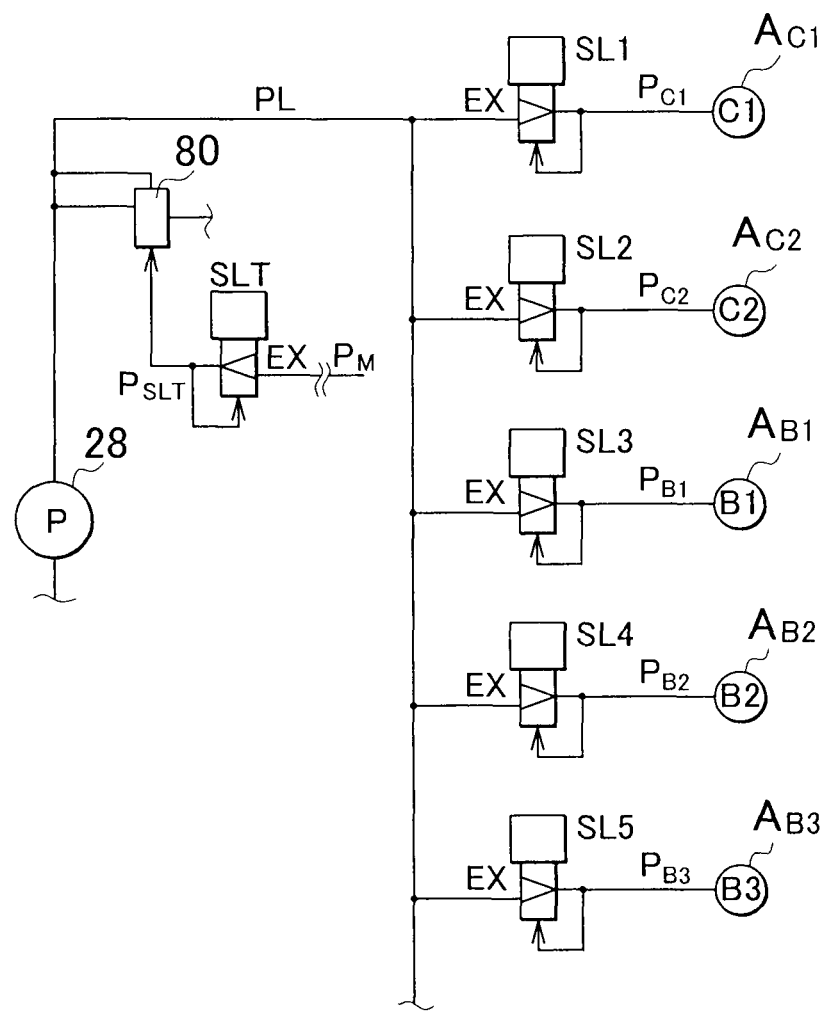
FIG. 4 is a circuit diagram related to linear solenoid valves that control the operations of hydraulic actuators of clutches and brakes in a hydraulic pressure control circuit shown in FIG. 3.

FIG. 4 is a circuit diagram related to the linear solenoid valves SL1 to SL5 serving as electromagnetic valve devices that control the operations of hydraulic actuators (hydraulic cylinders) $A_{C1}$, $A_{C2}$, $A_{B1}$, $A_{B2}$ and $A_{B3}$ of the clutches C1 and C2 and brakes B1 to B3 in the hydraulic pressure control circuit 50. As shown in FIG. 4, the line hydraulic pressure PL is regulated by the linear solenoid valves SL1 to SL5 to engagement hydraulic pressures $P_{C1}$, $P_{C2}$, $P_{B1}$, $P_{B2}$ and $P_{B3}$ in accordance with command signals from the electronic control unit 100, and then the engagement hydraulic pressures $P_{C1}$, $P_{C2}$, $P_{B1}$, $P_{B2}$ and $P_{B3}$ are directly supplied to the hydraulic actuators $A_{C1}$, $A_{C2}$, $A_{B1}$, $A_{B2}$ and $A_{B3}$, respectively. The line hydraulic pressure PL is, for example, regulated by a relief-type primary regulator valve (primary regulating valve) 80 using a hydraulic fluid pressure generated by a mechanical oil pump 28 that is driven for rotation by the engine 30 as a source pressure. For example, the line hydraulic pressure PL is regulated by the primary regulator valve 80 to a value corresponding to a signal pressure $P_{SLT}$ applied from the linear solenoid valve SLT driven by a driving signal supplied to the linear solenoid valve SlT on the basis of torque information, such as an engine torque $T_E$ and a transmission input torque $T_{IN}$, calculated from an engine load, or the like, represented by at least one of an accelerator operation amount Acc, an intake air flow rate Q, a throttle valve opening degree $\theta_{TH}$, a fuel injection flow rate, an ignition timing, and the like. Note that a modulator hydraulic pressure $P_{C1}$ is, for example, supplied to the linear solenoid valve SLT. The modulator hydraulic pressure $P_{C1}$ is regulated to a constant pressure by a modulator valve (not shown) using the line hydraulic pressure PL as a source pressure.

Each of the linear solenoid valves SL1 to SL5 has basically the same configuration. The linear solenoid valves SL1 to SL5 are separately excited or de-excited by the electronic control unit 100 to separately regulate hydraulic pressures applied to the hydraulic actuators $A_{C1}$, $A_{C2}$, $A_{B1}$, $A_{B2}$ and $A_{B3}$ to thereby control the engagement hydraulic pressures $P_{C1}$, $P_{C2}$, $P_{B1}$, $P_{B2}$ and $P_{B3}$ of the clutches C1 and C2 and brakes B1 to B3. Then, the automatic transmission 10 establishes each of the gears GS in such a manner that predetermined engagement devices are, for example, engaged as shown in the engagement operation table of FIG. 2. In addition, in shift control of the automatic transmission 10, a so-called clutch to clutch shift is performed. That is, for example, release of the release-side friction engagement device and engagement of the engage-side friction engagement device among the clutches C and brakes B associated with the shift operation are performed at the same time. During the clutch to clutch shift, a releasing transitional engagement hydraulic pressure of the release-side friction engagement device and an engaging transitional engagement hydraulic pressure of the engage-side friction engagement device are appropriately controlled so as to perform shift operation as fast as possible while suppressing a shift shock.

The release-side friction engagement device is a hydraulic friction engagement device that is released (newly released) in each clutch to clutch shift. For example, as shown in the engagement operation table of FIG. 2, the brake B1 corresponds to the release-side friction engagement device in the second to third upshift, the brake B3 corresponds to the release-side friction engagement device in the third to fourth upshift, the clutch C1 corresponds to the release-side friction engagement device in the fourth to fifth upshift, and the brake B3 corresponds to the release-side friction engagement device in the fifth to sixth upshift. In addition, the engage-side friction engagement device is a hydraulic friction engagement device that is engaged (newly engaged) in each clutch to clutch shift. For example, the brake B1 corresponds to the engage-side friction engagement device in the first to second upshift, the brake B3 corresponds to the engage-side friction engagement device in the second to third upshift, the clutch C2 corresponds to the engage-side friction engagement device in the third to fourth upshift, the brake B3 corresponds to the engage-side friction engagement device in the fourth to fifth upshift, and the brake B1 corresponds to the engage-side friction engagement device in the fifth to sixth upshift.

Figure 5:
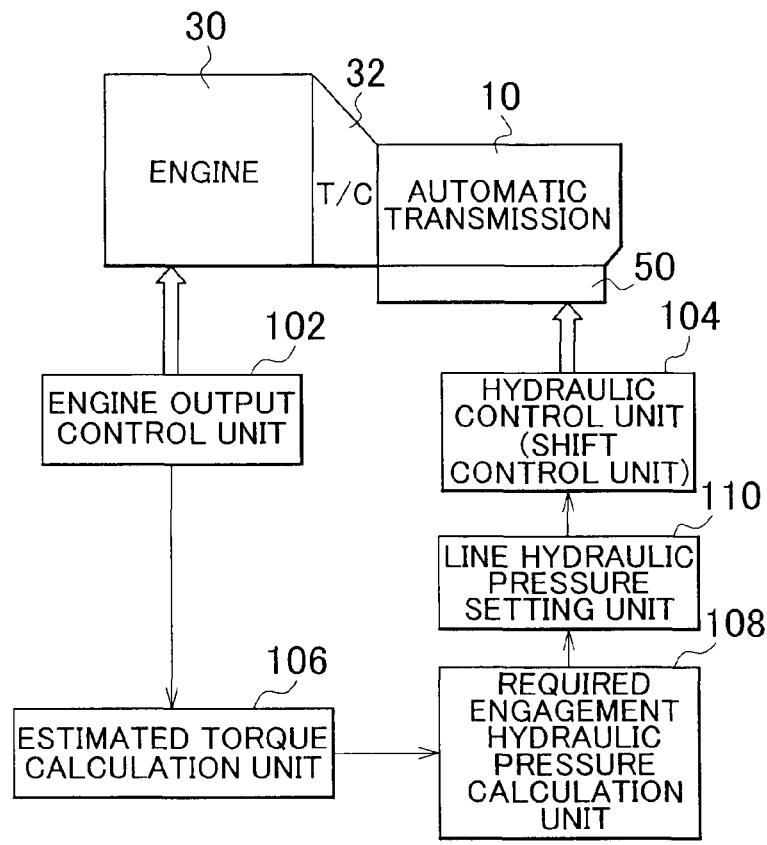
FIG. 5 is a functional block diagram that illustrates a relevant portion of control functions of an electronic control unit shown in FIG. 3.
Figure 6:
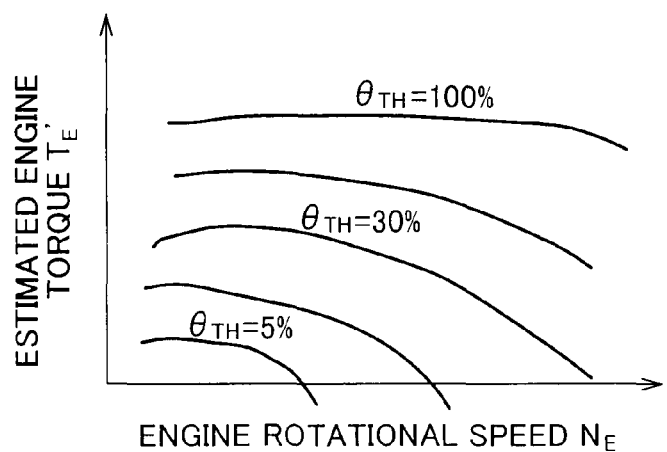
FIG. 6 is a graph that shows an example of an empirically obtained and prestored relationship (engine torque map) between an engine rotational speed and an estimated engine torque using a throttle valve opening degree as a parameter.

FIG. 5 is a functional block diagram that illustrates a relevant portion of control functions of the electronic control unit 100. In FIG. 5, an engine output control portion, that is, an engine output control unit 102, outputs an engine output control signal $S_E$ for controlling, for example, not only opening and closing of the electronic throttle valve using the throttle actuator but also the fuel injector for fuel injection flow rate control and the ignitor for ignition timing control. For example, the engine output control unit 102 controls opening and closing of the electronic throttle valve so as to obtain a throttle valve opening degree $\theta_{TH}$ that gives a target engine torque $T_E^*$ on the basis of an actual engine rotational speed $N_E$ by referring to the empirically obtained and prestored relationship (engine torque map) between an engine rotational speed $N_E$ and an estimated value (hereinafter, estimated engine torque) $T_E'$ of engine torque $T_E$ using a throttle valve opening degree $\theta_{TH}$ as a parameter as shown in FIG. 6. The target engine torque $T_E^*$ is, for example, calculated by the electronic control unit 100 on the basis of an accelerator operation amount Acc corresponding to driver's demand so as to increase with an increase in the accelerator operation amount Acc. The target engine torque $T_E^*$ corresponds to a driver's demand engine torque.

Figure 7:
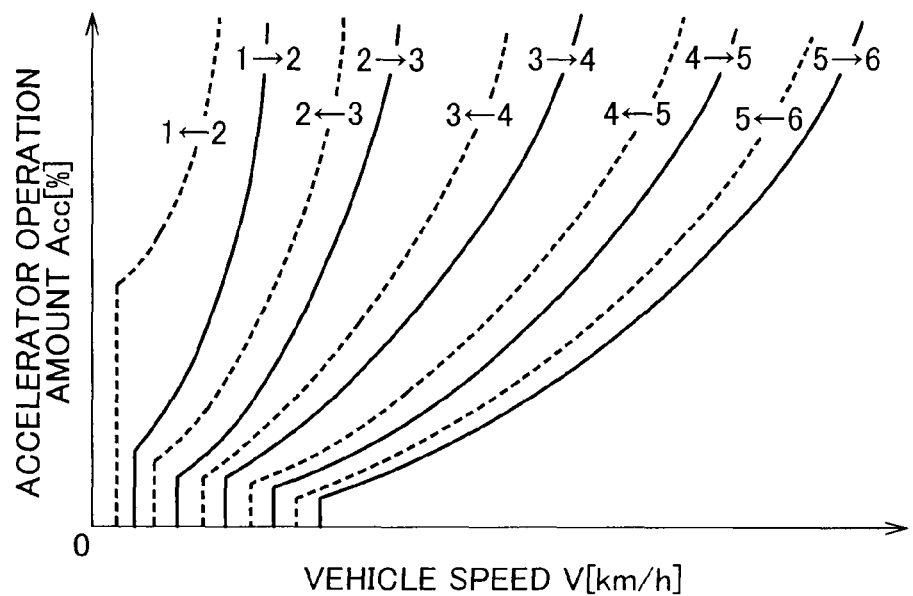
FIG. 7 is a graph that shows an example of a shift line map used in determining the gear of the vehicle automatic transmission shown in FIG. 1.

A hydraulic control portion, that is, a hydraulic control unit 104, controls excitation and de-excitation of each of the linear solenoid valves SL1 to SL5 to control the engagement hydraulic pressures $P_{C1}$, $P_{C2}$, $P_{B1}$, $P_{B2}$ and $P_{B3}$ applied to the clutches C1 and C2 and brakes B1 to B3 corresponding respectively to the linear solenoid valves SL1 to SL5 to thereby establish any one of gears. For example, the hydraulic control unit 104 outputs a hydraulic pressure control command signal (hydraulic pressure command value) $S_P$ to the hydraulic pressure control circuit 50 for selectively engaging the hydraulic friction engagement devices associated with establishment of the gear of the automatic transmission 10 in accordance with the engagement operation table shown in FIG. 2 and then keeping the gear. In addition, the hydraulic control unit 104, for example, makes a shift determination on the basis of an actual vehicle speed V and an actual accelerator operation amount Acc by referring to the prestored relationship (shift map, shift line map) using a vehicle speed V and an accelerator operation amount Acc as variables as shown in FIG. 7, and determines whether to shift the automatic transmission 10. Then, the hydraulic control unit 104 functions as a shift control portion, that is, a shift control unit that determines a gear into which the automatic transmission 10 should be shifted and then outputs a shift command for performing automatic shift control of the automatic transmission 10 so as to be able to obtain the determined gear. For example, the hydraulic control unit 104 outputs a hydraulic pressure control command signal (shift output command value) $S_P$ to the hydraulic pressure control circuit 50. The hydraulic pressure control command signal causes the hydraulic friction engagement devices associated with the shift operation of the automatic transmission 10 to be engaged and/or released so as to establish the gear in accordance with the engagement operation table shown in FIG. 2. In addition, when the hydraulic control unit 104 determines to shift the automatic transmission 10, the hydraulic control unit 104 starts to output a shift command (output a shift signal) after a lapse of a predetermined period of time T from the time point of the shift determination. That is, for example, the hydraulic control unit 104 does not output the hydraulic pressure control command signal $S_P$ until the predetermined period of time T elapses from when the hydraulic control unit 104 makes a shift determination on the basis of an actual vehicle speed V and an actual accelerator operation amount Acc by referring to a shift map shown in FIG. 7 and then determines to shift the automatic transmission 10.

The predetermined period of time T is, for example, a predetermined constant standby time from the time point of shift determination based on the predetermined shift map for determining whether to shift the automatic transmission 10 to the time point at which a predetermined shift command for changing the engagement states of the friction engagement devices is started to be output on the basis of the shift determination (for example, a shift signal for releasing control of the release-side friction engagement device and engaging control of the engage-side friction engagement device is output), and is a timer that is predetermined and set in order to ensure the robustness of shift control. Note that the phrase "ensure the robustness", for example, means that a shift determination is not unstable and it is ensured to allow the determined shift operation to be performed.

In the shift map shown in FIG. 7, the solid lines are shift lines (upshift lines) that are used for upshift determination, and the broken lines are shift lines (downshift lines) that are used for downshift determination. The shift lines in the shift map shown in FIG. 7 are used to determine, for example, whether, on a horizontal line that represents an actual accelerator operation amount Acc (%), an actual vehicle speed V crosses a shift line, that is, whether an actual vehicle speed V exceeds a value (shift point vehicle speed) $V_S$ on the shift line, at which shift operation should be performed. The shift lines are prestored as ranges of the values $V_S$, that is, ranges of the shift point vehicle speeds.

When the hydraulic control unit 104, for example, determines that an actual vehicle speed V has crossed the second to third upshift line at which the automatic transmission 10 should upshift from the second gear to the third gear, that is, when the hydraulic control unit 104 determines that an actual vehicle speed V has exceeded a shift point vehicle speed $V_{2-3}$, the hydraulic control unit 104 outputs a command for releasing the brake B1 and engaging the brake B3 to the hydraulic pressure control circuit 50, that is, outputs a command to the linear solenoid valve SL3 for de-exciting the linear solenoid valve SL3 to thereby drain the engagement hydraulic pressure $P_{B1}$ from the brake B1 and a command to the linear solenoid valve SL5 for exciting the linear solenoid valve SL5 to thereby supply the engagement hydraulic pressure $P_{B3}$ to the brake B3.

In this way, the hydraulic control unit 104 controls excitation and de-excitation of each of the linear solenoid valves SL1 to SL5 to control the engagement hydraulic pressures $P_{C1}$, $P_{C2}$, $P_{B1}$, $P_{B2}$ and $P_{B3}$ applied to the clutches C1 and C2 and brakes B1 to B3 corresponding respectively to the linear solenoid valves SL1 to SL5 to thereby establish any one of gears. In addition, the hydraulic control unit 104 performs clutch to clutch shift through feedback control or learning control over the engagement hydraulic pressures (releasing transitional engaging hydraulic pressure and/or engaging transitional engagement hydraulic pressure) in process of shift operation on the basis of a turbine rotational speed $N_T$ and an output rotational speed $N_{OUT}$ so as to achieve both suppression of a shift shock and improvement in shift response.

The hydraulic pressure control command signal $S_P$ is a torque command value for controlling a torque capacity (clutch torque) of each friction engagement device, that is, a hydraulic pressure command value for generating an engagement hydraulic pressure that gives a required torque capacity. For example, a hydraulic pressure command value for draining hydraulic fluid so as to obtain a required torque capacity for releasing the release-side friction engagement device is output as a torque command value for the release-side friction engagement device, and a hydraulic pressure command value for supplying hydraulic fluid so as to obtain a required torque capacity for engaging the engage-side friction engagement device is output as a torque command value for the engage-side friction engagement device. In addition, during a non-shift operation in which any one of the gears GS of the automatic transmission 10 is kept or the friction engagement device is engaged but is not associated with the shift operation, a hydraulic pressure command value for generating an engagement hydraulic pressure that is able to hold friction force (that is, can ensure transmission torque capacity) that withstands a transmission input torque $T_{IN}$ is output.

The hydraulic pressure control circuit 50 actuates the linear solenoid valves SL1 to SL5 in the hydraulic pressure control circuit 50 so as to shift the automatic transmission 10 or so as to keep the current gear GS of the automatic transmission 10 in accordance with a hydraulic pressure command $S_P$ output from the hydraulic control unit 104 to thereby actuate the hydraulic actuators $A_{C1}$, $A_{C2}$, $A_{B1}$, $A_{B2}$ and $A_{B3}$ of the hydraulic friction engagement devices associated with establishment (formation) of the gear GS.

Here, in the present embodiment, hydraulic pressure command values set for establishment of each gear GS through matching work beforehand are not used; instead, clutch torques $T_{C1}$, $T_{C2}$, $T_{B1}$, $T_{B2}$ and $T_{B3}$ (hereinafter, referred to as clutch torques $T_C$ when it is not necessary to distinguish them from one another) of the friction engagement devices required for establishing each gear GS are obtained, and then hydraulic pressure command values converted from the respective clutch torques $T_C$, that is, the engagement hydraulic pressures $P_{C1}$, $P_{C2}$, $P_{B1}$, $P_{B2}$ and $P_{B3}$ (hereinafter, referred to as engagement hydraulic pressures $P_C$ when it is not necessary to distinguish them from one another) are used. Hereinafter, setting of the engagement hydraulic pressures $P_C$, that is, setting of the output hydraulic pressures $P_C$ of the linear solenoid valves SL1 to SL5 (referred to as linear solenoid valves SL when it is not necessary to distinguish them from one another), will be described in detail by taking a case during a non-shift operation as an example.

An estimated torque calculation portion, that is, an estimated torque calculation unit 106, calculates an estimated value of an input torque related value of the automatic transmission 10. The input torque related value of the automatic transmission 10 includes, for example, of course, a transmission input torque $T_{IN}$ (that is, turbine torque $T_T$), and includes an engine torque $T_E$, or the like, related to the transmission input torque $T_{IN}$. The input torque related value also includes the estimated values of them when it is not necessary to distinguish the estimated values from them. The estimated torque calculation unit 106 calculates an estimated engine torque $T_E'$ on the basis of an actual engine rotational speed $N_E$ and an actual throttle valve opening degree $\theta_{TH}$ (or at least one of an intake air flow rate Q, a fuel injection flow rate, an ignition timing, an accelerator operation amount Acc, and the like) by referring to the engine torque map shown in FIG. 6. The estimated torque calculation unit 106 multiplies the estimated engine torque $T_E'$ by a torque ratio t (=turbine torque $T_T$/pump torque $T_P$ (engine torque $T_E$)) of the torque converter 32 to calculate an estimated value (=$T_E' \times t$, hereinafter, referred to as estimated input torque) $T_{IN}'$ of the transmission input torque $T_{IN}$. The torque ratio t is a function of a speed ratio e (=turbine rotational speed $N_T$/pump rotational speed $N_P$ (engine rotational speed $N_E$)) of the torque converter 32, and is, for example, calculated on the basis of an actual speed ratio e by referring to the empirically obtained and prestored relationship (map) (not shown) between a speed ratio e and a torque ratio t.

A required engagement hydraulic pressure calculation portion, that is, a required engagement hydraulic pressure calculation unit 108, for example, calculates a required clutch torque $T_C^*$ required to transmit the transmission input torque $T_{IN}$ on the basis of an estimated engine torque $T_E'$ or an estimated input torque $T_{IN}'$ calculated by the estimated torque calculation unit 106 by referring to an empirically obtained and prestored relationship (required clutch torque map) (not shown) between an input torque related value and a clutch torque $T_C$. Then, the required engagement hydraulic pressure calculation unit 108, for example, calculates a required engagement hydraulic pressure $P_C^*$ required to transmit the transmission input torque $T_{IN}$, that is, a required output hydraulic pressure $P_{C2}^*$ of each of the associated linear solenoid valves SL on the basis of the required clutch torque $T_C^*$ by referring to an empirically obtained and prestored relationship (required engagement hydraulic pressure map) (not shown) between a clutch torque $T_C$ and an engagement hydraulic pressure $P_C$.

A line hydraulic pressure setting portion, that is, a line hydraulic pressure setting unit 110, sets the line hydraulic pressure $P_C^*$ that is a source pressure for obtaining the required output hydraulic pressure $P_C^*$ of each of the associated linear solenoid valves SL. In order to obtain the required output hydraulic pressure $P_C^*$, a hydraulic pressure higher than the required output hydraulic pressure $P_C^*$ needs to be input to each of the associated linear solenoid valves SL. It is sufficient that at least the required output hydraulic pressure $P_C^*$ can be obtained, so, in view of improvement in fuel economy, or the like, the line hydraulic pressure setting unit 110, for example, sets the required output hydraulic pressure $P_C^*$ as the line hydraulic pressure PL.

Hereinafter, a hydraulic pressure command value, that is, a driving current I, of each of the associated linear solenoid valves SL, which is set by the hydraulic control unit 104 and output from the hydraulic control unit 104 during a non-shift operation, will be considered.

For its function, it is sufficient that, during a non-shift operation, each of the associated linear solenoid valves SL outputs an engagement hydraulic pressure $P_C$ that can hold friction force that withstands the transmission input torque $T_{IN}$ (that is, can ensure transmission torque capacity) in order to keep the current gear GS, that is, each of the associated linear solenoid valves SL outputs a required engagement hydraulic pressure $P_C^*$. Thus, by taking into consideration that an engagement hydraulic pressure $P_C$ that exceeds the line hydraulic pressure PL, which is a source pressure, cannot be obtained as indicated by the broken line in the driving characteristic graph of the linear solenoid valve SL in FIG. 8, when a hydraulic pressure equivalent to the required output hydraulic pressure $P_C^*$ is set by the line hydraulic pressure setting unit 110 as the line hydraulic pressure PL, the power consumption may be minimized when the hydraulic pressure command value (driving current) of each of the associated linear solenoid valves SL is set to a value equivalent to the line hydraulic pressure PL, that is, when a driving current $I_{PL}$ corresponding to the output hydraulic pressure $P_C$ equivalent to the line hydraulic pressure PL is set as the hydraulic pressure command value (driving current) of each of the associated linear solenoid valves SL. Thus, during a non-shift operation in which the current gear GS that is a predetermined speed of the automatic transmission 10 is kept, the hydraulic control unit 104 sets the engagement hydraulic pressures $P_C$ applied to the friction engagement devices associated with formation of the gear GS to a hydraulic pressure based on an estimated input torque $T_{IN}'$ (or an estimated engine torque $T_E'$), such as the line hydraulic pressure PL, to place the operating state of each of the associated linear solenoid valves SL in a regulated state shown in FIG. 9. Note that, in the regulated state of each of the associated linear solenoid valves SL, where the electromagnetic valve driving force of each of the associated linear solenoid valves SL is $F_{SL}$, the urging force of a spring 82 is $F_{SP}$ and the area of a spool valve element 86 receiving an output hydraulic pressure $P_C$ introduced into a feedback fluid chamber 84 is A, the balanced state is expressed by the following mathematical expression (1).

$$P_C = (F_{SL} - F_{SP})/A \qquad (1)$$

Figure 28:
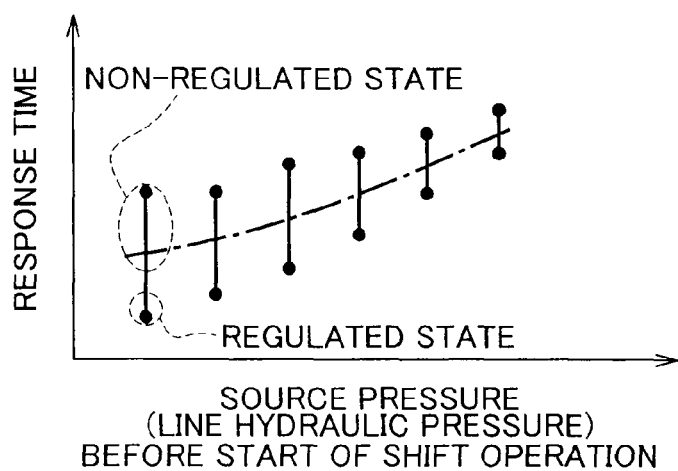
FIG. 28 is a graph that shows an example of variations of response time for releasing a hydraulic friction engagement device when a line hydraulic pressure is set as an output hydraulic pressure in a steady state.

Incidentally, the estimated engine torque $T_E'$ or estimated input torque $T_{IN}'$ calculated by the estimated torque calculation unit 106 varies with a variation in operating state of the vehicle, and then the line hydraulic pressure PL set by the line hydraulic pressure setting unit 110 also varies. On the other hand, there are a delay in response of an actual engine torque $T_E$ with respect to a target engine torque $T_E^*$ (estimated engine torque $T_E'$), variations (individual difference) of each linear solenoid valve SL, and the like, in no small part. For this reason, during a non-shift operation in which the line hydraulic pressure PL (driving current $I_{PL}$) is set as the hydraulic pressure command value (driving current) of each of the associated linear solenoid valves SL (during a steady state), there is a possibility that the operating state of each of the associated linear solenoid valves SL does not always become a regulated state. For example, although the hydraulic pressure command value of each of the associated linear solenoid valves SL is supposed to correspond to the line hydraulic pressure PL to establish the regulated state shown in FIG. 9, the spool valve element 86 is actually displaced toward the spring 82 with respect to a position in the regulated state to thereby possibly place the spool valve element 86 in the non-regulated state where an input port 88 that introduces the line hydraulic pressure PL is open as shown in FIG. 10. In this case, at the time of a shift operation of the automatic transmission 10 from the above steady state, there is a possibility that, when a drain port 90 of the linear solenoid valve SL is opened in order to release the release-side friction engagement device, the response of the hydraulic pressure (engagement hydraulic pressure) $P_C$ output from the linear solenoid valve SL to the release-side friction engagement device is fast when starting from the regulated state and is slow when starting from the non-regulated state where the input port 88 is open (see FIG. 28). In this way, there is a possibility that the operating state of the linear solenoid valve SL varies to thereby cause a difference in response of the output hydraulic pressure of the linear solenoid valve SL. Therefore, there is a possibility that the response of the engagement hydraulic pressure $P_C$ becomes a variable factor to thereby, for example, influence the releasing performance of the release-side friction engagement device during a shift operation. In addition, each linear solenoid valve SL may possibly cause a difference in step response in an initial current at the time of a start of shift operation due to an individual difference, or the like, thereof. Thus, robustness of shift operation is lost because of such variations of response. As a result, this may cause an increase in shift shock. Note that the robustness here indicates that the system does not become unstable against, for example, a disturbance or a modeling error.

For the above described problems, it is conceivable that the output hydraulic pressure (engagement hydraulic pressure) $P_C$ is the same line hydraulic pressure PL; however, the hydraulic pressure command value (driving current) of each of the associated linear solenoid valves SL is, for example, set to a value equal to or higher than a driving current $I_{max}$ corresponding to the output hydraulic pressure $P_C$ equivalent to the maximum hydraulic pressure $P_{Cmax}$ of the linear solenoid valve SL and each of the associated linear solenoid valves SL is definitely placed in the non-regulated state where the input port 88 is open as shown in FIG. 10 during a non-shift operation to thereby reduce the above described variations of response. However, when the maximum hydraulic pressure $P_{Cmax}$ is output, the power consumption of each linear solenoid valve SL becomes maximal, so it is undesirable in terms of fuel economy, or the like.

Figure 8:
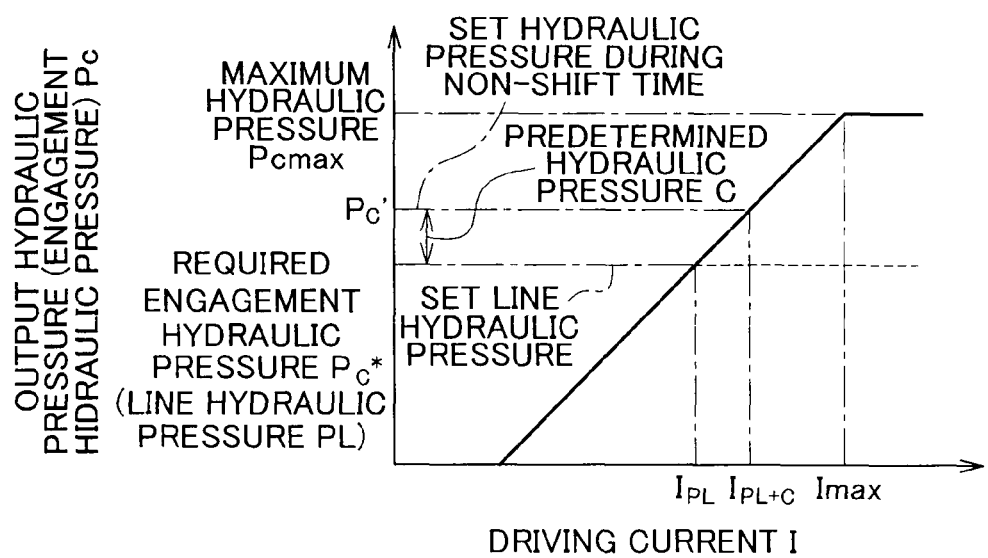
FIG. 8 is an example of the driving characteristic graph of each linear solenoid valve that supplies an engagement hydraulic pressure to an engagement device.

Then, in the present embodiment, in order to stabilize the response of the output hydraulic pressure (engagement hydraulic pressure) $P_C$ while suppressing the power consumption of each of the associated linear solenoid valves SL, during a non-shift operation in which the gear GS of the automatic transmission 10 is kept, the hydraulic control unit 104 increases the set engagement hydraulic pressures $P_C$ applied to the friction engagement devices associated with formation (establishment) of the gear GS, that is, the set output hydraulic pressures $P_C$ (hydraulic pressure command values) of the associated linear solenoid valves SL, by a predetermined hydraulic pressure C with respect to the line hydraulic pressure PL (see FIG. 8). For example, during a non-shift operation, the hydraulic control unit 104 sets a driving current $I_{PL+C}$, corresponding to an output hydraulic pressure $P_C'$ (=PL+C) that is higher by the predetermined hydraulic pressure C than the line hydraulic pressure PL, as the hydraulic pressure command value (driving current) of each of the associated linear solenoid valves SL. Note that the hydraulic control unit 104 may increase the set engagement hydraulic pressure $P_C$ applied to the friction engagement device that is not associated with a shift operation of the automatic transmission 10 but associated with formation of the gear GS by the predetermined hydraulic pressure C with respect to the line hydraulic pressure PL even during the shift operation of the automatic transmission 10.

Specifically, where a displacement of the position of the spool valve element 86 in the non-regulated state where the input port 88 is open as shown in FIG. 10 from the position of the spool valve element 86 in the regulated state (see FIG. 9) is x, the spring constant of the spring 82 is k, a variable factor, such as an estimated engine torque $T_E'$ (or an estimated input torque $T_{IN}'$), a regulated line hydraulic pressure PL and a regulated output hydraulic pressure $P_C$, which is predetermined and converted to a hydraulic pressure, is Pv, and a set required line hydraulic pressure, that is, output hydraulic pressure $P_C$ for an estimated engine torque $T_E'$ (or an estimated input torque $T_{IN}'$) during a non-shift operation is a line hydraulic pressure PL, a required electromagnetic valve driving force $F_{SL}'$ of each of the associated linear solenoid valves SL for placing the linear solenoid valve SL in the non-regulated state where the input port 88 is open is expressed by the following mathematical expression (2). Then, Pv, A, $F_{SP}$ and kx are constants, so, when these are collectively denoted by a constant C, the electromagnetic valve driving force $F_{SL}'$ is expressed by the following mathematical expression (3).

$$F_{SL}' = (PL + Pv) \times A + F_{SP} + kx \qquad (2)$$

$$F_{SL}' = (PL + C) \times A \qquad (3)$$

In the above mathematical expression (3), for example, a minimum electromagnetic valve driving force $F_{SL}'$ for placing each of the associated linear solenoid valves SL in the non-regulated state where the input port 88 is open is set.

Thus, the constant C in the mathematical expression (3) is set as the predetermined hydraulic pressure C. In this way, each linear solenoid valve SL has the input port 88 for introducing the line hydraulic pressure PL and a supply port 92 for supplying the engagement hydraulic pressure $P_C$ to a corresponding one of the friction engagement devices, and the predetermined hydraulic pressure C is a predetermined lowest possible hydraulic pressure to be added to the line hydraulic pressure PL in order to open both the input port 88 and the supply port 92 while providing fluid communication between the input port 88 and the supply port 92 and in order to place the linear solenoid valve SL in the non-regulated state. That is, the predetermined hydraulic pressure C is a predetermined lowest possible hydraulic pressure to be added to the line hydraulic pressure PL in order to place the linear solenoid valve SL in the non-regulated state where the input port 88 is open. In addition, the predetermined hydraulic pressure C is also a predetermined hydraulic pressure for placing the linear solenoid valve SL in the non-regulated state where the input port 88 is open on the basis of the variable factor associated with control of the engagement hydraulic pressure $P_C$ applied to a corresponding one of the friction engagement devices using the linear solenoid valve SL.

In the above described embodiment, in setting the hydraulic pressure command value of each of the associated linear solenoid valves SL during a non-shift operation, the predetermined hydraulic pressure C is set as a constant margin for the line hydraulic pressure PL. Incidentally, depending on the design of the hydraulic pressure control circuit 50, a pump discharge flow rate increases with an increase in rotational speed of the oil pump 28, and actually the line hydraulic pressure PL higher than the set line hydraulic pressure may possibly occur because of flow force (fluid force) applied to the spool valve element of the primary regulator valve 80. Therefore, except in a case where the line hydraulic pressure PL is directly detected, when the line hydraulic pressure PL is set on the basis of an estimated engine torque $T_E'$ (or an estimated input torque $T_{IN}'$), there is a possibility that the constant predetermined hydraulic pressure C does not suffice an electromagnetic driving force $F_{SL}'$ for placing the linear solenoid valve SL in the non-regulated state where the input port 88 is open. Then, in the present embodiment, the hydraulic control unit 104 changes the predetermined hydraulic pressure C on the basis of a predetermined amount of increase $\Delta PL$ from the set value of the line hydraulic pressure PL resulting from an increase in discharge flow rate of the oil pump 28.

Figure 11:
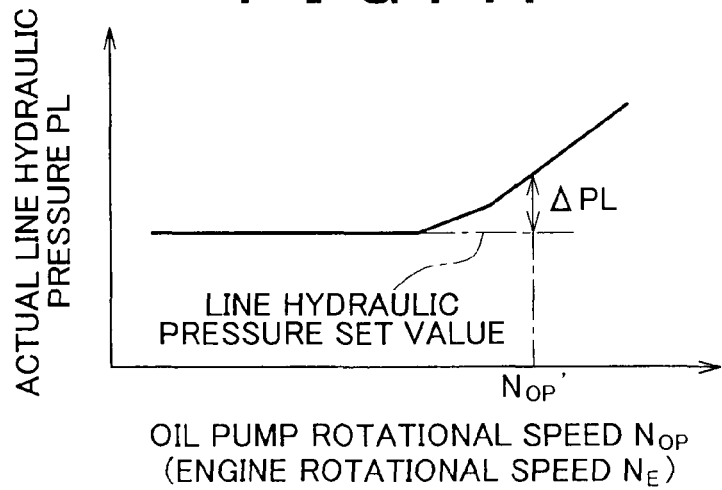
FIG. 11 is a graph that shows a predetermined and stored relationship in which an actual line hydraulic pressure is increased with respect to a set line hydraulic pressure with an increase in oil pump rotational speed.

Specifically, FIG. 11 is the predetermined and stored relationship (actual line hydraulic pressure map) in which, as an oil pump rotational speed $N_{OP}$ increases, an actual line hydraulic pressure PL is increased with respect to the set value of the line hydraulic pressure PL. In FIG. 11, for example, when the oil pump rotational speed $N_{OP}$ is $N_{OP}'$, the actual line hydraulic pressure PL is increased by the predetermined amount of increase $\Delta PL$ with respect to the set value of the line hydraulic pressure PL set by the line hydraulic pressure setting unit 110. On the basis of an actual oil pump rotational speed related value by referring to the relationship shown in FIG. 11, the hydraulic control unit 104 decreases the predetermined hydraulic pressure C as the actual oil pump rotational speed related value decreases and increases the predetermined hydraulic pressure C as the actual oil pump rotational speed related value increases. That is, the hydraulic control unit 104 increases the predetermined hydraulic pressure C by the predetermined amount of increase $\Delta PL$ on the basis of an actual oil pump rotational speed related value by referring to the relationship shown in FIG. 11. Note that the oil pump rotational speed related value, for example, includes, of course, an oil pump rotational speed $N_{OP}$, that is, an engine rotational speed $N_E$, and also includes a turbine rotational speed $N_T$ (that is, input rotational speed $N_{IN}$) related to the oil pump rotational speed $N_{OP}$.

Figure 12:
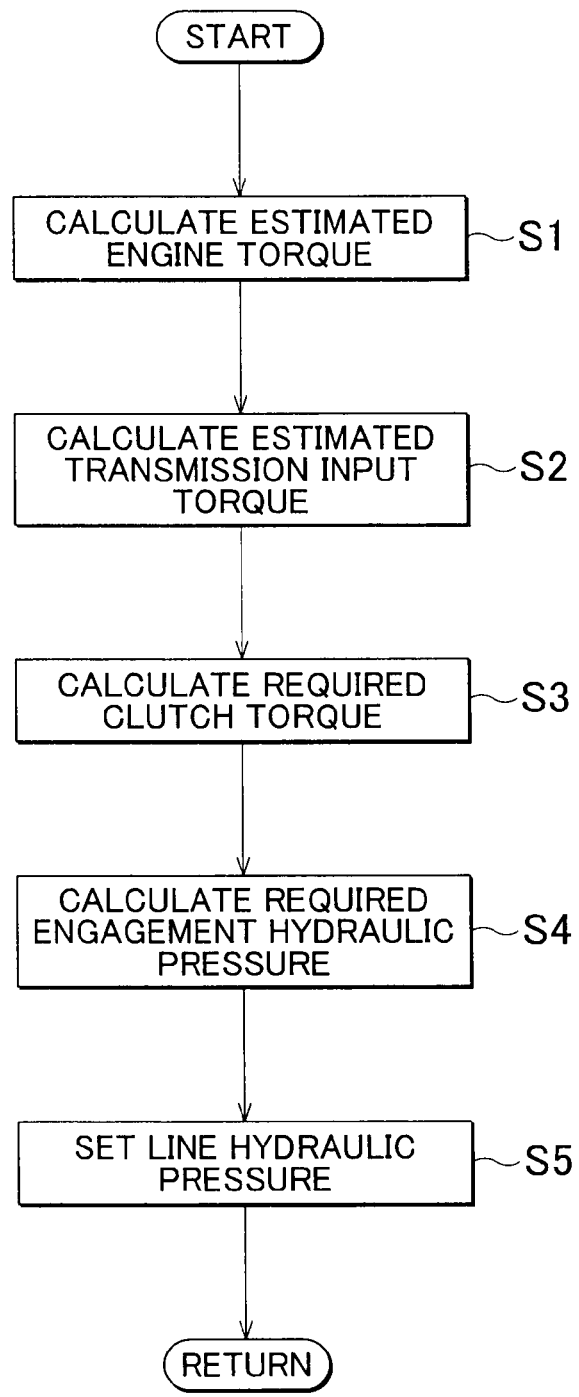
FIG. 12 is a flowchart that illustrates a relevant portion of control operations of the electronic control unit shown in FIG. 3, that is, control operations for setting the line hydraulic pressure.

FIG. 12 is a flowchart that illustrates a relevant portion of control operations of the electronic control unit 100, that is, control operations for setting the line hydraulic pressure PL. The control operations shown in the flowchart are repeatedly executed at an extremely short interval, for example, about several milliseconds to several tens of milliseconds.

In FIG. 12, first, in step S1 (hereinafter the word "step" will be omitted) executed by the estimated torque calculation unit 106, an estimated engine torque $T_E'$ is, for example, calculated on the basis of an actual engine rotational speed $N_E$ and a throttle valve opening degree $\theta_{TH}$ (or at least one of an intake air flow rate Q, a fuel injection flow rate, an ignition timing, an accelerator operation amount Acc, and the like) by referring to the engine torque map shown in FIG. 6. Subsequently, in S2 executed by the estimated torque calculation unit 106, an estimated input torque $T_{IN}'$ ($=T_E' \times t$) is, for example, calculated by multiplying the estimated engine torque $T_E'$, calculated in S1, by the torque ratio t of the torque converter 32. After that, in S3 executed by the required engagement hydraulic pressure calculation unit 108, a required clutch torque $T_C^*$ is, for example, calculated on the basis of the estimated input torque $T_{IN}'$ calculated in S2 by referring to the required clutch torque map (not shown). Then, in S4 executed by the required engagement hydraulic pressure calculation unit 108, a required engagement hydraulic pressure $P_C^*$ (that is, a required output hydraulic pressure $P_C^*$ of each of the associated linear solenoid valves SL) is, for example, calculated on the basis of the required clutch torque $T_C^*$ calculated in S3 by referring to the required engagement hydraulic pressure map (not shown). Thereafter, in S5 executed by the line hydraulic pressure setting unit 110, the required engagement hydraulic pressure $P_C^*$ (required output hydraulic pressure $P_C^*$) calculated in S4 is, for example, set as the line hydraulic pressure PL.

Figure 13:
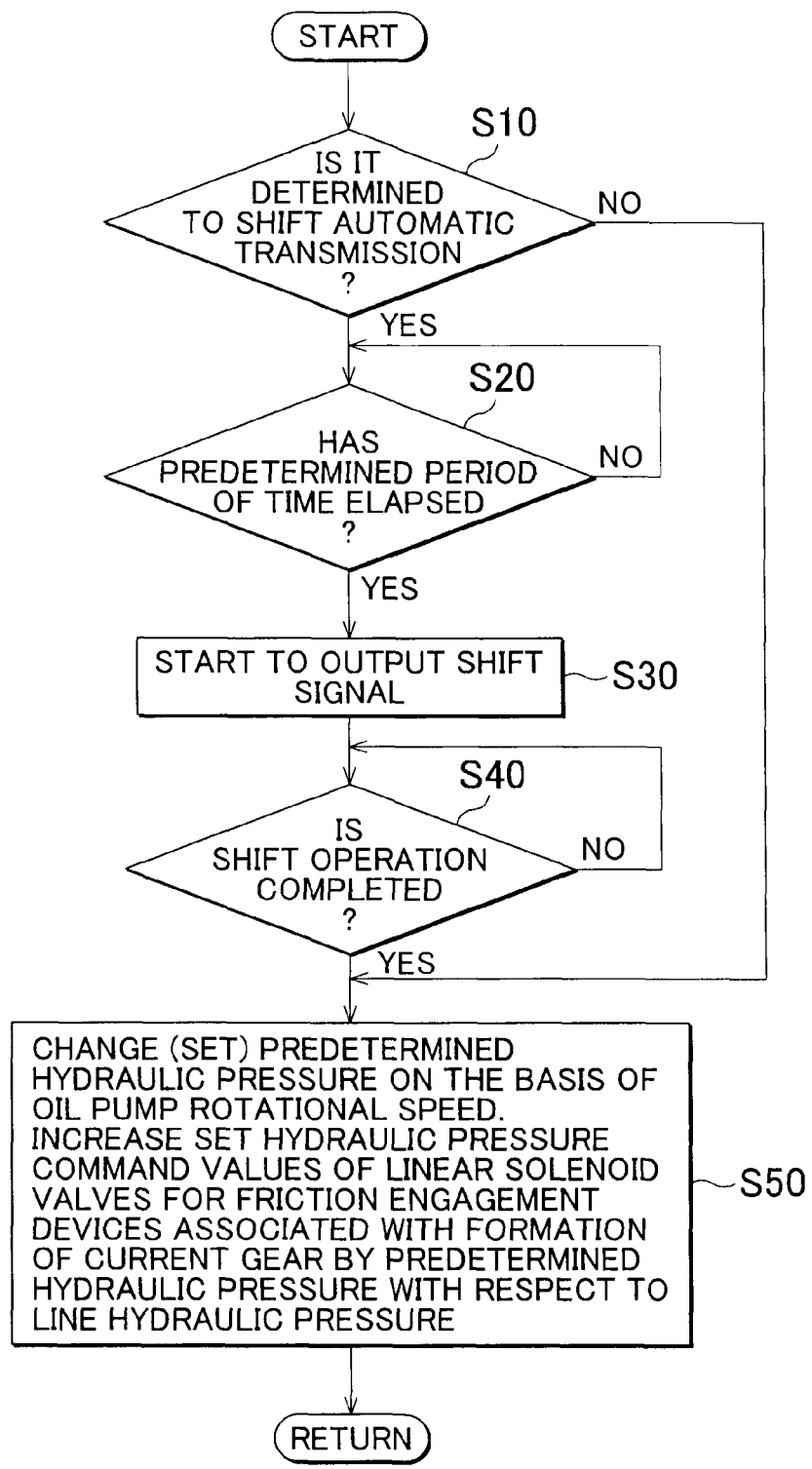
FIG. 13 is a flowchart that illustrates a relevant portion of control operations of the electronic control unit shown in FIG. 3, that is, control operations for stabilizing the response of an engagement hydraulic pressure applied to the friction engagement device, that is, the response of an output hydraulic pressure of the linear solenoid valve, while suppressing the power consumption of each linear solenoid valve.

FIG. 13 is a flowchart that illustrates a relevant portion of control operations of the electronic control unit 100, that is, control operations for stabilizing the response of the engagement hydraulic pressure $P_C$ applied to a corresponding one of the friction engagement devices, that is, the response of the output hydraulic pressure $P_C$ of each of the associated linear solenoid valves SL, while suppressing the power consumption of each of the associated linear solenoid valves SL. The control operations shown in the flowchart is repeatedly executed at an extremely short interval, for example, about several milliseconds to several tens of milliseconds. In addition, FIG. 14 is a time chart corresponding to the control operations of FIG. 13, and is an example of the case where the automatic transmission 10 downshifts from nth to (n−1)th gear.

In FIG. 13, first, in S10 executed by the hydraulic control unit 104, shift determination is, for example, made on the basis of an actual vehicle speed V and an accelerator operation amount Acc by referring to the shift map shown in FIG. 7, it is determined whether to shift the automatic transmission 10, and then a gear into which the automatic transmission 10 should be shifted is determined. When affirmative determination is made in S10 (at t1 in FIG. 14), in S20 executed by the hydraulic control unit 104, for example, it is determined whether a predetermined period of time T for waiting an output of a hydraulic pressure control command signal $S_P$ has elapsed. When negative determination is made in S20, S20 is repeatedly executed. When affirmative determination is made in S20, in S30 executed by the hydraulic control unit 104, a shift command for performing automatic shift control of the automatic transmission 10 is, for example, output so as to obtain the gear determined in S10 (at t2 in FIG. 14). Specifically, a hydraulic pressure control command signal (shift output command value) $S_P$ that causes the hydraulic friction engagement device(s) associated with shift operation of the automatic transmission 10 to be engaged and/or released is output to the hydraulic pressure control circuit 50 so as to establish the gear in accordance with the engagement operation table shown in FIG. 2. In this way, a shift signal is started to be output, and the shift operation of the automatic transmission 10 determined in S10 is performed. Subsequently, in S40 executed by the hydraulic control unit 104, it is, for example, determined whether the shift operation of the automatic transmission 10 performed in S30 is completed. Completion of the shift operation of the automatic transmission 10 is determined through a known method, such as whether a preset predetermined shift operation time has elapsed in a current shift operation or whether an actual input rotational speed $N_{IN}$ is synchronized with a post-shift input rotational speed (=a speed ratio γGS in a post-shift gear GS×an actual output rotational speed $N_{OUT}$). When negative determination is made in S40, S40 is repeatedly executed. Then, when negative determination is made in S10 or when affirmative determination is made in S40 (at time t3 in FIG. 14), in S50 executed by the hydraulic control unit 104, a predetermined hydraulic pressure C used to set the engagement hydraulic pressures $P_C$ applied to the friction engagement devices is, for example, changed (set) on the basis of an actual oil pump rotational speed $N_{OP}$ (engine rotational speed $N_E$) by referring to the actual line hydraulic pressure map shown in FIG. 11. Then, the set engagement hydraulic pressures $P_C$ applied to the friction engagement devices associated with establishment of a current gear GS of the automatic transmission 10, that is, the set output hydraulic pressures $P_C$ (hydraulic pressure command values) of the respective linear solenoid valves SL, are increased by the predetermined hydraulic pressure C with respect to the line hydraulic pressure PL (after t3 in FIG. 14 and before t2 in FIG. 14). For example, the driving current $I_{PL+C}$ corresponding to the output hydraulic pressure $P_C'$ (=PL+C) that is higher by the predetermined hydraulic pressure C than the line hydraulic pressure PL is set as the hydraulic pressure command value (driving current) of each of the associated linear solenoid valves SL. In FIG. 13, S10, S20 and S50 correspond to a situation during a non-shift operation, and S30 and S40 correspond to a situation during a shift operation. Note that for the friction engagement device (engaged friction engagement device) that is not associated a downshift of the automatic transmission 10 from nth to (n−1)th gear but associated with formation of the nth gear and (n−1)th gear to be kept engaged, the set engagement hydraulic pressure $P_C$ (engaged hydraulic pressure command value) of the engaged friction engagement device may be increased by the predetermined hydraulic pressure C with respect to the line hydraulic pressure PL even during a shift operation. That is, for the friction engagement device that is not associated with the shift operation, the set engagement hydraulic pressure $P_C$ may be increased by the predetermined hydraulic pressure C with respect to the line hydraulic pressure PL not only during a non-shift operation but also during a shift operation. Changing the point of view, even during a shift operation, the friction engagement device not associated with a shift operation may be regarded as the one during a non-shift operation. However, needless to say, it is more advantageous in terms of improvement in fuel economy to set the engagement hydraulic pressure $P_C$ of the friction engagement device not associated with a shift operation to the line hydraulic pressure PL during a shift operation.

Figure 14:
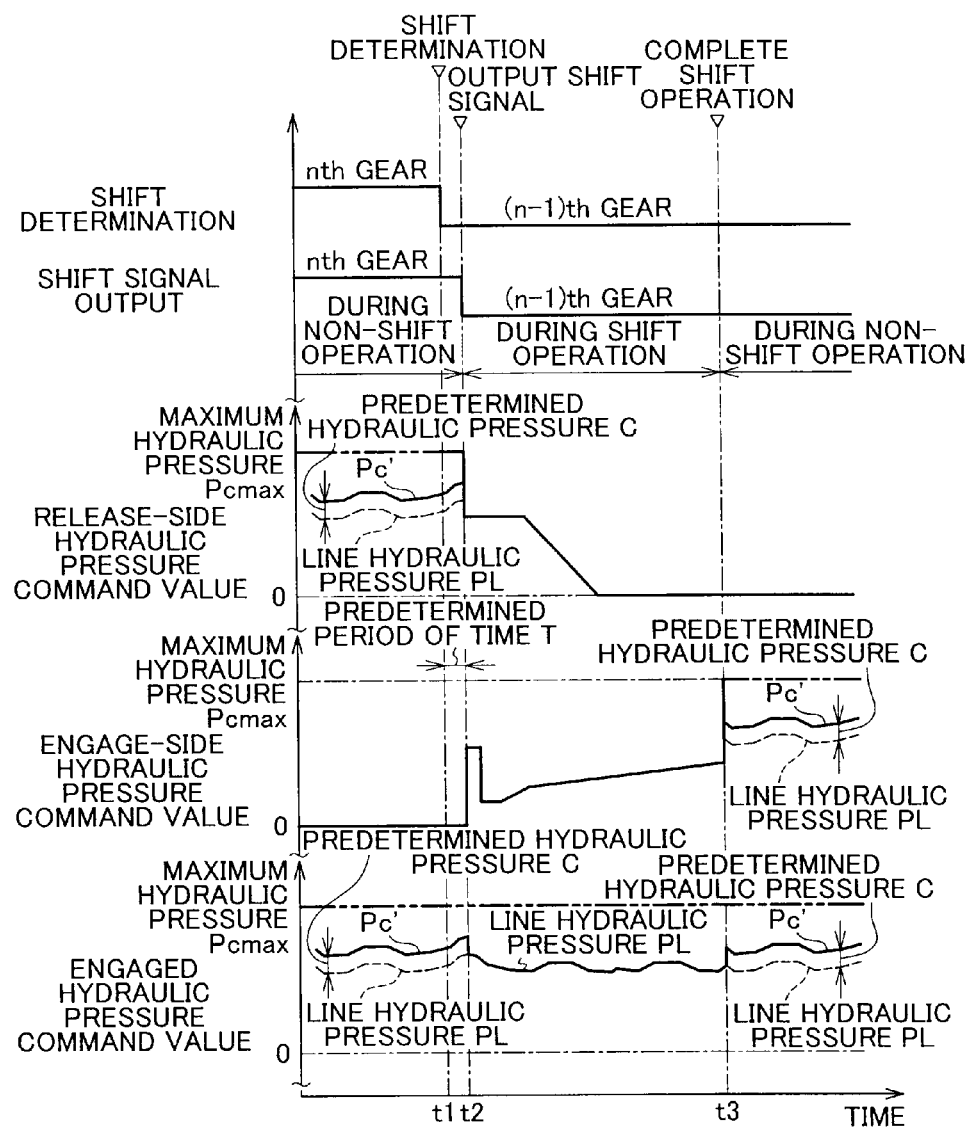
FIG. 14 is a time chart that corresponds to the control operations shown in FIG. 13 and is an example in which the automatic transmission downshifts from nth to (n−1)th gear.
Figure 15:
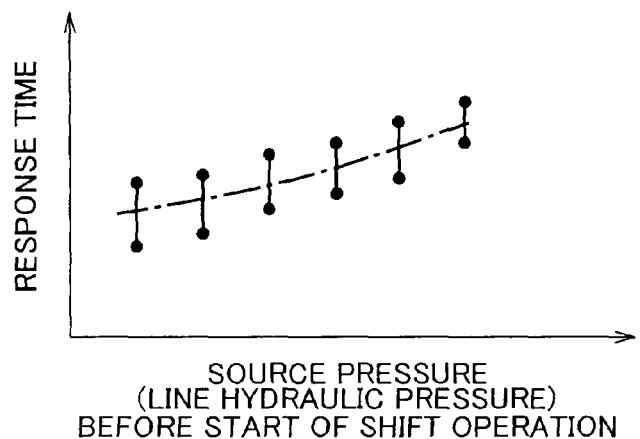
FIG. 15 is a graph that shows an example of variations of response time for releasing the friction engagement device when a set engagement hydraulic pressure (output hydraulic pressure) is increased by a predetermined hydraulic pressure with respect to the line hydraulic pressure during a non-shift operation.

As shown in FIG. 14, the set engagement hydraulic pressures $P_C$ applied to the friction engagement devices are increased by the predetermined hydraulic pressure C with respect to the line hydraulic pressure PL during a non-shift operation, so engagement hydraulic pressure control is always started from the non-regulated state where the input port 88 is open in the associated linear solenoid valve SL at the time of a shift operation. Thus, as shown in FIG. 15, in comparison with the case where the engagement hydraulic pressure $P_C$ is set to the line hydraulic pressure PL (broken line in FIG. 14), a response time (see a median value, or the like, of variations indicated by alternate long and short dashes line in FIG. 15) for releasing the friction engagement device tends to be long; however, variations of the response time (•-• in FIG. 15) are suppressed (see FIG. 28 according to the related art). In addition, in comparison with the case where the engagement hydraulic pressure $P_C$ is set to the maximum hydraulic pressure $P_{Cmax}$ of the linear solenoid valve SL (see alternate long and two short dashes line in FIG. 14), the power consumption of each linear solenoid valve SL is suppressed. Note that, in FIG. 14, a time period before t2 and after t3 corresponds to a time period during a non-shift operation, and a time period from t2 to t3 corresponds to a time period during a shift operation. In addition, an actual shift operation time also corresponds to a time period from t2 to t3.

As described above, according to the present embodiment, during a non-shift operation in which a predetermined gear GS of the automatic transmission 10 is kept, the hydraulic control unit 104 increases the set engagement hydraulic pressures $P_C$ applied to the friction engagement devices associated with formation of the gear GS by the predetermined hydraulic pressure C with respect to the line hydraulic pressure PL. Thus, in comparison with the case where a pressure equivalent to the line hydraulic pressure PL is set to the engagement hydraulic pressure $P_C$ applied to the friction engagement device in order to obtain a hydraulic pressure equivalent to the line hydraulic pressure PL as the engagement hydraulic pressure $P_C$ applied to the friction engagement device, a hydraulic pressure that exceeds the line hydraulic pressure PL is not actually supplied to the friction engagement device similarly; however, the margin of the predetermined hydraulic pressure C prevents a situation that the operating state of each linear solenoid valve SL deviates from a desired state because of a delay in response of an actual input torque related value against a variation in an estimated input torque related value (for example, engine torque $T_E$, input torque $T_{IN}$, or the like) based on which the line hydraulic pressure PL is set, variations of the linear solenoid valve SL, or the like. Thus, variations of shift response (hydraulic pressure response) when shifting from a non-shift state (steady state) into a shift state are suppressed. Moreover, in comparison with the case where the engagement hydraulic pressure $P_C$ applied to a corresponding one of the friction engagement devices is set to the maximum hydraulic pressure $P_{Cmax}$, that is, the driving force F of each of the associated linear solenoid valves SL is maximized, in order to reduce variations of the response, the power consumption of each of the associated linear solenoid valves SL is suppressed. Thus, it is possible to stabilize the response of the engagement hydraulic pressure $P_C$ applied to a corresponding one of the friction engagement devices while suppressing the power consumption of each of the associated linear solenoid valves SL. By so doing, it is possible to, for example, stabilize the response of the engagement hydraulic pressure $P_C$ applied to the release-side friction engagement device, that is, releasing performance (shift characteristic) of the release-side friction engagement device at the time of a shift operation.

In addition, with the present embodiment, each of the linear solenoid valves SL has the input port 88 for introducing the line hydraulic pressure PL and the supply port 92 for supplying the engagement hydraulic pressure $P_C$ to a corresponding one of the friction engagement devices, and the predetermined hydraulic pressure C is a predetermined lowest possible hydraulic pressure to be added to the line hydraulic pressure PL in order to open both the input port 88 and the supply port 92 while providing fluid communication between the input port 88 and the supply port 92 and in order to place the linear solenoid valve SL in the non-regulated state. By so doing, the response of the hydraulic pressure $P_C$ output from the linear solenoid valve SL (regulating response, shift hydraulic pressure response) at the time of shifting from the non-shift state (steady state) into the shift state is always started from the non-regulated state where the input port 88 is open. Therefore, variations of the response are reliably suppressed. In addition, the minimum hydraulic pressure is set to place the linear solenoid valve SL in the non-regulated state where the input port 88 is open, so the power consumption of the linear solenoid valve SL is reliably suppressed.

In addition, with the present embodiment, the predetermined hydraulic pressure C is a predetermined hydraulic pressure for placing each of the associated linear solenoid valves SL in the non-regulated state where the input port 88 is open on the basis of the variable factor associated with control of the engagement hydraulic pressure $P_C$ applied to a corresponding one of the friction engagement devices using the linear solenoid valve SL. By so doing, by setting the engagement hydraulic pressure $P_C$ applied to a corresponding one of the friction engagement devices, that is, the output hydraulic pressure $P_C$ of each of the associated linear solenoid valves SL, which is obtained by adding the predetermined hydraulic pressure C to the line hydraulic pressure PL, each of the associated linear solenoid valves SL is appropriately placed in the non-regulated state where the input port 88 is open.

In addition, with the present embodiment, the predetermined hydraulic pressure C is changed on the basis of a predetermined amount of increase ΔPL from the set value of the line hydraulic pressure PL resulting from an increase in discharge flow rate of the oil pump 28, which generates a hydraulic fluid pressure that is a source pressure of the line hydraulic pressure PL as the oil pump 28 is driven for rotation by the engine 30. By so doing, an actual line hydraulic pressure PL is increased with respect to the set value of the line hydraulic pressure PL with an increase in discharge flow rate of the oil pump 28, so this avoids a possible situation that addition of a constant margin of the predetermined hydraulic pressure C does not suffice the set engagement hydraulic pressure $P_C$ applied to a corresponding one of the friction engagement devices.

In addition, with the present embodiment, as the oil pump rotational speed related value (for example, oil pump rotational speed $N_{OP}$, that is, engine rotational speed $N_E$, or the like) increases, an actual line hydraulic pressure PL increases with respect to the set line hydraulic pressure PL. From the above predetermined relationship, on the basis of an oil pump rotational speed related value, the predetermined hydraulic pressure C is decreased as the actual oil pump rotational speed related value decreases, and the predetermined hydraulic pressure C is increased as the actual oil pump rotational speed related value increases. This appropriately avoids a situation that the set engagement hydraulic pressure $P_C$ applied to the friction engagement device is insufficient.

The embodiment of the invention is described in detail with reference to the accompanying drawings; however, the aspect of the invention may also be applied to other embodiments.

Figure 9:
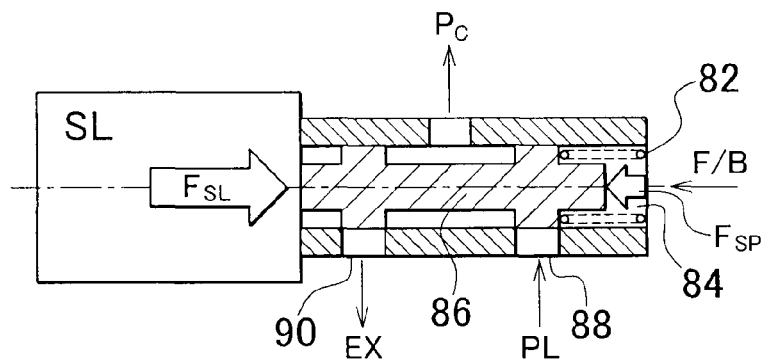
FIG. 9 is a view that illustrates an example in which the operating state of the linear solenoid valve is placed in a regulated state.
Figure 10:
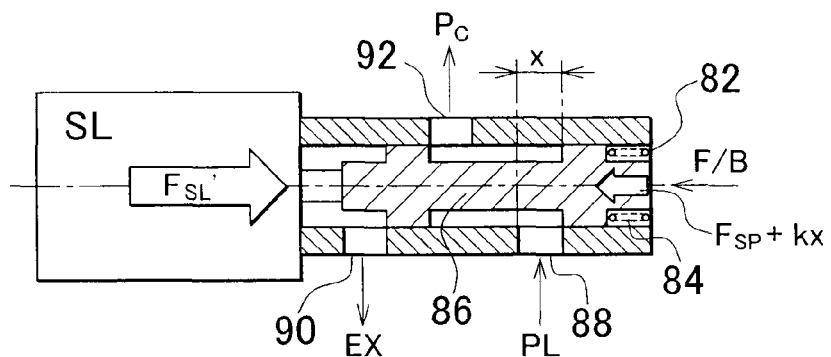
FIG. 10 is a view that shows an example in which the operating state of the linear solenoid valve is placed in a non-regulated state where an input port is open.

For example, in the above described embodiment, the non-regulated state where the input port 88 is open in each of the associated linear solenoid valves SL is a state where, as shown in FIG. 10, the spool valve element 86 is completely pressed toward the spring 82 side and the input port 88 is completely open; however, it may also be the non-regulated state as long as at least part of the input port 88 is open and the input port 88 and the supply port 92 are in fluid communication with each other thereby not to place the linear solenoid valve SL in the regulated state shown in FIG. 9.

In addition, in the above embodiment, the predetermined hydraulic pressure C is a lowest possible hydraulic pressure to be added to the line hydraulic pressure PL in order to place the linear solenoid valve SL in the non-regulated state where the input port 88 is open. That is, the output hydraulic pressure $P_C{'}$ (=PL+C) that is higher by the predetermined hydraulic pressure C than the line hydraulic pressure PL is a lowest possible hydraulic pressure (for example, denoted by $P_C{'}_{min}$) for placing the linear solenoid valve SL in the non-regulated state where the input port 88 is open. However, the output hydraulic pressure $P_C{'}$ may not be the lowest possible hydraulic pressure. As long as, for example, the output hydraulic pressure $P_C{'}$ at least satisfies the relationship $P_C{'}_{min} < P_C{'}(PL+C) < P_{Cmax}$, a certain advantageous effect according to the aspect of the invention may be obtained.

In addition, in the above embodiment, in the automatic transmission 10, a shift signal is started to be output after a lapse of the predetermined period of time T from the time point of shift determination and then an actual shift operation is performed; however, the predetermined period of time T may not be provided. That is, the aspect of the invention may also be applied to an automatic transmission in which a shift signal is started to be output immediately after shift determination. In this case, step S20 in FIG. 13 is omitted.

In addition, in the above embodiment, the line hydraulic pressure setting unit 110 (step S5 in FIG. 12) sets the required output hydraulic pressure $P_C{*}$ as the line hydraulic pressure PL; however, when the relationship (map) between an estimated engine torque $T_E{'}$ or estimated input torque $T_{IN}{'}$ and a line hydraulic pressure PL is empirically obtained and pre-stored on the basis of a required engagement hydraulic pressure $P_C{*}$, or the like, the line hydraulic pressure PL may be set on the basis of an estimated engine torque $T_E{'}$ or an estimated input torque $T_{IN}{'}$ by referring to the above relationship. In this case, the required engagement hydraulic pressure calculation unit 108 is not required, and steps S3 and S4 in FIG. 12 are not required. In addition, when the line hydraulic pressure PL is set on the basis of an estimated engine torque $T_E$, step S2 in FIG. 12 is not required.

Second Embodiment

Figure 16:
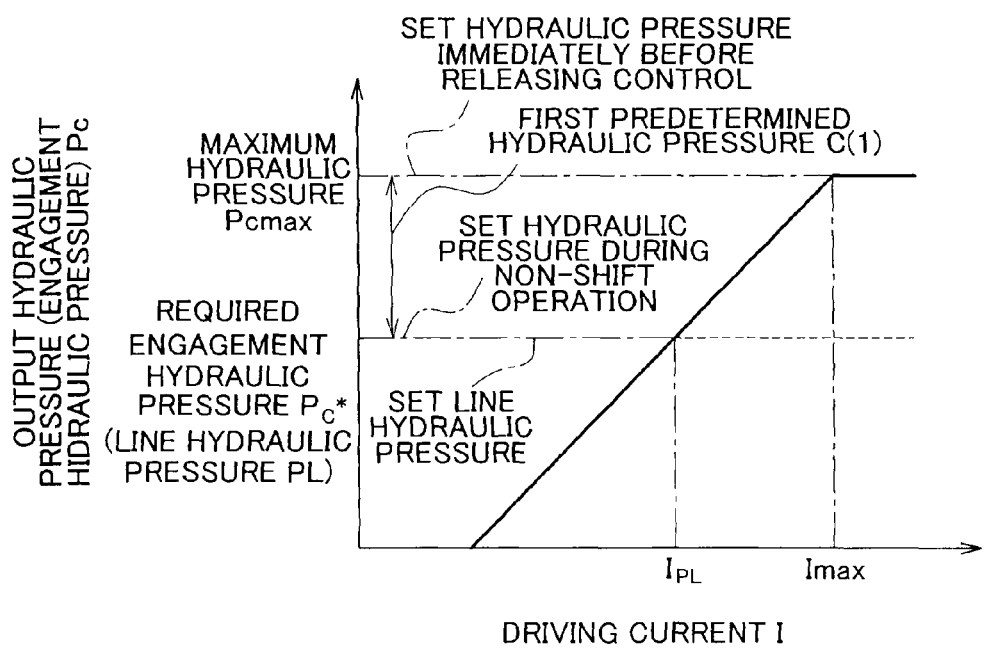
FIG. 16 is an example of the driving characteristic graph of each linear solenoid valve that supplies an engagement hydraulic pressure to the corresponding engagement device and is a graph that shows an example of a set engagement hydraulic pressure that is increased by a predetermined hydraulic pressure with respect to the line hydraulic pressure.

In a second embodiment, in order to stabilize the response of the output hydraulic pressure (engagement hydraulic pressure) $P_C$ while suppressing the power consumption of each of the associated linear solenoid valves SL, during a shift operation of the automatic transmission 10, the hydraulic control unit 104 temporarily increases the set engagement hydraulic pressure $P_C$ applied to the release-side friction engagement device, that is, the set output hydraulic pressure $P_C$ (hydraulic pressure command value) of the linear solenoid valve SL applied to the release-side friction engagement device, by a first predetermined hydraulic pressure C(1) with respect to the set engagement hydraulic pressure $P_C$ during a non-shift operation (that is, line hydraulic pressure PL) for a first predetermined period of time T(1) prior to a start of releasing control of the release-side friction engagement device. The engagement hydraulic pressure $P_C$ applied to the release-side friction engagement device that is increased by the first predetermined hydraulic pressure C(1) with respect to the line hydraulic pressure PL is, for example, a predetermined maximum hydraulic pressure $P_{Cmax}$ that can be output from the linear solenoid valve SL (see FIG. 16). That is, during a shift operation of the automatic transmission 10, the hydraulic control unit 104 temporarily sets a driving current, which is equal to or higher than a driving current $I_{max}$ corresponding to the maximum hydraulic pressure $P_{Cmax}$ that is higher by the first predetermined hydraulic pressure C(1) than the line hydraulic pressure PL, as the hydraulic pressure command value (driving current) of the linear solenoid valve SL for the release-side friction engagement device for the first predetermined period of time T(1) prior to a start of releasing control of the release-side friction engagement device. In this way, by temporarily placing the associated linear solenoid valve SL in the non-regulated state where the input port 88 is open prior to a start of an actual shift operation, the operating state of the linear solenoid valve SL at the time of a start of shift operation is kept constant to thereby reduce variations of shift response at the time of a shift operation.

The first predetermined hydraulic pressure C(1) is temporarily added to the line hydraulic pressure PL during the first predetermined period of time T(1), so the first predetermined hydraulic pressure C(1) is a sufficient predetermined hydraulic pressure to be added to the hydraulic pressure during a non-shift operation so as to reliably suppress variations of response of the output hydraulic pressure (engagement hydraulic pressure) $P_C$ rather than to suppress deterioration in fuel economy due to the addition of the hydraulic pressure. Therefore, the hydraulic pressure that is higher by the first predetermined hydraulic pressure C(1) than the hydraulic pressure during a non-shift operation is set to the maximum hydraulic pressure $P_{Cmax}$ that can be output from the linear solenoid valve SL that outputs the engagement hydraulic pressure $P_C$ to the release-side friction engagement device. In addition, it is only necessary to set the above hydraulic pressure to the maximum hydraulic pressure $P_{Cmax}$, so control is easy.

The first predetermined period of time T(1) is a predetermined constant period of time for setting a hydraulic pressure that is higher by the first predetermined hydraulic pressure C(1) than the hydraulic pressure during a non-shift operation prior to a start of an actual shift operation in order to stabilize the response of the output hydraulic pressure (engagement hydraulic pressure) $P_C$. For example, the predetermined period of time T that is set as a standby time from the time point of shift determination of the automatic transmission 10 based on the shift map to the time point of an output of a predetermined shift command (hydraulic pressure control command signal Sp) for shifting the engagement states of the friction engagement devices is used as the first predetermined period of time T(1). In this way, in order to wait an output of the hydraulic pressure control command signal Sp, the predetermined period of time T that is originally set at the time of a shift operation of the automatic transmission 10 is utilized to place the associated linear solenoid valves SL in the non-regulated state where the input port 88 is open prior to a start of the shift operation.

FIG. 12 is a flowchart that illustrates a relevant portion of control operations of the electronic control unit 100, that is, control operations for setting the line hydraulic pressure PL. FIG. 12 is already described, so the description thereof is omitted.

Figure 17:
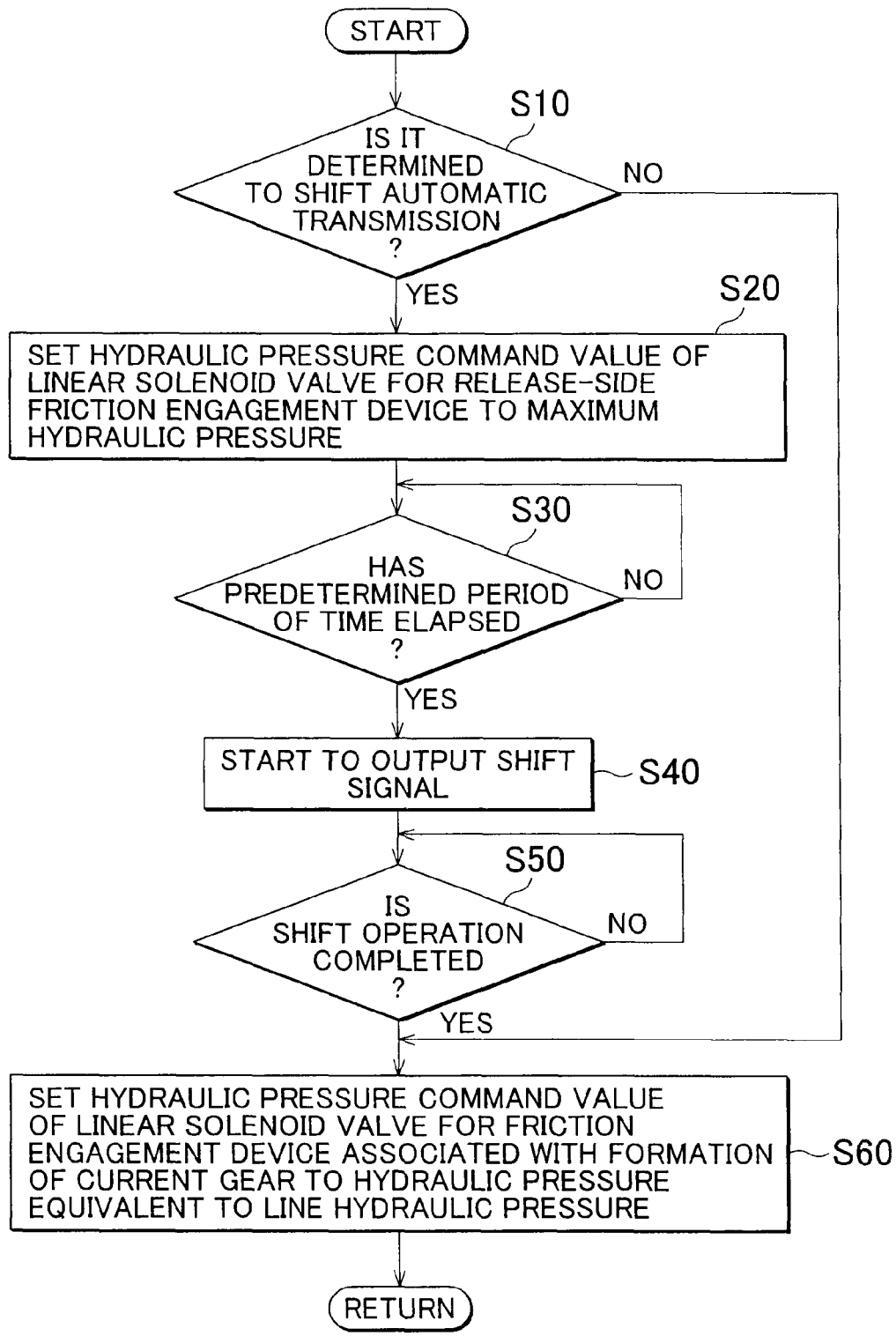
FIG. 17 is a flowchart that illustrates a relevant portion of control operations of the electronic control unit shown in FIG. 3, that is, control operations for stabilizing the response of an engagement hydraulic pressure applied to the friction engagement device, that is, the response of an output hydraulic pressure of the linear solenoid valve, while suppressing the power consumption of each linear solenoid valve.
Figure 18:
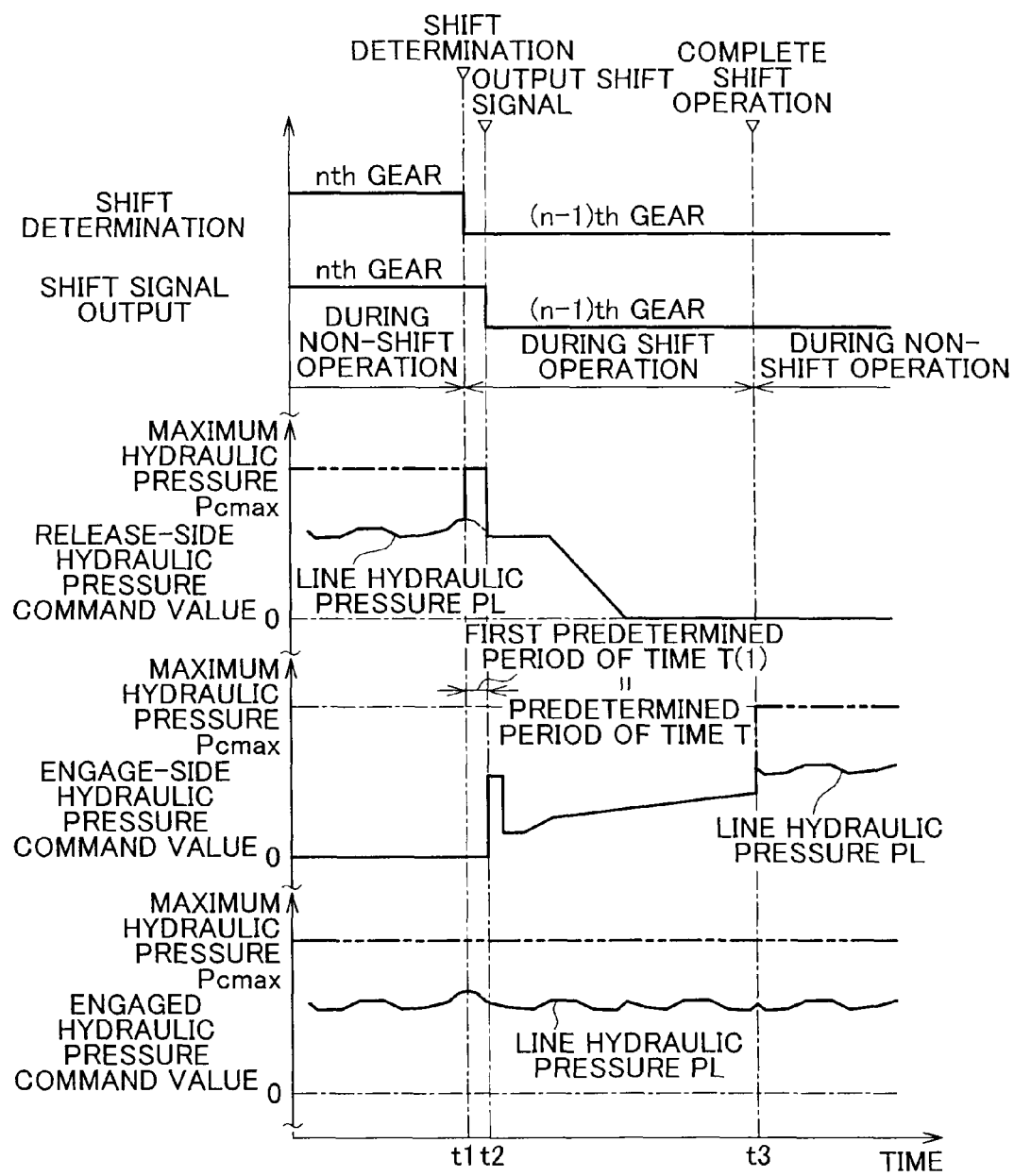
FIG. 18 is a time chart that corresponds to the control operations shown in FIG. 17 and is an example in which the automatic transmission downshifts from nth to (n−1)th gear.

In addition, FIG. 18 is a time chart corresponding to control operations of FIG. 17 and is an example in which the automatic transmission 10 downshifts from nth to (n−1)th gear.

In FIG. 17, first, in S10 executed by the hydraulic control unit 104, shift determination is, for example, made on the basis of an actual vehicle speed V and an accelerator operation amount Acc by referring to the shift map shown in FIG. 7, it is determined whether to shift the automatic transmission 10, and then a gear into which the automatic transmission 10 should be shifted is determined. When affirmative determination is made in S10 (at t1 in FIG. 18), in S20 executed by the hydraulic control unit 104, the engagement hydraulic pressure $P_C$ applied to the release-side friction engagement device, that is, the output hydraulic pressure $P_C$ (hydraulic pressure command value) of the associated linear solenoid valve SL applied to the release-side friction engagement device, is set to a sufficient hydraulic pressure that sufficiently places the linear solenoid valve SL in the non-regulated state where the input port 88 is open, that is, for example, the maximum hydraulic pressure $P_{Cmax}$, that can be output from the linear solenoid valve SL (between t1 and t2 in FIG. 18). For example, a driving current that is equal to or higher than the driving current $I_{max}$ corresponding to the maximum hydraulic pressure $P_{Cmax}$ is set as the hydraulic pressure command value (driving current) of the linear solenoid valve SL for the release-side friction engagement device. Subsequently, in S30 executed by the hydraulic control unit 104, it is, for example, determined whether the predetermined period of time T for waiting an output of a hydraulic pressure control command signal $S_P$ (in other words, the first predetermined period of time T(1) for stabilizing the response of the engagement hydraulic pressure $P_C$) has elapsed. When negative determination is made in S30, S30 is repeatedly executed. When affirmative determination is made in S30, in S40 executed by the hydraulic control unit 104, a shift command for performing automatic shift control of the automatic transmission 10 is, for example, output so as to obtain the gear determined in S10 (at t2 in FIG. 18). Specifically, a hydraulic pressure control command signal (shift output command value) $S_P$ that causes the hydraulic friction engagement device(s) associated with shift operation of the automatic transmission 10 to be engaged and/or released is output to the hydraulic pressure control circuit 50 so as to establish the gear in accordance with the engagement operation table shown in FIG. 2. In this way, a shift signal is started to be output, and the shift operation of the automatic transmission 10 determined in S10 is performed. Subsequently, in S50 executed by the hydraulic control unit 104, it is, for example, determined whether the shift operation of the automatic transmission 10 performed in S40 is completed. Completion of shift operation of the automatic transmission 10 is determined through a known method, such as whether a preset predetermined shift operation time has elapsed in a current shift operation or whether an actual input rotational speed $N_{IN}$ is synchronized with a post-shift input rotational speed (=a speed ratio γGS in a post-shift gear GS×an actual output rotational speed $N_{OUT}$). When negative determination is made in S50, S50 is repeatedly executed. Then, when negative determination is made in S10 or when affirmative determination is made in S50 (at time t3 in FIG. 18), in S60 executed by the hydraulic control unit 104, the engagement hydraulic pressure $P_C$ applied to the friction engagement device that is engaged in association with a current gear GS of the automatic transmission 10, that is, the output hydraulic pressure $P_C$ (hydraulic command value) of the associated linear solenoid valve SL, is, for example, set to a hydraulic pressure equivalent to the line hydraulic pressure PL (after t3 in FIG. 18 and before t1 in FIG. 18). For example, a driving current $I_{PL}$ corresponding to the output hydraulic pressure $P_C$ equivalent to the line hydraulic pressure PL is set as the hydraulic pressure command value (driving current) of the associated linear solenoid valve SL. In FIG. 17, S10 to S50 correspond to a situation during a shift operation, and S60 corresponds to a situation during a non-shift operation. Note that for the friction engagement device (engaged friction engagement device) that is not associated with a downshift of the automatic transmission 10 from nth to (n−1)th gear but associated with formation of the nth gear and (n−1)th gear to be kept engaged, the set engagement hydraulic pressure $P_C$ (engaged hydraulic pressure command value) of the engaged friction engagement device may be set to the line hydraulic pressure PL even during a shift operation. That is, for the engaged friction engagement device not associated with the shift operation, the set engagement hydraulic pressure $P_C$ may be set to the line hydraulic pressure PL not only during a non-shift operation but also during a shift operation. Changing the point of view, even during a shift operation, the engaged friction engagement device not associated with a shift operation may be regarded as the one during a non-shift operation. Thus, it is further advantageous in improvement of fuel economy.

As shown in FIG. 17 and FIG. 18, the engagement hydraulic pressure $P_C$ applied to the release-side friction engagement device is set to the maximum hydraulic pressure $P_{Cmax}$ prior to an actual shift operation, so engagement hydraulic pressure control is always started from the non-regulated state where the input port 88 is open in the linear solenoid valve SL at the time of an actual shift operation. Thus, as shown in FIG. 15, in comparison with the case where the engagement hydraulic pressure $P_C$ is set to the line hydraulic pressure PL (broken line in FIG. 18), a response time (see a median value, or the like, of variations indicated by alternate long and short dashes line in FIG. 15) for releasing the friction engagement device tends to be long; however, variations of the response time (•-• in FIG. 15) are suppressed (see FIG. 28 according to the related art). In addition, in comparison with the case where the engagement hydraulic pressure $P_C$ is set to the maximum hydraulic pressure $P_{Cmax}$ of the linear solenoid valve SL during a non-shift operation (see alternate long and two short dashes line in FIG. 18), the power consumption of each of the associated linear solenoid valves SL is suppressed. Note that, in FIG. 18, a time period before t1 and after t3 corresponds to a time period during a non-shift operation, and a time period from t1 to t3 corresponds to a time period during a shift operation. An actual shift operation time corresponds to a time period from t2 to t3.

As described above, according to the present embodiment, during a shift operation of the automatic transmission 10, the hydraulic control unit 104 temporarily increases the set engagement hydraulic pressure $P_C$ applied to the release-side friction engagement device by the first predetermined period of time T(1) with respect to the set engagement hydraulic pressure $P_C$ during a non-shift operation prior to a start of releasing control of the release-side friction engagement device. Thus, in comparison with the case where the hydraulic pressure during a non-shift operation is directly set as the engagement hydraulic pressure $P_C$ applied to the release-side friction engagement device, the margin of the first predetermined hydraulic pressure C(1) that is set prior to a start of releasing control of the release-side friction engagement device prevents, for example, a situation that the operating state of the associated linear solenoid valve SL deviates from a desired state because of a delay in response of an actual input torque related value against a variation in an estimated input torque related value (for example, engine torque $T_E$, input torque $T_{IN}$, or the like) based on which the line hydraulic pressure PL is set, variations of the linear solenoid valve SL, or the like, prior to a start of releasing control. Thus, variations of shift response (hydraulic pressure response) at the time when releasing control of the release-side friction engagement device is started during a shift operation are suppressed. Moreover, in comparison with the case where the set engagement hydraulic pressure $P_C$ applied to each of the friction engagement devices associated with formation of the gear GS is increased by the first predetermined hydraulic pressure C(1) even during a non-shift operation in order to reduce variations of the response, the power consumption of each of the associated linear solenoid valves SL is suppressed. Thus, it is possible to stabilize the response of the engagement hydraulic pressure $P_C$ applied to a corresponding one of the friction engagement devices while suppressing the power consumption of each of the associated linear solenoid valves SL. By so doing, it is possible to stabilize the response of the engagement hydraulic pressure $P_C$ applied to the release-side friction engagement device, that is, releasing performance (shift characteristic) of the release-side friction engagement device, for example, at the time of a shift operation.

In addition, with the present embodiment, the hydraulic control unit 104 sets the engagement hydraulic pressure $P_C$ to the line hydraulic pressure PL during a non-shift operation, so it is possible to suppress the power consumption of each of the associated linear solenoid valves SL during a non-shift operation as much as possible.

In addition, with the present embodiment, the engagement hydraulic pressure $P_C$ applied to the release-side friction engagement device, which is increased by the first predetermined hydraulic pressure C(1) with respect to the set engagement hydraulic pressure $P_C$ during a non-shift operation is the predetermined maximum hydraulic pressure $P_{Cmax}$ that can be output from the associated linear solenoid valve SL. By so doing, when releasing control of the release-side friction engagement device is started, the response of the engagement hydraulic pressure $P_C$ applied to the release-side friction engagement device begins from the constant non-regulated state where the output hydraulic pressure $P_C$ of the linear solenoid valve SL is set to the maximum hydraulic pressure $P_{Cmax}$, so variations of the shift response are reliably suppressed. In addition, the maximum hydraulic pressure for placing the linear solenoid valve SL in the non-regulated state is temporarily set immediately before releasing control, so the power consumption of the associated linear solenoid valve SL is reliably suppressed.

In addition, with the present embodiment, the first predetermined period of time T(1) is a predetermined period of time T that is a predetermined constant standby time from the time point of shift determination based on the predetermined shift map for determining whether to shift the automatic transmission 10 to the time point at which a predetermined shift command for changing the engagement state of the friction engagement device is started to be output on the basis of the shift determination. By so doing, a constant period of time for temporarily increasing the set engagement hydraulic pressure $P_C$ applied to the release-side friction engagement device by the first predetermined hydraulic pressure C(1) with respect to the set engagement hydraulic pressure $P_C$ during a non-shift operation prior to a start of releasing control of the release-side friction engagement device is appropriately set. In addition, by utilizing the predetermined period of time T that is originally set for shift control, the engagement hydraulic pressure $P_C$ applied to the release-side friction engagement device may be temporarily increased by the first predetermined hydraulic pressure C(1) immediately before a start of releasing control.

Next, other embodiments of the invention will be described. Note that, in the following description, like reference numerals denote components common to the embodiments, and the description thereof is omitted.

Third Embodiment

In the second embodiment, the predetermined period of time T is provided as a constant standby time from the time point of shift determination based on the shift map to the time point at which a shift command is started to be output, and the predetermined period of time T is utilized to set the first predetermined period of time T(1) for increasing the set engagement hydraulic pressure $P_C$ applied to the release-side friction engagement device by the first predetermined hydraulic pressure C(1). However, there is also conceivably an automatic transmission 10 in which a shift command is started to be output immediately after shift determination based on the shift map and the predetermined period of time T is not originally provided.

Then, in the present embodiment, instead of the above described embodiment, the hydraulic control unit 104 increases the set engagement hydraulic pressure $P_C$ applied to the release-side friction engagement device by the first predetermined hydraulic pressure C(1) with respect to the set engagement hydraulic pressure $P_C$ during a non-shift operation for the first predetermined period of time T(1) from the time point of shift determination based on the predetermined shift map for determining whether to shift the automatic transmission 10, and then starts releasing control of the release-side friction engagement device. That is, during a shift operation of the automatic transmission 10, the hydraulic control unit 104 outputs a hydraulic pressure command value for increasing the set engagement hydraulic pressure $P_C$ by the first predetermined hydraulic pressure C(1) for the first predetermined period of time T(1) prior to a start of releasing control as the hydraulic pressure command value of the linear solenoid valve SL for the release-side friction engagement device in addition to the hydraulic pressure command value for releasing control. In addition, the hydraulic control unit 104 delays an output of the hydraulic pressure command value for releasing control by the first predetermined period of time T(1), so a start of engaging control of the engage-side friction engagement device is delayed by at least the first predetermined period of time T(1) so as to appropriately advance a shift operation through releasing control of the release-side friction engagement device and engaging control of the engage-side friction engagement device.

Figure 19:
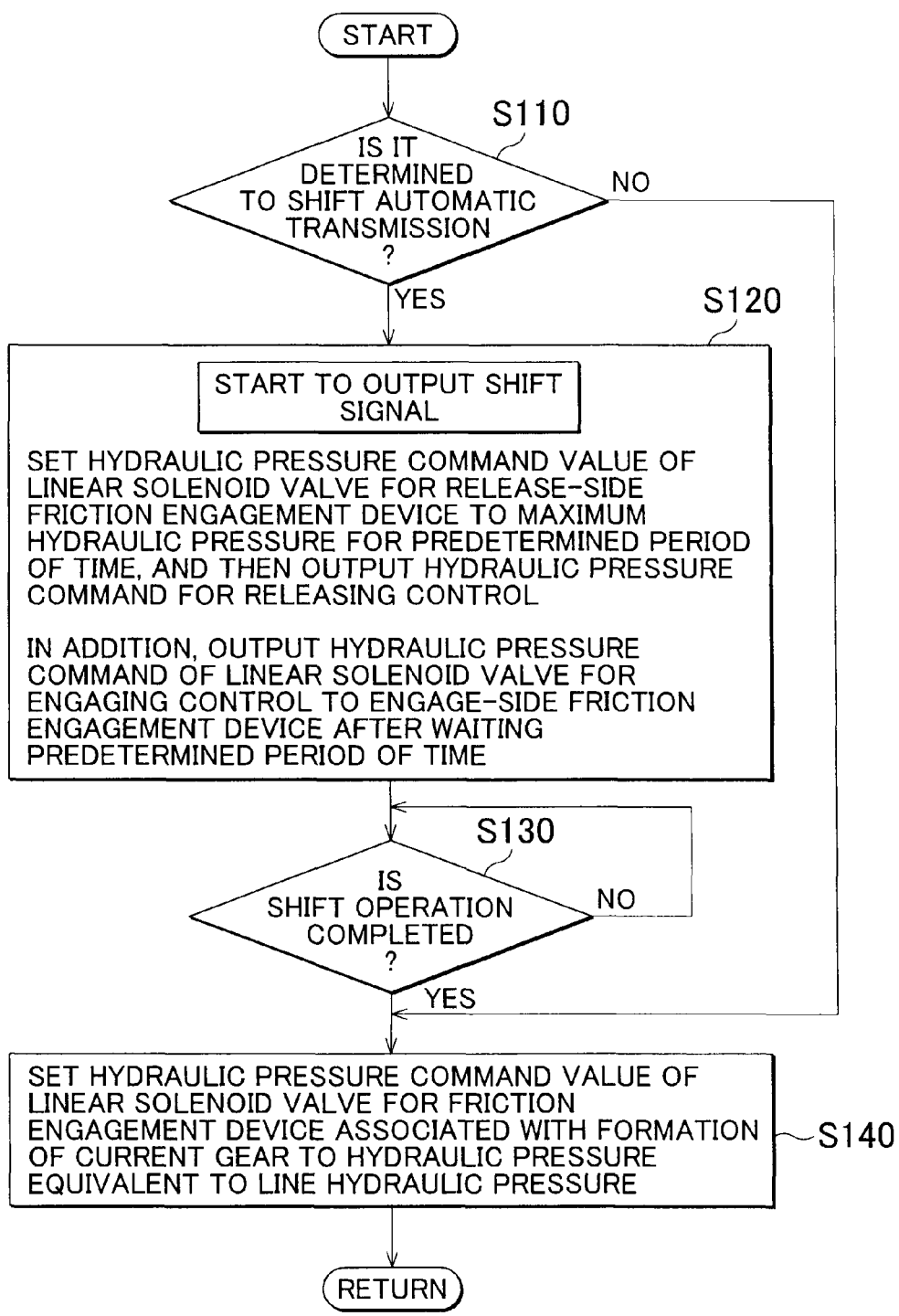
FIG. 19 is a flowchart that illustrates a relevant portion of control operations of the electronic control unit shown in FIG. 3, that is, control operations for stabilizing the response of an engagement hydraulic pressure applied to the friction engagement device, that is, the response of an output hydraulic pressure of the linear solenoid valve, while suppressing the power consumption of each linear solenoid valve according to an embodiment different from that of FIG. 17.

FIG. 19 is a flowchart that illustrates a relevant portion of control operations of the electronic control unit 100, that is, control operations for stabilizing the response of an engagement hydraulic pressure $P_C$ applied to the friction engagement device, that is, the response of an output hydraulic pressure $P_C$ of each of the associated linear solenoid valves SL, while suppressing the power consumption of each of the associated linear solenoid valves SL. FIG. 19 shows another embodiment corresponding to FIG. 17. In addition, FIG. 20 is a time chart that corresponds to the control operations shown in FIG. 19 and is an example in which the automatic transmission 10 downshifts from nth to (n−1)th gear.

In FIG. 19, first, in S110 executed by the hydraulic control unit 104, shift determination is, for example, made on the basis of an actual vehicle speed V and an accelerator operation amount Acc by referring to the shift map shown in FIG. 7, it is determined whether to shift the automatic transmission 10, and then a gear into which the automatic transmission 10 should be shifted is determined. When affirmative determination is made in S110 (at t1 in FIG. 20), in S120 executed by the hydraulic control unit 104, a shift command for performing automatic shift control of the automatic transmission 10 is, for example, output so as to obtain the gear determined in S110 (at t1 in FIG. 20). Specifically, after the set engagement hydraulic pressure $P_C$ applied to the release-side friction engagement device, that is, the set output hydraulic pressure $P_C$ (hydraulic pressure command value) of the linear solenoid valve SL for the release-side friction engagement device, is set to the maximum hydraulic pressure $P_{Cmax}$ for the first predetermined period of time T(1) (from t1 to t2 in FIG. 20), the hydraulic pressure command value of the linear solenoid valve SL for releasing control of the release-side friction engagement device is output (at t2 in FIG. 20). In addition, the hydraulic pressure command value of the linear solenoid valve SL for engaging control of the engage-side friction engagement device is output after waiting the first predetermined period of time T(1) (at t2 in FIG. 20). In this way, after waiting the first predetermined period of time T(1) from the time point at which a shift signal is started to be output, the shift operation of the automatic transmission 10, determined in S110, is substantially performed. Subsequently, in S130 executed by the hydraulic control unit 104, it is, for example, determined whether the shift operation of the automatic transmission 10 performed in S120 is completed. When negative determination is made in S130, S130 is repeatedly executed. Then, when negative determination is made in S110 or when affirmative determination is made in S130 (at time t3 in FIG. 20), in S140 executed by the hydraulic control unit 104, the engagement hydraulic pressure $P_C$ applied to the friction engagement device that is engaged in association with a current gear GS of the automatic transmission 10, that is, the output hydraulic pressure $P_C$ (hydraulic command value) of the associated linear solenoid valve SL, is, for example, set to a hydraulic pressure equivalent to the line hydraulic pressure PL (after t3 in FIG. 20 and before t1 in FIG. 20). In FIG. 19, S110 to S130 correspond to a situation during a shift operation, and S140 corresponds to a situation during a non-shift operation. Note that for the friction engagement device (engaged friction engagement device) that is not associated with a downshift of the automatic transmission 10 from nth to (n−1)th gear but associated with formation of the nth gear and (n−1)th gear to be kept engaged, the set engagement hydraulic pressure $P_C$ (engaged hydraulic pressure command value) of the engaged friction engagement device may be set to the line hydraulic pressure PL even during a shift operation. Thus, it is further advantageous in improvement of fuel economy.

Figure 20:
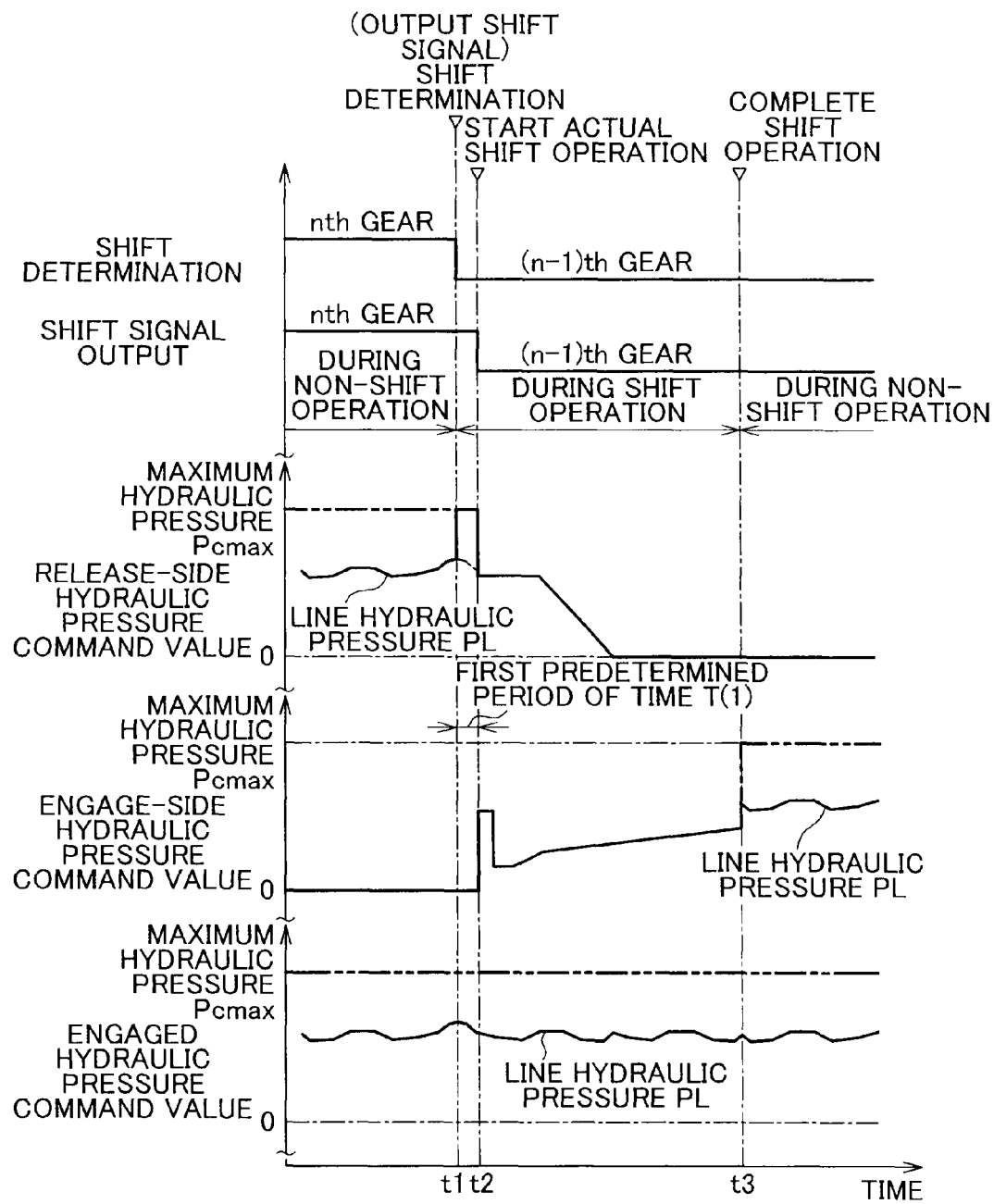
FIG. 20 is a time chart that corresponds to the control operations shown in FIG. 19 and is an example in which the automatic transmission downshifts from nth to (n−1)th gear.

As shown in FIG. 19 and FIG. 20, the engagement hydraulic pressure $P_C$ applied to the release-side friction engagement device is set to the maximum hydraulic pressure $P_{Cmax}$ prior to an actual shift operation, so engagement hydraulic pressure control is always started from the non-regulated state where the input port 88 is open in the associated linear solenoid valve SL at the time of an actual shift operation. Thus, in comparison with the case where the engagement hydraulic pressure $P_C$ is set to the line hydraulic pressure PL (broken line in FIG. 20), a response time for releasing the friction engagement device tends to be long; however, variations of the response time are suppressed. In addition, in comparison with the case where the engagement hydraulic pressure $P_C$ is set to the maximum hydraulic pressure $P_{Cmax}$ of the linear solenoid valve SL during a non-shift operation (see alternate long and two short dashes line in FIG. 20), the power consumption of each of the associated linear solenoid valves SL is suppressed. Note that, in FIG. 20, a time period before t1 and after t3 corresponds to a time period during a non-shift operation, and a time period from t1 to t3 corresponds to a time period during a shift operation. An actual shift operation time corresponds to a time period from t2 to t3.

As described above, with the present embodiment, the hydraulic control unit 104 increases the set engagement hydraulic pressure $P_C$ applied to the release-side friction engagement device by the first predetermined hydraulic pressure C(1) with respect to the set engagement hydraulic pressure $P_C$ during a non-shift operation for the first predetermined period of time T(1) from the time point of shift determination based on the predetermined shift map for determining whether to shift the automatic transmission 10, and then starts releasing control of the release-side friction engagement device. By so doing, a constant period of time for temporarily increasing the set engagement hydraulic pressure $P_C$ applied to the release-side friction engagement device by the first predetermined hydraulic pressure C(1) with respect to the set engagement hydraulic pressure $P_C$ during a non-shift operation prior to a start of releasing control of the release-side friction engagement device is appropriately set.

In addition, with the present embodiment, the hydraulic control unit 104 delays a start of engaging control of the engage-side friction engagement device by at least the first predetermined period of time T(1). This appropriately advances a shift operation through releasing control of the release-side friction engagement device and engaging control of the engage-side friction engagement device.

Fourth Embodiment

The automatic transmission 10 according to a fourth embodiment has a plurality of gears GS that are formed in such a manner that at least two friction engagement devices are engaged during a non-shift operation. When a shift operation is performed in such a transmission, for example, only one of the engaged two friction engagement devices is released, and a released friction engagement device is newly engaged. So-called multiple shift operations may be performed. In the multiple shift operations, the subsequent shift operation is determined while the above shift operation is being performed, and then a shift command for the determined shift operation is output. In the multiple shift operations, one of the two friction engagement devices that form the gear GS is not associated with the first shift operation (first shift operation) and then becomes the release-side friction engagement device at the time of the subsequent shift operation (second shift operation). For example, in 5-4-3 multiple shift operations in which a 4-3 downshift is performed during a 5-4 downshift, the clutch C2 is not associated with the 5-4 downshift (first shift operation), and becomes the release-side friction engagement device during the 4-3 downshift (second shift operation). In such multiple shift operations, as in the case of the above described first and second embodiments, it is only necessary that the set engagement hydraulic pressure $P_C$ is temporarily increased by the first predetermined hydraulic pressure C(1) with respect to the set hydraulic pressure during a non-shift operation for the first predetermined period of time T(1) prior to releasing control of the release-side friction engagement device in the first shift operation. Then, in terms of suppressing variations of shift response at the time of the second shift operation, it is conceivable that, for the release-side friction engagement device in the second shift operation, the set engagement hydraulic pressure $P_C$ is temporarily increased by a second predetermined hydraulic pressure C(2) with respect to the set hydraulic pressure during a non-shift operation before determination of the second shift operation. That is, the engagement hydraulic pressure $P_C$ of the release-side friction engagement device is increased in advance by the second predetermined hydraulic pressure C(2) with respect to the hydraulic pressure during a non-shift operation before it is not yet determined to perform the second shift operation.

However, it is difficult to estimate the second shift operation at the time of shift determination of the first shift operation or during the first shift operation, that is, to estimate multiple shift operations. In addition, there are a plurality of types of multiple shift operations in which any one of the two friction engagement devices that form the gear GS before the first shift operation is not associated with the first shift operation and becomes the release-side friction engagement device during the second shift operation. The types of multiple shift operations include 5-4-3 multiple shift operations, 3-4-5 multiple shift operations, 4-5-3 multiple shift operations, 5-4-2 multiple shift operations, 5-3-2 multiple shift operations, 6-5-3 multiple shift operations, and the like. Furthermore, in the 4-5-3 multiple shift operations, the clutch C2 is the release-side friction engagement device during a 5-3 downshift (during the second shift operation); however, a 5-3 downshift is not always started during a 4-5 upshift, and the clutch C2 is not always the release-side friction engagement device in the subsequent shift operation. In this way, it is difficult to estimate the release-side friction engagement device at the time of the second shift operation during the first shift operation and then to increase the engagement hydraulic pressure $P_C$ applied to the release-side friction engagement device by the second predetermined hydraulic pressure C(2) with respect to the hydraulic pressure during a non-shift operation. Then, when the first shift operation is performed, the engagement hydraulic pressure $P_C$ of each of the friction engagement devices that possibly become the release-side friction engagement device at the time of the second shift operation, that is, the engagement hydraulic pressure $P_C$ of the engaged friction engagement device that is not associated with the first shift operation but associated with formation of the gear GS, is increased by the second predetermined hydraulic pressure C(2).

Specifically, in order to stabilize the response of the output hydraulic pressure (engagement hydraulic pressure) $P_C$ in the second shift operation within the multiple shift operations while suppressing the power consumption of each of the associated linear solenoid valves SL, during the first shift operation of the automatic transmission 10, the hydraulic control unit 104, in addition to the above described embodiments, temporarily increases the engagement hydraulic pressure $P_C$ of the linear solenoid valve SL for the engaged friction engagement device that is not associated with the first shift operation but associated with formation of the gear GS, that is, the output hydraulic pressure $P_C$ (hydraulic pressure command value) for the engaged friction engagement device, by the second predetermined hydraulic pressure C(2) with respect to the set engagement hydraulic pressure $P_C$ during a non-shift operation (that is, the line hydraulic pressure PL) for the second predetermined period of time T(2) within the first shift operation. The engagement hydraulic pressure $P_C$ for the engaged friction engagement device, which is increased by the second predetermined hydraulic pressure C(2) with respect to the line hydraulic pressure PL, is, for example, a predetermined maximum hydraulic pressure $P_{C max}$ that can be output from the linear solenoid valve SL. That is, during a shift operation of the automatic transmission 10, the hydraulic control unit 104 temporarily sets a driving current that is equal to or higher than a driving current $I_{max}$, corresponding to the maximum hydraulic pressure $P_{Cmax}$ that is higher by the second predetermined hydraulic pressure C(2) than the line hydraulic pressure PL, as the hydraulic pressure command value (driving current) of the linear solenoid valve SL for the engaged friction engagement device for the second predetermined period of time T(2) during the first shift operation irrespective of whether multiple shift operations are performed. In this way, by temporarily placing the linear solenoid valve SL in the non-regulated state where the input port 88 is open prior to a start of an actual second shift operation, the operating state of the linear solenoid valve SL at the time of a start of the second shift operation is kept constant to thereby reduce variations of shift operation response at the time of the second shift operation.

The second predetermined hydraulic pressure C(2) is temporarily added to the line hydraulic pressure PL during the second predetermined period of time T(2), so the second predetermined hydraulic pressure C(2) is a sufficient predetermined hydraulic pressure to be added to the hydraulic pressure during a non-shift operation so as to reliably suppress variations of response of the output hydraulic pressure (engagement hydraulic pressure) $P_C$ rather than to suppress deterioration in fuel economy due to the addition of the hydraulic pressure. Therefore, the hydraulic pressure that is increased by the second predetermined hydraulic pressure C(2) with respect to the hydraulic pressure during a non-shift operation is set to the predetermined maximum hydraulic pressure $P_{Cmax}$ that can be output from the linear solenoid valve SL that outputs the engagement hydraulic pressure $P_C$ to the engaged friction engagement device.

The second predetermined period of time T(2), for example, begins from an end of the first predetermined period of time T(1) in the first shift operation. Then, when the second shift operation is started during the first shift operation of the automatic transmission 10, the second predetermined period of time T(2) is set to a period of time until hydraulic pressure control for the second shift operation is started during the current first shift operation. On the other hand, when the second shift operation is not started during the first shift operation of the automatic transmission 10, the second predetermined period of time T(2) is set to a period of time until hydraulic pressure control for the current first shift operation is completed. Note that, when the second shift operation is started during the first shift operation of the automatic transmission 10, because the engagement hydraulic pressure $P_C$ applied to the release-side friction engagement device at the time of the second shift operation has been increased by the second predetermined hydraulic pressure C(2) with respect to the hydraulic pressure during a non-shift operation at the time of determination of the second shift operation, it is not necessary to provide a standby period of time (corresponding to the first predetermined period of time T(1)) from the time point of determination of the second shift operation to the time point of a start of output of the hydraulic pressure control command signal $S_P$ unlike the above described embodiments. Thus, in this case, the second predetermined period of time T(2) is a period of time from the time point of an end of the first predetermined period of time T(1) to the time point of determination of the second shift operation.

Figure 21:
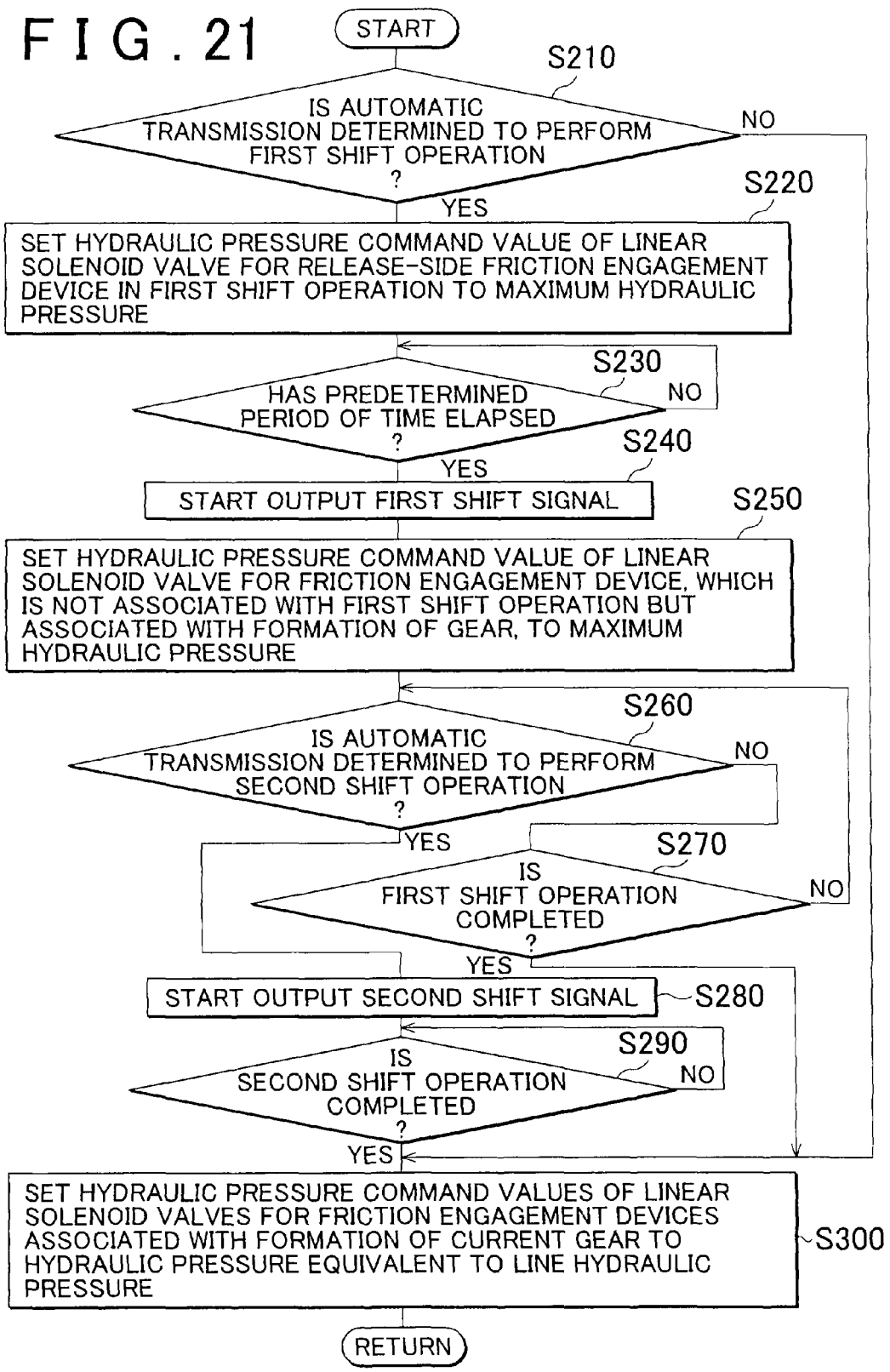
FIG. 21 is a flowchart that illustrates a relevant portion of control operations of the electronic control unit shown in FIG. 3, that is, control operations for stabilizing the response of an engagement hydraulic pressure applied to the friction engagement device, that is, the response of an output hydraulic pressure of the linear solenoid valve, while suppressing the power consumption of each linear solenoid valve according to an embodiment different from that of FIG. 17.
Figure 22:
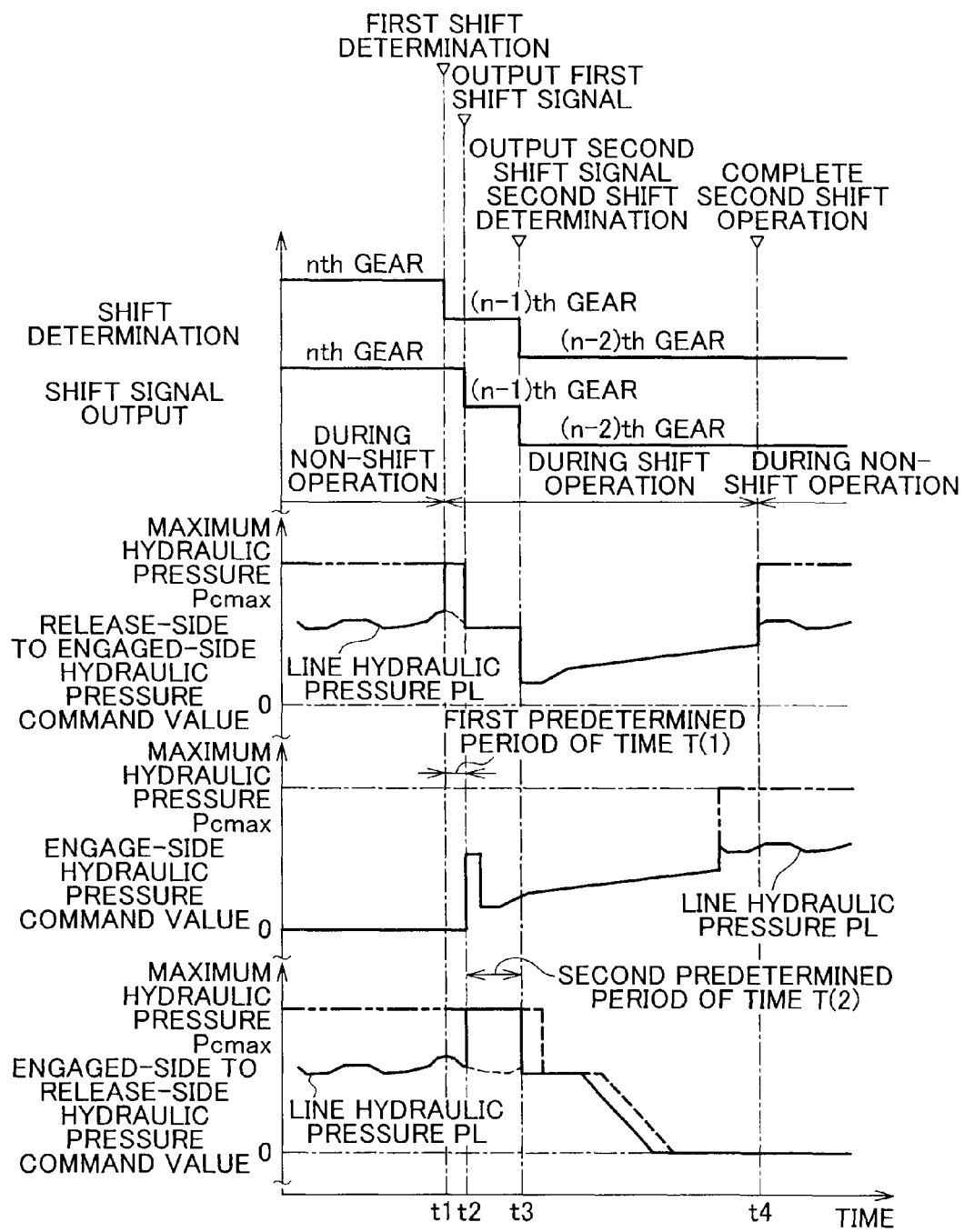
FIG. 22 is a time chart that corresponds to the control operations shown in FIG. 21 and is an example in which the automatic transmission carries out multiple shifts from nth to (n−1)th gear and then to (n−2)th gear.
Figure 23:
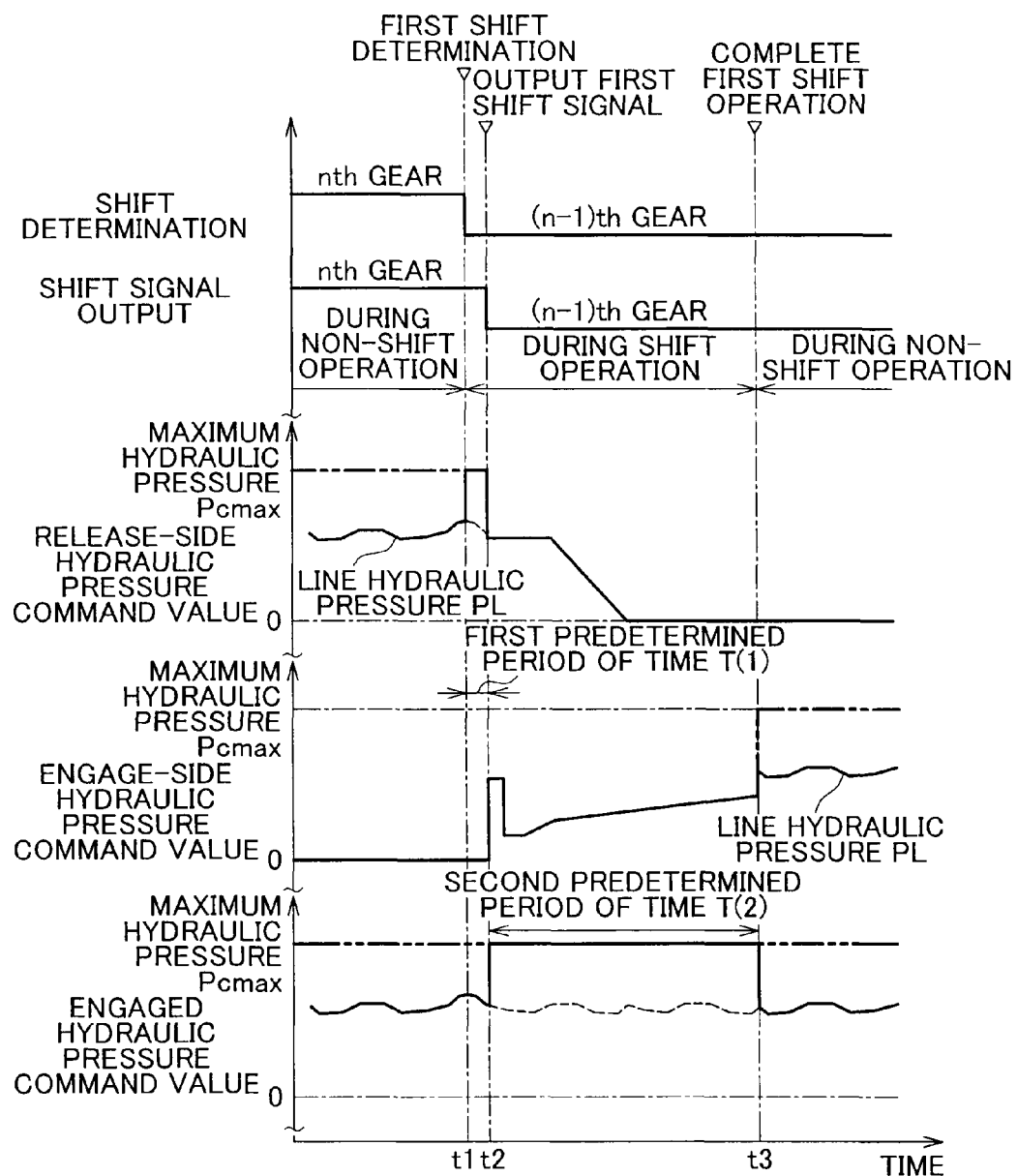
FIG. 23 is a time chart that corresponds to the control operations shown in FIG. 21 and is an example in which the automatic transmission carries out a single downshift from nth to (n−1)th gear.

FIG. 21 is a flowchart that illustrates a relevant portion of control operations of the electronic control unit 100, that is, control operations for stabilizing the response of the engagement hydraulic pressure $P_C$ applied to the friction engagement device, that is, the response of the output hydraulic pressure $P_C$ of each of the associated linear solenoid valves SL, while suppressing the power consumption of each of the associated linear solenoid valves SL. FIG. 19 shows another embodiment corresponding to FIG. 17. In addition, FIG. 22 and FIG. 23 are time charts corresponding to the control operations of FIG. 21. FIG. 22 is an example of the case where the automatic transmission 10 performs multiple shift operations from nth to (n−1)th gear and then to (n−2)th gear. FIG. 23 is an example of the case where the automatic transmission 10 performs a single downshift from nth to (n−1)th gear.

In FIG. 21, first, in S210 executed by the hydraulic control unit 104, shift determination is made on the basis of an actual vehicle speed V and an accelerator operation amount Acc by referring to, for example, the shift map shown in FIG. 7, it is determined whether to perform a first shift operation of the automatic transmission 10, and then a gear into which the automatic transmission 10 should be shifted is determined. When affirmative determination is made in S210 (at t1 in FIG. 22 and FIG. 23), in S220 executed by the hydraulic control unit 104, the engagement hydraulic pressure $P_C$ applied to the release-side friction engagement device, that is, the output hydraulic pressure $P_C$ (hydraulic pressure command value) of the associated linear solenoid valve SL applied to the release-side friction engagement device, is set to a sufficient hydraulic pressure that sufficiently places the linear solenoid valve SL in the non-regulated state where the input port 88 is open, that is, for example, the maximum hydraulic pressure $P_{Cmax}$ that can be output from the linear solenoid valve SL (between t1 and t2 in FIG. 22 and FIG. 23). Subsequently, in S230 executed by the hydraulic control unit 104, it is, for example, determined whether the predetermined period of time T for waiting an output of a hydraulic pressure control command signal $S_P$ for the first shift operation (in other words, the first predetermined period of time T(1) for stabilizing the response of the engagement hydraulic pressure $P_C$) has elapsed. When negative determination is made in S230, S230 is repeatedly executed. When affirmative determination is made in S230, in S240 executed by the hydraulic control unit 104, a shift command for performing automatic shift control of the automatic transmission 10 is, for example, output so as to obtain the gear determined in S210 (at t2 in FIG. 22 and FIG. 23). Specifically, a hydraulic pressure control command signal (shift output command value) $S_P$ that causes the hydraulic friction engagement devices associated with the first shift operation of the automatic transmission 10 to be engaged and/or released is output to the hydraulic pressure control circuit 50 so as to establish the gear in accordance with the engagement operation table shown in FIG. 2. In this way, a first shift signal is started to be output, and then the first shift operation of the automatic transmission 10 determined in S210 is performed. Substantially at the same time, in S250 executed by the hydraulic control unit 104, for example, the engagement hydraulic pressure $P_C$ applied to the engaged friction engagement device that is not associated with the first shift operation but associated with formation of the gear GS, that is, the output hydraulic pressure $P_C$ (hydraulic pressure command value) of the associated linear solenoid valve SL for the engaged friction engagement device, is set to a sufficient hydraulic pressure that places the linear solenoid valve SL in the non-regulated state where the input port 88 is open, for example, the maximum hydraulic pressure $P_{Cmax}$ that can be output from the linear solenoid valve SL (at t2 in FIG. 22 and FIG. 23).

Subsequently, in S260 executed by the hydraulic control unit 104, shift determination is, for example, made on the basis of an actual vehicle speed V and an accelerator operation amount Acc by referring to the shift map shown in FIG. 7, it is determined whether to perform a second shift operation of the automatic transmission 10, and then a gear into which the automatic transmission 10 should be shifted is determined. When negative determination is made in S260, in S270 executed by the hydraulic control unit 104, it is, for example, determined whether the first shift operation of the automatic transmission 10 performed in S240 is completed. When negative determination is made in S270, S260 and the following steps are repeatedly executed. On the other hand, when affirmative determination is made in S260, in S280 executed by the hydraulic control unit 104, a shift command for performing automatic shift operation control of the automatic transmission 10 is, for example, output so as to obtain the gear determined in S260 (at t3 in FIG. 22). Specifically, a hydraulic pressure control command signal (shift output command value) $S_P$ that causes the hydraulic friction engagement devices associated with the second shift operation of the automatic transmission 10 to be engaged and/or released is output to the hydraulic pressure control circuit 50 so as to establish the gear in accordance with the engagement operation table shown in FIG. 2. In this way, a second shift signal is started to be output, and then the second shift operation of the automatic transmission 10 determined in S260 is performed. Subsequently, in S290 executed by the hydraulic control unit 104, it is, for example, determined whether the second shift operation of the automatic transmission 10 performed in S280 is completed. When negative determination is made in S290, S290 is repeatedly executed. Then, when negative determination is made in S210, when affirmative determination is made in S270 (at t3 in FIG. 23) or when affirmative determination is made in S290 (at t4 in FIG. 22), in S300 executed by the hydraulic control unit 104, the engagement hydraulic pressure $P_C$ applied to the friction engagement device that is engaged in association with the current gear GS of the automatic transmission 10, that is, the output hydraulic pressure $P_C$ (hydraulic command value) of each of the associated linear solenoid valves SL, is, for example, set to a hydraulic pressure equivalent to the line hydraulic pressure PL (after t4 in FIG. 22, after t3 in FIG. 23 and before t1 in FIG. 22 and FIG. 23). In FIG. 21, S210 to S290 correspond to a situation during a shift operation, and S300 corresponds to a situation during a non-shift operation.

As shown in FIG. 21 to FIG. 23, the engagement hydraulic pressure $P_C$ applied to the engaged friction engagement device is set to the maximum hydraulic pressure $P_{Cmax}$ irrespective of whether the second shift operation is actually performed, so, when the second shift operation is actually started, engagement hydraulic pressure control is always started from the non-regulated state where the input port 88 is open in the associated linear solenoid valve SL. Thus, in comparison with the case where the engagement hydraulic pressure $P_C$ applied to the engaged friction engagement device is set to the line hydraulic pressure PL (broken line in FIG. 22 and FIG. 23), a response time for releasing the friction engagement device tends to be long; however, variations of the response time are suppressed. In addition, in comparison with the case where the engagement hydraulic pressure $P_C$ applied to the engaged friction engagement device is set to the maximum hydraulic pressure $P_{Cmax}$ of the linear solenoid valve SL during a non-shift operation (see alternate long and two short dashes line in FIG. 22 and FIG. 23), the power consumption of each of the associated linear solenoid valves SL is suppressed. In addition, a shift command for releasing control in the second shift operation is started to be output from the time point of determination of the second shift operation (at t3 in FIG. 22) without providing the first predetermined period of time T(1) shown by the (long) broken line in FIG. 22 to promptly perform (advance) the second shift operation. Note that, in FIG. 22, a time period before t1 and after t4 corresponds to a time period during a non-shift operation, and a time period between t1 and t4 corresponds to a time period during a shift operation. In addition, in FIG. 23, a time period before t1 and after t3 corresponds to a time period during a non-shift operation, and a time period from t1 to t3 corresponds to a time period during a shift operation. In FIG. 22, t2 corresponds to the time point of a start of an actual first shift operation, and t3 corresponds to the time point of a start of an actual second shift operation. In FIG. 23, an actual shift operation time corresponds to a time period from t2 to t3.

As described above, with the present embodiment, at the time of the first shift operation of the automatic transmission 10, the hydraulic control unit 104 temporarily increases the set engagement hydraulic pressure $P_C$ applied to the engaged friction engagement device, which is not associated with the first shift operation but associated with formation of the gear GS, by the second predetermined hydraulic pressure C(2) with respect to the engagement hydraulic pressure $P_C$ during a non-shift operation for the second predetermined period of time T(2) within the first shift operation. That is, irrespective of whether the subsequent shift operation (second shift operation) is started before completion of the current shift operation (first shift operation), during the first shift operation, the engagement hydraulic pressure $P_C$ applied to the engaged friction engagement device that possibly becomes the release-side friction engagement device during the second shift operation is increased by the second predetermined hydraulic pressure C(2) with respect to the engagement hydraulic pressure $P_C$ during a non-shift operation. By so doing, the engagement hydraulic pressure $P_C$ of the release-side friction engagement device has been already increased by the second predetermined hydraulic pressure C(2) during the first shift operation at the time of the second shift operation started during the first shift operation, so it is not necessary to provide the first predetermined period of time T(1) for increasing the engagement hydraulic pressure $P_C$ applied to the release-side friction engagement device by the first predetermined hydraulic pressure C(1) prior to a start of releasing control of the release-side friction engagement device at the time of the second shift operation started during the first shift operation. Thus, of course, it is possible to stabilize the response of the engagement hydraulic pressure $P_C$ applied to the release-side friction engagement device, that is, releasing performance (shift performance) of the release-side friction engagement device at the time of the second shift operation started during the first shift operation, and, in addition, a start of the second shift operation is promptly performed (advanced) in comparison with the case where the first predetermined period of time T(1) is provided again at the time of the second shift operation started during the first shift operation.

In addition, with the present embodiment, the engagement hydraulic pressure $P_C$ applied to the engaged friction engagement device, which is increased by the second predetermined hydraulic pressure C(2) with respect to the engagement hydraulic pressure $P_C$ during a non-shift operation, is a predetermined maximum hydraulic pressure $P_{Cmax}$ that can be output from the linear solenoid valve SL. By so doing, when releasing control of the release-side friction engagement device is started at the time of the second shift operation started during the first shift operation, the response of the engagement hydraulic pressure $P_C$ applied to the release-side friction engagement device begins from the constant non-regulated state where the output hydraulic pressure $P_C$ of the linear solenoid valve SL is set to the maximum hydraulic pressure $P_{Cmax}$, so variations of the shift response are reliably suppressed. In addition, the maximum hydraulic pressure for placing the linear solenoid valve SL in the non-regulated state is temporarily set for the second predetermined period of time T(2) within the first shift operation, so the power consumption of the associated linear solenoid valve SL is reliably suppressed.

In addition, with the present embodiment, when the second shift operation is started during the first shift operation of the automatic transmission 10, the second predetermined period of time T(2) is a period of time until hydraulic pressure control for the second shift operation is started during the current first shift operation. On the other hand, when the second shift operation is not started during the first shift operation of the automatic transmission 10, the second predetermined period of time T(2) is set to a period of time until hydraulic pressure control for the current first shift operation is completed. In addition, the second predetermined period of time T(2) begins from the time point of an end of the first predetermined period of time T(1). By so doing, a period of time for temporarily increasing the engagement hydraulic pressure $P_C$ applied to the engaged friction engagement device by the second predetermined hydraulic pressure C(2) with respect to the engagement hydraulic pressure $P_C$ during a non-shift operation in preparation for the second shift operation that can be possibly started during the first shift operation is appropriately set.

Fifth Embodiment

Hereinafter, when the first predetermined hydraulic pressure C(1) is not specifically distinguished from the second predetermined hydraulic pressure C(2), the first predetermined hydraulic pressure C(1) and the second predetermined hydraulic pressure C(2) each are referred to as the predetermined hydraulic pressure C.

Figure 24:
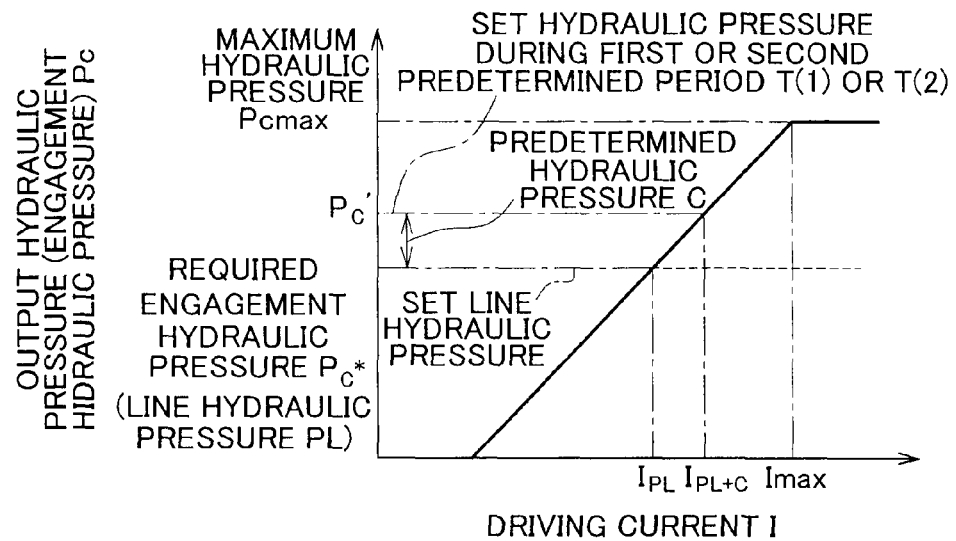
FIG. 24 is an example of the driving characteristic graph of each linear solenoid valve that supplies an engagement hydraulic pressure to the corresponding engagement device and is a graph that shows an example of a set engagement hydraulic pressure that is higher by a predetermined hydraulic pressure than the line hydraulic pressure, different from that of FIG. 16.
Figure 25:
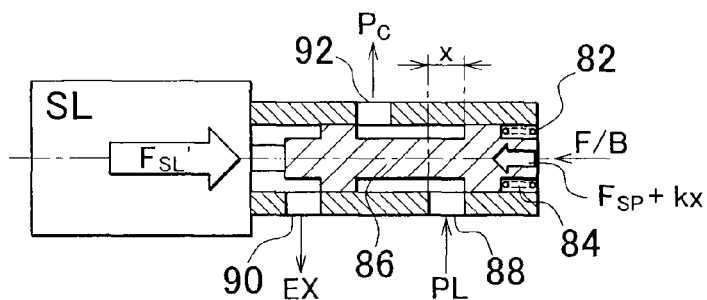
FIG. 25 is a similar graph to that of FIG. 10, showing an example in which the operating state of the linear solenoid valve is placed in a non-regulated state where an input port is open, and is a graph for illustrating an electromagnetic valve driving force of the linear solenoid valve, required to place the linear solenoid valve in the non-regulated state where the input port is open.

In the above described embodiments, in order to place the linear solenoid valve SL in the non-regulated state where the input port 88 is open during the first predetermined period of time T(1) (or the second predetermined period of time T(2)), the engagement hydraulic pressure $P_C$ applied to the release-side friction engagement device (or the engaged friction engagement device) is set to the maximum hydraulic pressure $P_{Cmax}$ that is the engagement hydraulic pressure $P_C$ higher by the first predetermined hydraulic pressure C(1) (or the second predetermined hydraulic pressure C(2)) than the line hydraulic pressure PL; however, the engagement hydraulic pressure $P_C$ may be a sufficient hydraulic pressure that places the linear solenoid valve SL in the non-regulated state where the input port 88 is open even when the engagement hydraulic pressure $P_C$ is not the maximum hydraulic pressure $P_{Cmax}$. For example, the engagement hydraulic pressure $P_C$ that is higher by the predetermined hydraulic pressure C than the line hydraulic pressure PL, that is, the output hydraulic pressure $P_C$ (hydraulic pressure command value) of the linear solenoid valve SL, may be a predetermined lowest possible hydraulic pressure for placing the linear solenoid valve SL in the non-regulated state where the input port 88 is open (see FIG. 24). That is, during the first predetermined period of time T(1) (or the second predetermined period of time T(2)), the hydraulic control unit 104 sets the driving current $I_{PL+C}$, corresponding to the output hydraulic pressure $P_C'$ (=PL+C) that is higher by the predetermined hydraulic pressure C than the line hydraulic pressure PL, as the hydraulic pressure command value (driving current) of the linear solenoid valve SL.

Specifically, the constant C in the above described mathematical expression (3) is set as the predetermined hydraulic pressure C.

In the above described embodiment, in setting the hydraulic pressure command value of the linear solenoid valve SL during the first predetermined period of time T(1) (or the second predetermined period of time T(2)), the predetermined hydraulic pressure C is set as a constant margin for the line hydraulic pressure PL. Incidentally, depending on the design of the hydraulic pressure control circuit 50, a pump discharge flow rate increases with an increase in rotational speed of the oil pump 28, and actually the line hydraulic pressure PL higher than the set line hydraulic pressure may possibly occur because of flow force (fluid force) applied to the spool valve element of the primary regulator valve 80. Therefore, except in a case where the line hydraulic pressure PL is directly detected, when the line hydraulic pressure PL is set on the basis of an estimated engine torque $T_E'$ (or an estimated input torque $T_{IN}'$), there is a possibility that the constant predetermined hydraulic pressure C does not suffice an electromagnetic driving force $F_{SL}'$ for placing the linear solenoid valve SL in the non-regulated state where the input port 88 is open. Then, in the present embodiment, the hydraulic control unit 104 changes the predetermined hydraulic pressure C on the basis of a predetermined amount of increase $\Delta PL$ from the set value of the line hydraulic pressure PL resulting from an increase in discharge flow rate of the oil pump 28.

Figure 26:
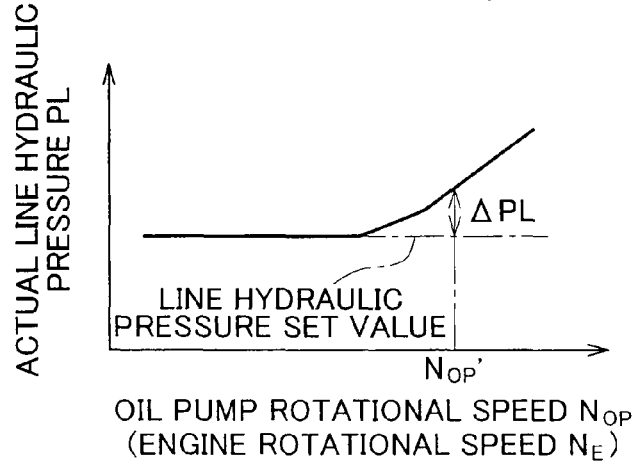
FIG. 26 is a graph that shows the predetermined and stored relationship in which an actual line hydraulic pressure is increased with respect to a set line hydraulic pressure with an increase in oil pump rotational speed.
Figure 27:
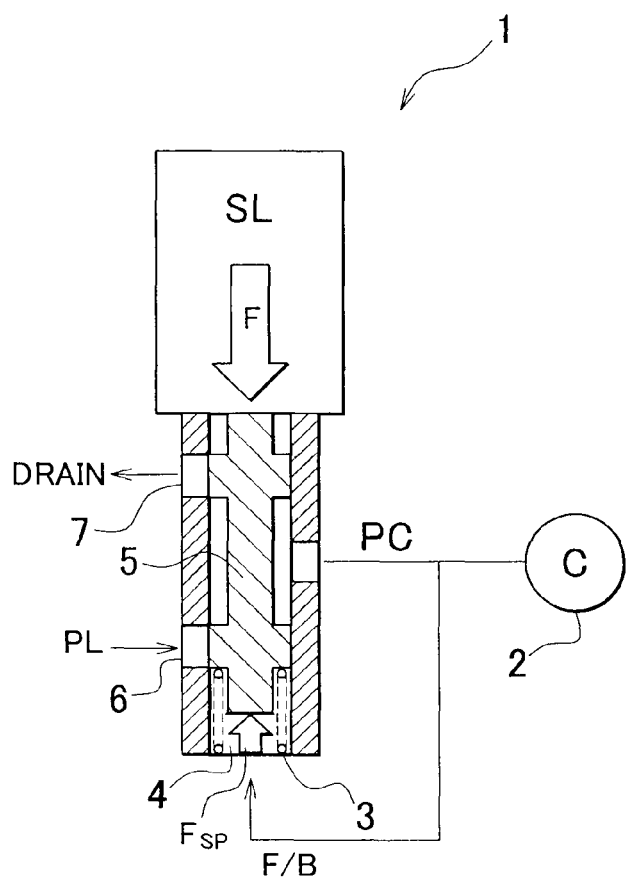
FIG. 27 is a view that shows an example in which the operating state of a linear solenoid valve is placed in a regulated state according to a related art.

Specifically, FIG. 26 is the predetermined and stored relationship (actual line hydraulic pressure map) in which, as an oil pump rotational speed $N_{OP}$ increases, an actual line hydraulic pressure PL is increased with respect to the set value of the line hydraulic pressure PL. In FIG. 26, for example, when the oil pump rotational speed $N_{OP}$ is $N_{OP}'$, the actual line hydraulic pressure PL is increased by the predetermined amount of increase $\Delta PL$ with respect to the set value of the line hydraulic pressure PL set by the line hydraulic pressure setting unit 110. On the basis of an actual oil pump rotational speed related value by referring to the relationship shown in FIG. 26, the hydraulic control unit 104 decreases the predetermined hydraulic pressure C as the actual oil pump rotational speed related value decreases and increases the predetermined hydraulic pressure C as the actual oil pump rotational speed related value increases. That is, the hydraulic control unit 104 increases the predetermined hydraulic pressure C by a predetermined amount of increase $\Delta PL$ on the basis of an actual oil pump rotational speed related value by referring to the relationship shown in FIG. 26. Note that the oil pump rotational speed related value, for example, includes, of course, an oil pump rotational speed $N_{OP}$, that is, an engine rotational speed $N_E$, and also includes a turbine rotational speed $N_T$ (that is, input rotational speed $N_{IN}$) related to the oil pump rotational speed $N_{OP}$.

As described above, with the present embodiment, the linear solenoid valve SL that controls the engagement hydraulic pressure $P_C$ applied to the release-side hydraulic friction engagement device (or the engaged hydraulic friction engagement device) has the input port 88 for introducing the line hydraulic pressure PL, which is a source pressure for controlling the engagement hydraulic pressure $P_C$, and the supply port 92 for supplying the engagement hydraulic pressure to a corresponding one of the friction engagement devices, and the predetermined hydraulic pressure C is predetermined so as to be added to the engagement hydraulic pressure $P_C$ during a non-shift operation in order to open both the input port 88 and the supply port 92 while providing fluid communication between the input port 88 and the supply port 92 and in order to place the linear solenoid valve SL in the non-regulated state. By so doing, when releasing control of the release-side hydraulic friction engagement device is started in a single shift operation (or in multiple shift operations), the response of the engagement hydraulic pressure $P_C$ applied to the release-side hydraulic friction engagement device, that is, the response of the output hydraulic pressure $P_C$ of the linear solenoid valve SL, begins from the constant non-regulated state where the input port 88 is open, so variations of shift response are reliably suppressed. In addition, the hydraulic pressure for placing the linear solenoid valve SL in the non-regulated state where the input port 88 is open is temporarily set for the first predetermined period of time T(1) prior to a start of releasing control (or is temporarily set for the second predetermined period of time T(2) within the first shift operation), so the power consumption of the linear solenoid valve SL is reliably suppressed.

In addition, with the present embodiment, the predetermined hydraulic pressure C is changed on the basis of a predetermined amount of increase ΔPL from the set value of the line hydraulic pressure PL resulting from an increase in discharge flow rate of the oil pump 28, which generates a hydraulic fluid pressure that is a source pressure of the line hydraulic pressure PL. By so doing, an actual line hydraulic pressure PL is increased with respect to the set value of the line hydraulic pressure PL with an increase in discharge flow rate of the oil pump 28, so this avoids a possible situation that addition of a constant margin of the predetermined hydraulic pressure C does not suffice the set engagement hydraulic pressure $P_C$ applied to the friction engagement device.

In addition, with the present embodiment, by referring to the predetermined relationship in which, as the oil pump rotational speed related value (for example, oil pump rotational speed $N_{OP}$, that is, engine rotational speed $N_E$, or the like) increases, an actual line hydraulic pressure PL increases with respect to the set line hydraulic pressure PL, on the basis of an actual oil pump rotational speed related value, the predetermined hydraulic pressure C is decreased as the actual oil pump rotational speed related value decreases, and the predetermined hydraulic pressure C is increased as the actual oil pump rotational speed related value increases. This appropriately avoids a situation that the set engagement hydraulic pressure $P_C$ applied to the friction engagement device is insufficient.

The embodiments of the invention are described in detail with reference to the accompanying drawings; however, the aspect of the invention may also be applied to other embodiments.

For example, in the above described embodiments, the second predetermined period of time T(2) begins from the time point of an end of the first predetermined period of time T(1) in the first shift operation; instead, the second predetermined period of time T(2) may begin from the time point of a start of the first predetermined period of time T(1). For example, in the time charts shown in FIG. 22 and FIG. 23, the second predetermined period of time T(2) is a period of time from t2 to t3; instead, the second predetermined period of time T(2) may be a period of time from t1 to t3. By so doing as well, a period of time for temporarily increasing the engagement hydraulic pressure $P_C$ applied to the engaged friction engagement device by the second predetermined hydraulic pressure C(2) with respect to the engagement hydraulic pressure $P_C$ during a non-shift operation in preparation for the second shift operation that can be possibly started during the first shift operation is appropriately set. However, the period of time for increasing the engagement hydraulic pressure $P_C$ applied to the engaged friction engagement device by the second predetermined hydraulic pressure C(2) is reduced from the set engagement hydraulic pressure during a non-shift operation when the time point of an end of the first predetermined period of time T(1) is set as the starting point as shown in the time charts in FIG. 22 and FIG. 23 rather than when the time point of a start of the first predetermined period of time T(1) is set as the starting point, so the power consumption of the linear solenoid valve SL is suppressed and, therefore, it is advantageous in improvement of fuel economy.

In addition, in the above described embodiments, the maximum hydraulic pressure $P_{Cmax}$ or the predetermined lowest possible hydraulic pressure ($P_{C'min}$) for placing the linear solenoid valve SL in the non-regulated state where the input port 88 is open is set as the output hydraulic pressure $P_C'$ (=PL+C) that is higher by the predetermined hydraulic pressure C than the line hydraulic pressure PL during the first predetermined period of time T(1) (or the second predetermined period of time T(2)); instead, it is only necessary that the output hydraulic pressure $P_C'$ is a sufficient hydraulic pressure that places the linear solenoid valve SL in the non-regulated state where the input port 88 is open. For example, it is only necessary that the output hydraulic pressure $P_C'$ (=PL+C) ranges from the lowest possible hydraulic pressure ($P_{C'min}$) to the maximum hydraulic pressure $P_{Cmax}$. In addition, the first predetermined hydraulic pressure C(1) and the second predetermined hydraulic pressure C(2) need not be equal to each other. For example, it is applicable that (PL+C(1)) is set to the maximum hydraulic pressure $P_{Cmax}$ and (PL+C(2)) is set to the lowest possible hydraulic pressure ($P_{C'min}$).

In addition, in the above described embodiments, the predetermined period of time T that is set as a standby time from the time point of shift determination of the automatic transmission 10 to the time point at which a shift command is started to be output is used as the first predetermined period of time T(1); however, when the predetermined period of time T does not reach the required first predetermined period of time T(1), for example, a start of output of a shift command is waited for at least (T(1)-T) from the time point of shift determination in addition to the predetermined period of time T.

In addition, in the above described embodiments, when the second shift operation is started during the first shift operation of the automatic transmission 10, the second predetermined period of time T(2) is set to a period of time until hydraulic pressure control for the second shift operation is started, that is, a period of time up to the time point of determination of the second shift operation; however, when the second predetermined period of time T(2) does not reach the required first predetermined period of time T(1), for example, a start of output of a second shift command is waited for at least (T(1)-T(2)) from the time point of determination of the second shift operation.

In addition, in the above described embodiment, the non-regulated state where the input port 88 is open in each of the associated linear solenoid valves SL is a state where, as shown in FIG. 10 or FIG. 21, the spool valve element 86 is completely pressed toward the spring 82 side and the input port 88 is completely open; however, it may also be the non-regulated state as long as at least part of the input port 88 is open and the input port 88 and the supply port 92 are in fluid communication with each other thereby not to place the linear solenoid valve SL in the regulated state shown in FIG. 9.

In addition, in the above embodiment, the line hydraulic pressure setting unit 110 (step S5 in FIG. 12) sets the required output hydraulic pressure $P_C$* as the line hydraulic pressure PL; however, when the relationship (map) between an estimated engine torque $T_E'$ or estimated input torque $T_{IN}'$ and a line hydraulic pressure PL is empirically obtained and pre-stored on the basis of a required engagement hydraulic pressure $P_C$*, or the like, the line hydraulic pressure PL may be set on the basis of an estimated engine torque $T_E'$ or an estimated input torque $T_{IN}'$ by referring to the above relationship. In this case, the required engagement hydraulic pressure calculation unit 108 is not required, and steps S3 and S4 in FIG. 12 are not required. In addition, when the line hydraulic pressure PL is set on the basis of an estimated engine torque $T_E$, step S2 in FIG. 12 is not required.

In addition, the above described embodiments may be implemented in combination by, for example, setting the order of priority.

Note that the above described embodiments are only illustrative; the aspect of the invention may be modified or improved in various forms on the basis of the knowledge of the person skilled in the art.

What is claimed is:

1. A hydraulic control device for a vehicle automatic transmission in which a plurality of hydraulic friction engagement devices are selectively engaged to establish a plurality of speeds having different speed ratios, comprising:
   a hydraulic control unit that uses an electromagnetic valve device to control engagement hydraulic pressures supplied to the respective hydraulic friction engagement devices by setting a driving current corresponding to the engagement hydraulic pressures;
   an estimated torque calculation unit that calculates an input torque related value of the vehicle automatic transmission; and
   a line hydraulic pressure setting unit that sets a line hydraulic pressure on the basis of the input torque related value, the line hydraulic pressure being a source pressure for controlling the engagement hydraulic pressures applied to the respective hydraulic friction engagement devices, wherein
   during a non-actual shift operation time when a predetermined speed of the vehicle automatic transmission is kept, the hydraulic control unit sets the driving current to increase, by a predetermined hydraulic pressure with respect to the line hydraulic pressure, the engagement hydraulic pressure applied to an engaged hydraulic friction engagement device of the hydraulic friction engagement device associated with formation of the predetermined speed.

2. The hydraulic control device according to claim 1, wherein
   the electromagnetic valve device has an input port for introducing the line hydraulic pressure and a supply port for supplying the engagement hydraulic pressure to the hydraulic friction engagement device, and the predetermined hydraulic pressure is predetermined so as to be added to the line hydraulic pressure in order to open both the input port and the supply port while providing fluid communication between the input port and the supply port and in order to place the electromagnetic valve device in a non-regulated state.

3. The hydraulic control device according to claim 2, wherein
   the predetermined hydraulic pressure is predetermined so as to place the electromagnetic valve device in the non-regulated state, where the input port is open, on the basis of a variable factor associated with the control of the engagement hydraulic pressure applied to the hydraulic friction engagement device using the electromagnetic valve device.

4. The hydraulic control device according to claim 1, further comprising:
   an oil pump that generates a hydraulic fluid pressure as the oil pump is driven for rotation by a driving force source, the hydraulic fluid pressure being a source pressure of the line hydraulic pressure, wherein
   the hydraulic control unit changes the predetermined hydraulic pressure on the basis of a predetermined amount of increase from a set value of the line hydraulic pressure with an increase in discharge flow rate of the oil pump.

5. The hydraulic control device according to claim 4, wherein
   by referring to a predetermined relationship in which an actual line hydraulic pressure is increased with respect to the set line hydraulic pressure as an oil pump rotational speed related value related to a rotational speed of the oil pump increases, on the basis of an actual oil pump rotational speed related value, the hydraulic control unit decreases the predetermined hydraulic pressure as the actual oil pump rotational speed related value decreases, and increases the predetermined hydraulic pressure as the actual oil pump rotational speed related value increases.

6. The hydraulic control device according to claim 1, wherein
   the non-actual shift operation time when the predetermined speed of the vehicle automatic transmission is kept is a period of time during a shift operation before an actual shift operation is started.

7. A hydraulic control device for a vehicle automatic transmission in which a plurality of hydraulic friction engagement devices are selectively engaged to establish a plurality of speeds having different speed ratios, comprising:
   a hydraulic control unit that uses an electromagnetic valve device to control engagement hydraulic pressures supplied to the respective hydraulic friction engagement devices by setting a driving current corresponding to the engagement hydraulic pressures; and
   an estimated torque calculation unit that calculates an input torque related value of the vehicle automatic transmission, wherein
   during a non-shift operation in which a predetermined speed of the vehicle automatic transmission is kept, the hydraulic control unit sets the engagement hydraulic pressure applied to the hydraulic friction engagement device associated with formation of the predetermined speed to a hydraulic pressure based on the input torque related value to thereby place the electromagnetic valve device in a regulated state, while
   during a shift operation of the vehicle automatic transmission, prior to a start of releasing control of a release-side hydraulic friction engagement device of the hydraulic friction engagement devices, the hydraulic control unit sets the driving current to temporarily increase, by a predetermined hydraulic pressure with respect to the engagement hydraulic pressure during the non-shift operation, the engagement hydraulic pressure applied to the release-side hydraulic friction engagement device for a predetermined period of time, and
   the release-side hydraulic friction engagement device is an engaged hydraulic friction engagement device of the hydraulic friction engagement device.

8. The hydraulic control device according to claim 7, further comprising:
   a line hydraulic pressure setting unit that sets a line hydraulic pressure on the basis of the input torque related value, the line hydraulic pressure being a source pressure for controlling the engagement hydraulic pressures applied to the respective hydraulic friction engagement devices, wherein
   the hydraulic control unit sets the engagement hydraulic pressure during the non-shift operation to the line hydraulic pressure.

9. The hydraulic control device according to claim 7, wherein
the engagement hydraulic pressure, which is applied to the release-side hydraulic friction engagement device and is increased by the predetermined hydraulic pressure with respect to the engagement hydraulic pressure during the non-shift operation, is a predetermined maximum hydraulic pressure that can be output from the electromagnetic valve device.

10. The hydraulic control device according to claim 7, wherein
the electromagnetic valve device has an input port for introducing a source pressure used for controlling the engagement hydraulic pressure and a supply port for supplying the engagement hydraulic pressure to the release-side hydraulic friction engagement device, and the predetermined hydraulic pressure is predetermined so as to be added to the engagement hydraulic pressure during the non-shift operation in order to open both the input port and the supply port while providing fluid communication between the input port and the supply port and in order to place the electromagnetic valve device in a non-regulated state.

11. The hydraulic control device according to claim 10, wherein
the hydraulic control unit changes the predetermined hydraulic pressure on the basis of a predetermined amount of increase in hydraulic fluid pressure, generated by an oil pump, with an increase in discharge flow rate of the oil pump, the hydraulic fluid pressure being a source pressure for controlling the engagement hydraulic pressure.

12. The hydraulic control device according to claim 7, wherein
the predetermined period of time is a predetermined constant standby time from the time point of shift determination based on a predetermined relationship for determining whether to shift the vehicle automatic transmission to the time point at which a predetermined shift command for changing an engagement state of at least any one of the hydraulic friction engagement devices is started to be output on the basis of the shift determination.

13. The hydraulic control device according to claim 7, wherein
the hydraulic control unit increases the engagement hydraulic pressure applied to the release-side hydraulic friction engagement device by the predetermined hydraulic pressure with respect to the engagement hydraulic pressure during the non-shift operation for the predetermined period of time from the time point of shift determination based on a predetermined relationship for determining whether to shift the vehicle automatic transmission, and then starts releasing control of the release-side hydraulic friction engagement device.

14. The hydraulic control device according to claim 13, wherein
the hydraulic control unit delays a start of engaging control of an engage-side hydraulic friction engagement device of the hydraulic friction engagement devices by at least the predetermined period of time.

15. The hydraulic control device according to claim 7, wherein
during a shift operation of the vehicle automatic transmission, the hydraulic control unit temporarily increases the engagement hydraulic pressure applied to an another engaged hydraulic friction engagement device, which is not associated with the shift operation but associated with formation of the predetermined speed, by a second predetermined hydraulic pressure with respect to the engagement hydraulic pressure during the non-shift operation for a second predetermined period of time during the shift operation.

16. The hydraulic control device according to claim 15, wherein
the engagement hydraulic pressure, which is applied to the another engaged hydraulic friction engagement device and is increased by the second predetermined hydraulic pressure with respect to the engagement hydraulic pressure during the non-shift operation, is a predetermined maximum hydraulic pressure that can be output from the electromagnetic valve device.

17. The hydraulic control device according to claim 15, wherein
the electromagnetic valve device that controls an engagement hydraulic pressure applied to the another engaged hydraulic friction engagement device has an input port for introducing a source pressure used for controlling the engagement hydraulic pressure and a supply port for supplying the engagement hydraulic pressure, and the second predetermined hydraulic pressure is predetermined so as to be added to the engagement hydraulic pressure during the non-shift operation in order to open both the input port and the supply port while providing fluid communication between the input port and the supply port and in order to place the electromagnetic valve device in a non-regulated state.

18. The hydraulic control device according to claim 17, wherein
the hydraulic control unit changes the second predetermined hydraulic pressure on the basis of a predetermined amount of increase in hydraulic fluid pressure, generated by an oil pump, with an increase in discharge flow rate of the oil pump, the hydraulic fluid pressure being a source pressure for controlling the engagement hydraulic pressure.

19. The hydraulic control device according to claim 15, wherein
when a second shift operation is started during a current shift operation of the vehicle automatic transmission, the second predetermined period of time is a period of time until hydraulic pressure control for the second shift operation is started during the current shift operation.

20. The hydraulic control device according to claim 15, wherein
when a second shift operation is not started during a current shift operation of the vehicle automatic transmission, the second predetermined period of time is a period of time until hydraulic pressure control for the current shift operation is completed.

21. The hydraulic control device according to claim 15, wherein
the second predetermined period of time begins from the time point of an end of the predetermined period of time.

22. The hydraulic control device according to claim 15, wherein
the second predetermined period of time begins from the time point of a start of the predetermined period of time.

* * * * *